(12) United States Patent
Hayashi et al.

(10) Patent No.: US 8,429,698 B2
(45) Date of Patent: Apr. 23, 2013

(54) DIGITAL BROADCAST TRANSMISSION DEVICE AND DIGITAL BROADCAST RECEPTION DEVICE

(75) Inventors: Yoshikazu Hayashi, Osaka (JP); Kazuya Ueda, Osaka (JP); Makoto Sekitoh, Osaka (JP); Ippei Kanno, Kyoto (JP); Tomohiro Kimura, Osaka (JP); Masahiro Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 680 days.

(21) Appl. No.: 12/671,158

(22) PCT Filed: Jul. 30, 2008

(86) PCT No.: PCT/JP2008/002043
§ 371 (c)(1),
(2), (4) Date: Jan. 28, 2010

(87) PCT Pub. No.: WO2009/016835
PCT Pub. Date: Feb. 5, 2009

(65) Prior Publication Data
US 2010/0199301 A1    Aug. 5, 2010

(30) Foreign Application Priority Data

| Aug. 1, 2007 | (JP) | ................................. | 2007-200996 |
| Apr. 30, 2008 | (JP) | ................................. | 2008-118459 |
| Apr. 30, 2008 | (JP) | ................................. | 2008-118460 |
| Apr. 30, 2008 | (JP) | ................................. | 2008-118461 |
| May 8, 2008 | (JP) | ................................. | 2008-122498 |

(51) Int. Cl.
*H04N 7/173* (2011.01)
(52) U.S. Cl.
USPC ............................. 725/93; 725/114; 725/131
(58) Field of Classification Search ........................ None
See application file for complete search history.

(56) References Cited

U.S. PATENT DOCUMENTS

| 6,330,252 B1 | 12/2001 | Shojima |
| 2002/0154703 A1 | 10/2002 | Kubota et al. |
| 2006/0051058 A1 | 3/2006 | Rudolph et al. |
| 2006/0061682 A1 | 3/2006 | Bradley et al. |

(Continued)

FOREIGN PATENT DOCUMENTS

| JP | 11-275476 | 10/1999 |
| JP | 2000-32404 | 1/2000 |

(Continued)

OTHER PUBLICATIONS

Extended European Search Report issued May 3, 2012 in corresponding European Application No. 08 79 0307.

(Continued)

*Primary Examiner* — Mark D Featherstone
(74) *Attorney, Agent, or Firm* — Wenderoth, Lind & Ponack, L.L.P.

(57) ABSTRACT

A digital broadcast transmission device generates channel combination information associating a plurality of physical channels. The digital broadcast transmission device divides a bit stream into a plurality of bit streams, the bit stream including program-related information having added thereto channel combination information, and transmits the divided bit streams on the plurality of physical channels, respectively. A digital broadcast reception device selects the plurality of physical channels using a plurality of front ends based on the channel combination information, and demodulates broadcast waves received on the plurality of physical channels, respectively. The digital broadcast reception device combines bit streams obtained from the demodulation, and outputs the combined bit stream. The digital broadcast reception device also simultaneously transmits a light bit stream on a different single physical channel, the light bit stream being a bit stream smaller in amount of information than the combined bit stream.

21 Claims, 57 Drawing Sheets

U.S. PATENT DOCUMENTS

2006/0271990 A1* 11/2006 Rodriguez et al. ............ 725/118

FOREIGN PATENT DOCUMENTS

| WO | 01/56244 | 8/2001 |
| WO | 2006/109477 | 10/2006 |

OTHER PUBLICATIONS

International Search Report issued Nov. 18, 2008 in corresponding International Application No. PCT/JP2008/002043.

* cited by examiner

F I G. 1
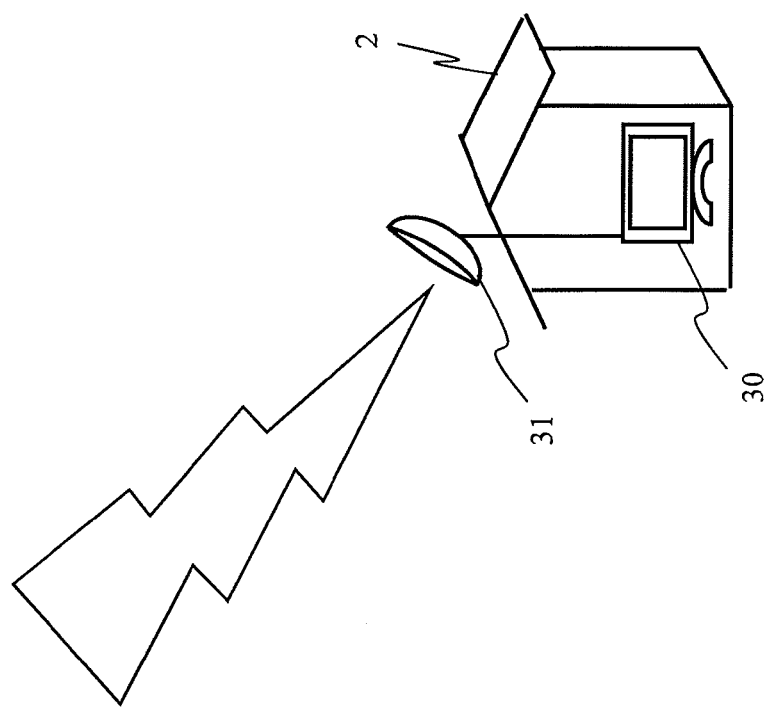
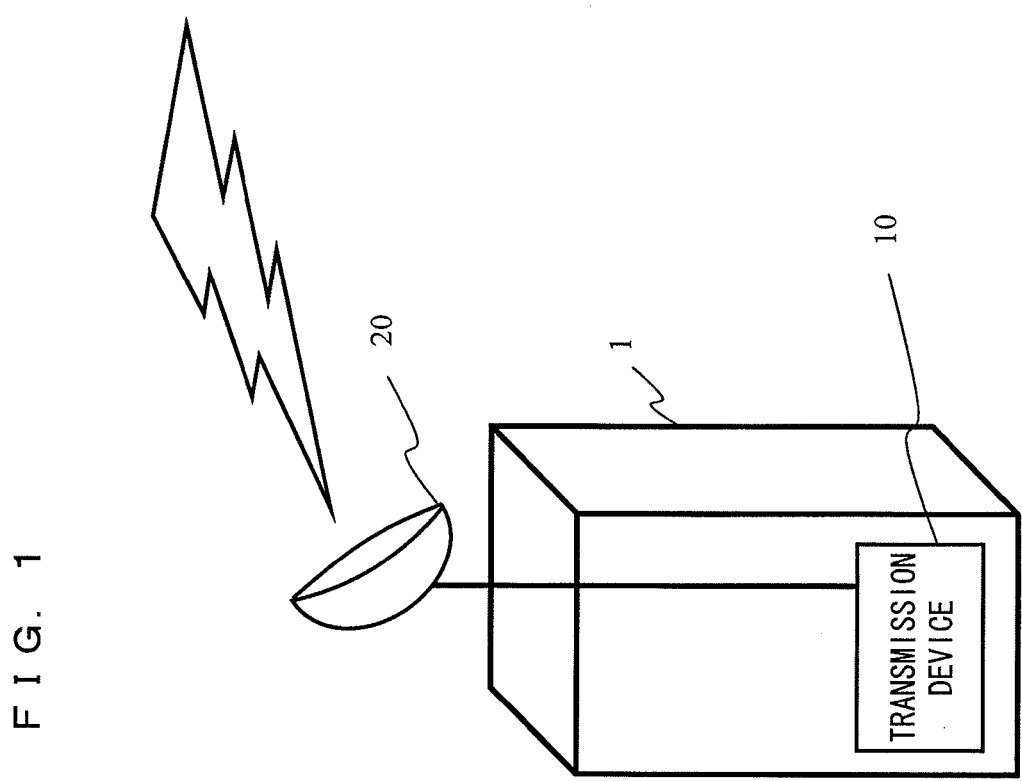

534

| SID 5341 | SERVICE FORMAT 5342 | ... |
|---|---|---|
| 0001h | TV | ... |
| 0002h | TV | ... |
| ⋮ | ⋮ | ⋮ |

535

| COMBINATION FLAG 5351 | SUBCHANNEL FREQUENCY 5352 | MODULATION SCHEME 5353 | ERROR CORRECTION SCHEME 5354 | CH.-COMBINATION-RELATED INFORMATION 5355 |
|---|---|---|---|---|
| ON | 11.80420GHz | ISDB-S | ISDB-S | ... |

FIG. 8

| SID | TS-ID | CH. COMBINATION FLAG | CH.-COMBINATION-RELATED INFORMATION | TRANSPONDER FREQUENCY | PMT-PID | ES-PID |
|---|---|---|---|---|---|---|
| 100 | 0x40F1 | ON | ...... | 11.72748GHz | 0x0001 | 0x1000(VIDEO) |
|  |  |  |  | 11.80420GHz |  | 0x1000(AUDIO) |
| 101 | 0x40F2 | OFF |  | 11.76584GHz | 0x0002 | 0x1001(VIDEO) |
|  |  |  |  |  |  | 0x1001(VIDEO) |
| ... | ... | ... | ... | ... | ... | ... |

61 / 62 / 63 / 64 / 65 / 66 / 67

60

FROM NIT — FROM PAT — FROM PMT

F I G. 1 6 PRIOR ART
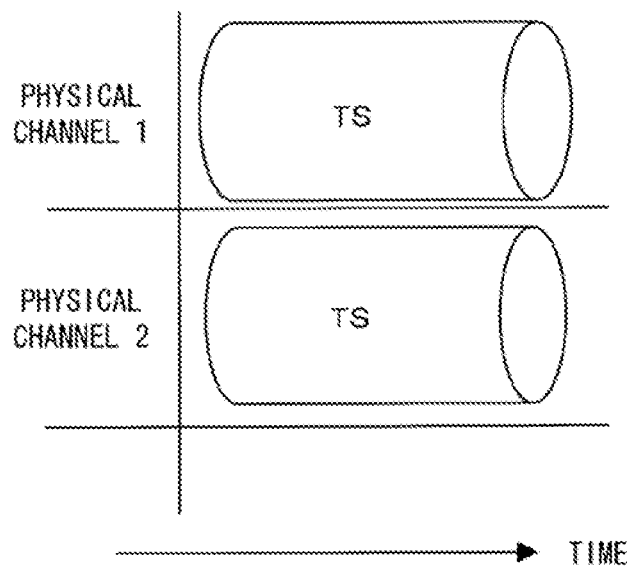
F I G. 1 7 PRIOR ART
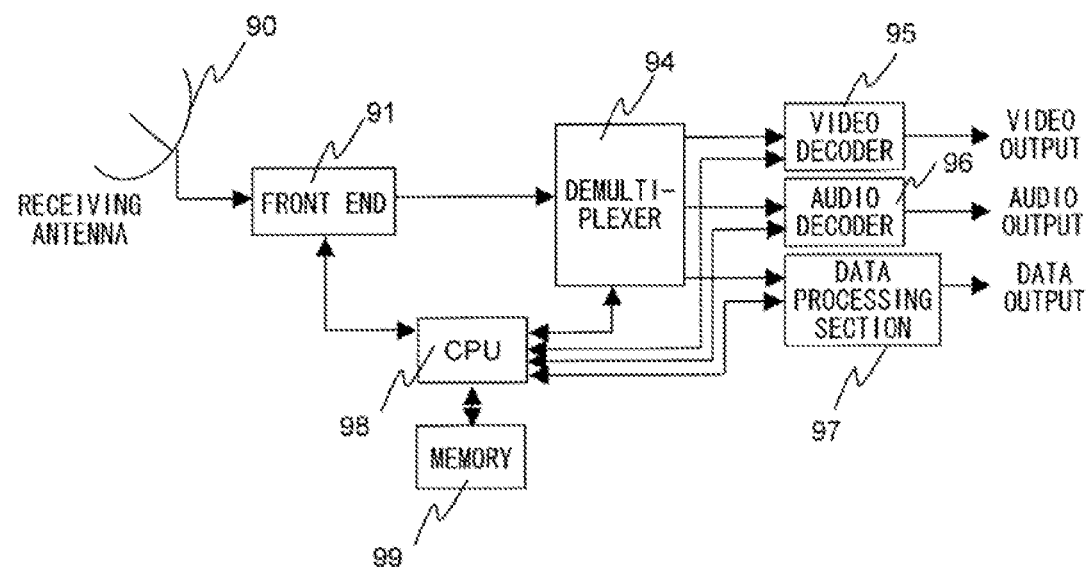

FIG. 21

| PHYSICAL CH. NUMBER | CONNECTION FLAG | CONNECTION TARGET CH. | HIERARCHICAL TRANSMISSION CH. |
|---|---|---|---|
| Ch1 | ON | Ch2 | ON |
| Ch2 | ON | Ch1 | OFF |
| Ch3 | OFF | — | — |
| Ch4 | OFF | — | — |
| ... | ... | ... | ... |

| 2501 BROADCAST PERIOD | 2502 BROADCAST CHANNEL | 2503 PROGRAM IDENTIFICATION INFORMATION | 2504 PROGRAM INFORMATION |
|---|---|---|---|
| 4/5/2008 8:00 PM – 9:00 PM | Ch1,Ch2 | BULK PROGRAM | ... |
| 4/8/2008 9:00 AM – 10:30 PM | Ch4 | NON-BULK PROGRAM | ... |
| ... | ... | ... | ... |

F I G. 33

| PHYSICAL CH. NUMBER | CONNECTION FLAG | CONNECTION TARGET CH. |
|---|---|---|
| Ch1 | ON | Ch2 |
| Ch2 | ON | Ch1 |
| Ch3 | OFF | — |
| Ch4 | OFF | — |
| ... | ... | ... |

3131　　3132　　3133

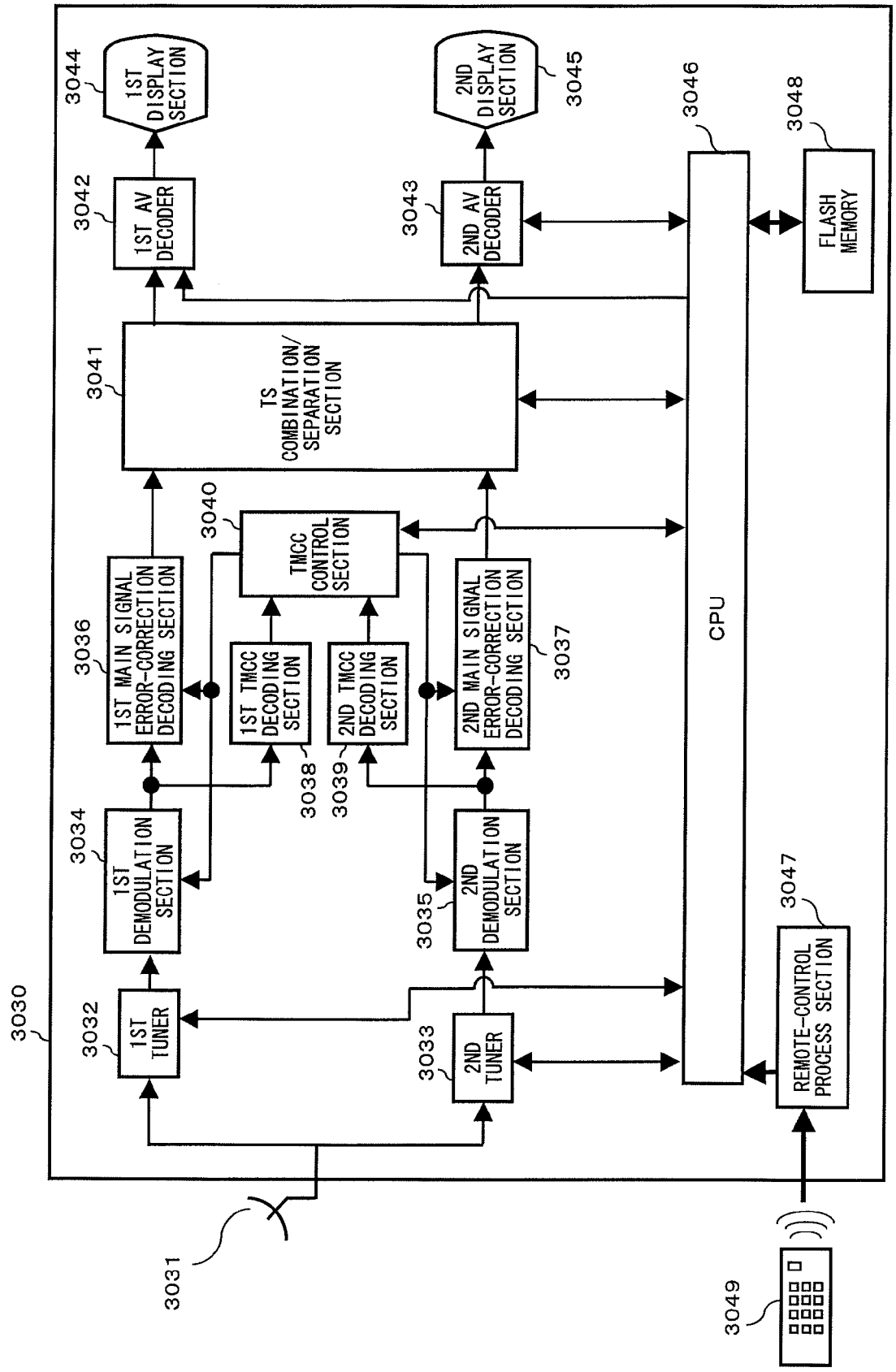
F I G. 34

FIG. 43

| PHYSICAL CH. NUMBER | CONNECTION FLAG | CONNECTION TARGET CH. |
|---|---|---|
| Ch1 | ON | Ch2 |
| Ch2 | ON | Ch1 |
| Ch3 | OFF | — |
| Ch4 | OFF | — |
| ... | ... | ... |

4131　4132　4133

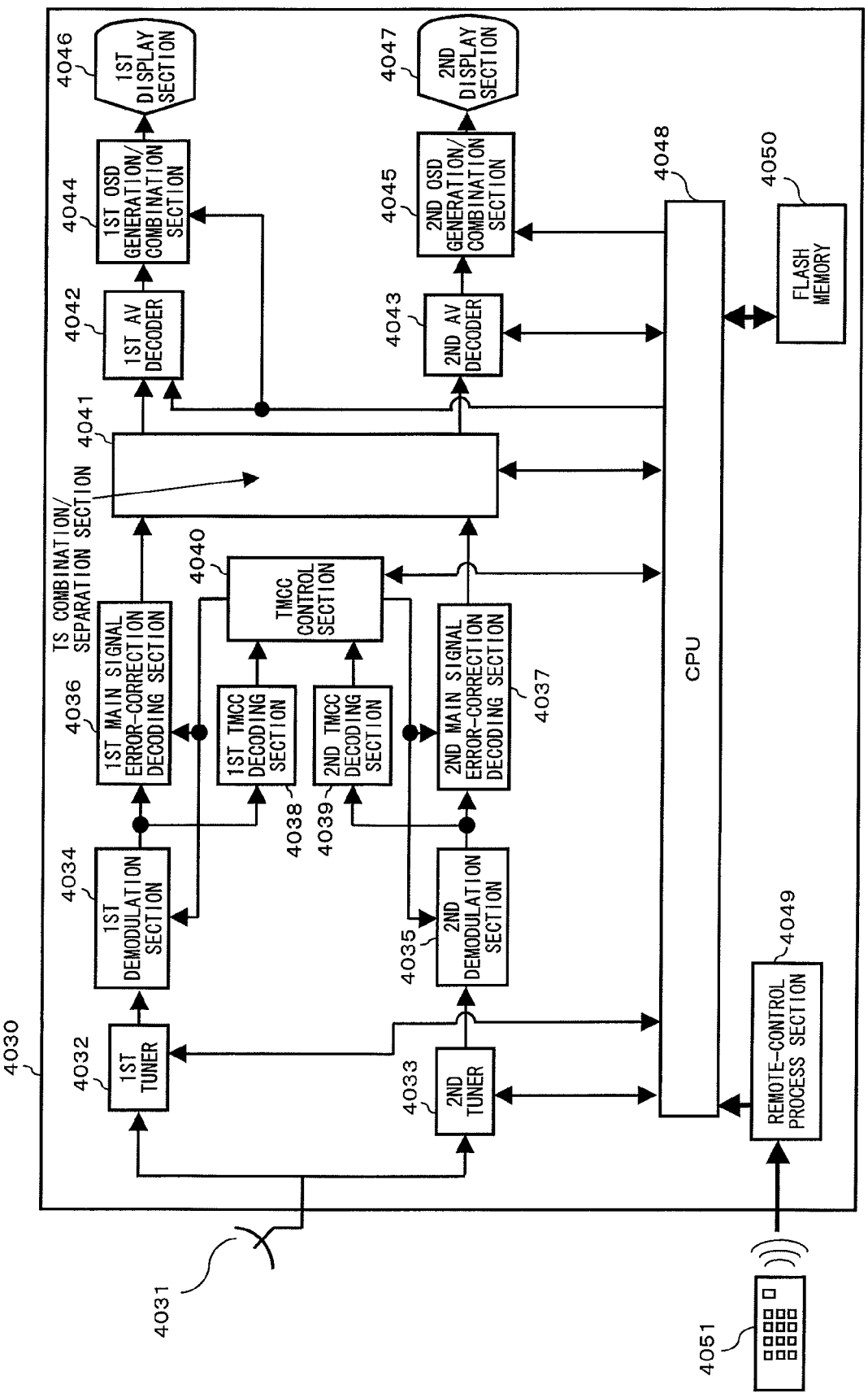
F I G. 44

FIG. 46

| BROADCAST PERIOD | 7 | 8 | 9 | 10 | 11 |
|---|---|---|---|---|---|
| Ch1 | ANIMATION PROGRAM (NON-BULK) | MOVIE PROGRAM (BULK) | | VARIETY PROGRAM (NON-BULK) | ... |
| Ch2 | NEWS PROGRAM (NON-BULK) | | | DRAMA PROGRAM (NON-BULK) | ... |
| ⋮ | ⋮ | ⋮ | ⋮ | ⋮ | ⋮ |

CHANNEL

F I G. 51

| BROADCAST PERIOD | Ch1 | Ch2 | Ch3 |
|---|---|---|---|
| 7 | ANIMATION PROGRAM (NON-BULK) | NEWS PROGRAM (NON-BULK) | SPORTS COVERAGE (NON-BULK) |
| 8 | MOVIE PROGRAM (BULK) | | |
| 9 | VARIETY PROGRAM (NON-BULK) | DRAMA PROGRAM (NON-BULK) | |
| 10 | ... | ... | ... |

CHANNEL

FIG. 54
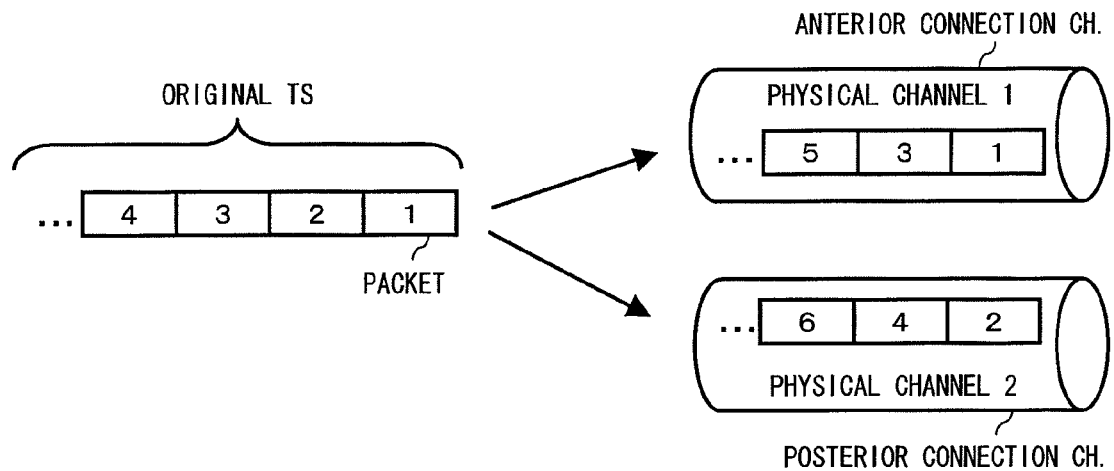
FIG. 55
6015(6016)
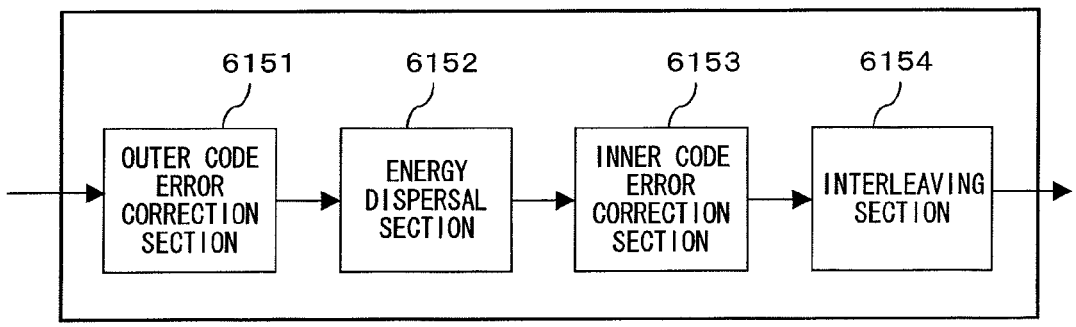
FIG. 56
| PHYSICAL CH. NUMBER 6131 | CONNECTION FLAG 6132 | ANTERIOR CONNECTION CH. 6133 | POSTERIOR CONNECTION CH. 6134 |
|---|---|---|---|
| Ch1 | ON | — | Ch2 |
| Ch2 | ON | Ch1 | — |
| Ch3 | OFF | — | — |
| Ch4 | OFF | — | — |
| ⋮ | ⋮ | ⋮ | ⋮ |

F I G. 6 4
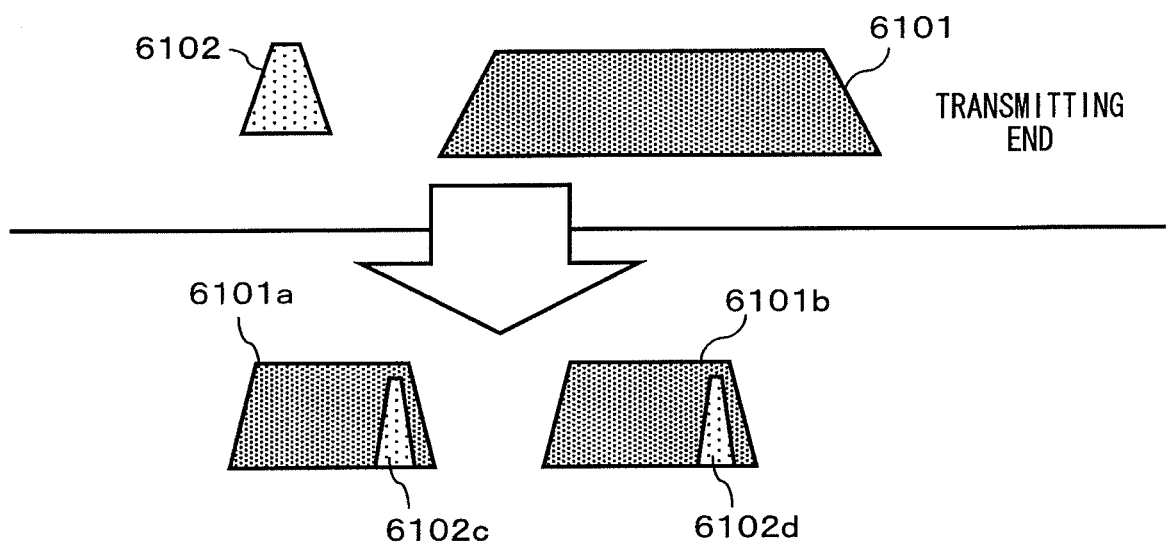

DIGITAL BROADCAST TRANSMISSION DEVICE AND DIGITAL BROADCAST RECEPTION DEVICE

TECHNICAL FIELD

The present invention relates to transmission and reception of digital broadcasting, and more particularly to a technique of transmitting and receiving a transport stream of digital broadcasting.

BACKGROUND ART

In recent years, conventional analog broadcasting is being replaced by digital broadcasting in the practical use of television broadcasting.

Unlike conventional analog broadcasting, digital broadcasting has the features: that it is possible to remove the distinctions between video, audio, various items of data, and the like, and also possible to perform flexible programming; that it is possible to broadcast a large number of programs with high quality in a limited transmission bandwidth; that it is possible to provide hierarchical services in accordance with the priorities; that it is easy to upgrade a broadcast scheme per se; that it is highly interactive; and the like. In digital broadcasting a so-called MPEG (Moving Picture Experts Group)-2 moving image compression/encoding technique is used as a video encoding scheme, and an MPEG-2 system is used as a multiplexing scheme.

The standards of digital broadcasting using MPEG-2 and an MPEG-2 system are already known, and therefore will not be described in detail. Basically, broadcasters each transmit digital broadcasting in the following process. First, a broadcaster digitizes (encodes) signals of video, audio, and the like that form a program. Next, the broadcaster multiplexes the digitized signals into a signal in a form that is suitable for transmission, the form being referred to as a transport stream (hereinafter referred to as a "TS"). Then the broadcaster modulates the TS in a predetermined scheme so as to form a carrier wave, and transmits the carrier wave using one physical channel (transponder). That is, the broadcaster encodes a program into digital signals, multiplexes the digital signals, and transmits the multiplexing result as one TS on one physical channel (see FIG. 16).

Next, a description is given of a digital broadcast reception device (see Patent Document 1, for example) that receives the TS transmitted as described above. FIG. 17 is a block diagram showing an example of the structure of a conventional digital broadcast reception device. The reception device shown in FIG. 17 includes: a front end 91, to which the output of a receiving antenna 90 is input; a demultiplexer 94, to which the output of the front end 91 is input; an MPEG-2 video decoder 95 and an MPEG-2 audio decoder 96, to which the outputs of the demultiplexer 94 are input; and a data processing section 97. This digital broadcast reception device further includes a CPU 98 that controls this whole satellite digital broadcast device. The CPU 98 is connected to a memory 99.

Referring to FIG. 17, the TS received by the receiving antenna 90 is subjected to processes in the front end 91, such as the selection of a receiving transponder, demodulation, and error correction, and then is input to the demultiplexer 94. The TS, which is a stream transmitted in a multiplexing manner, is demultiplexed by the demultiplexer 94 into PSI (Program Specific Information), an MPEG-2 video ES (Elementary Stream), an MPEG-2 audio ES, and a PS (Private Section).

The PSI acquired from the division by the demultiplexer 94 is transmitted to the CPU 98, the MPEG-2 video ES to the MPEG-2 video decoder 95, the MPEG-2 audio ES to the MPEG-2 audio decoder 96, and the PS to the data processing section 97.

The MPEG-2 video decoder 95, the MPEG-2 audio decoder 96, and the data processing section 97 appropriately process the provided MPEG-2 video ES, MPEG-2 audio ES, and PS, and output the signals obtained from the processes of the MPEG-2 video decoder 95, the MPEG-2 audio decoder 96, and the data processing section 97, to the outside of the device through a video output interface, an audio output interface, and a data output interface, which are not shown in the figures, respectively.

The CPU 98 controls the operations of the MPEG-2 video decoder 95, the MPEG-2 audio decoder 96, and the data processing section 97, while using the memory 99. The CPU 98 performs a channel selection operation based on the PSI. Here, items of the PSI are an NIT (Network Information Table), a PAT (Program Association Table), a PMT (Program Map Table), and the like. The NIT has written therein, as channel selection information about all broadcastings on a network: the frequencies of transponders, which are physical channels; the ID of a program belonging to each transponder, i.e., an SID (Service Identifier); and the like. The PAT, defined with respect to each transponder, has written therein, as channel selection information about the transponder: the SID of the program that is currently being broadcast on the transponder; and a PID (Packet Identifier) of the PMT, which is channel selection information about the SID. The PMT, defined with respect to each SID, has written therein, as channel selection information about the SID, ES information and PS information that are included in the SID. The CPU 98 sets, in the demultiplexer 94, the PIDs of the ESs and the PS that are acquired from the PMT included in the PSI, and performs channel selection by assigning the ESs and the PS to the corresponding processing devices of the MPEG-2 video decoder 95, the MPEG-2 audio decoder 96, and the data processing section 97.

As the reception device, a reception device having mounted therein two tuners is also known in recent years. This reception device can separately select different channels with the two tuners, and perform picture-in-picture simultaneous display of different programs having different materials, each created under a so-called Hi-Vision video standard.

Here, a video standard termed so-called Super Hi-Vision emerges in recent years. Super Hi-Vision is a high-definition video system having an amount of information 16 times as much as that of Hi-Vision broadcasting at the maximum, has a bit rate of approximately 24 Gbps, and therefore requires a vast amount of information of 100 to 400 Mbps even if performing compression/encoding in H.264. That is, when, as described above, a video signal is digitized to generate one TS, the amount of information included in the one TS may also increase. As a result, the amount of information to be included in one TS may be such an amount of information that cannot be completely transmitted in the frequency bandwidth (transmission capacity) assigned to each broadcaster, i.e., cannot be completely transmitted on one physical channel (see FIG. 18). That is, when broadcast in the current transmission scheme, a program created under the Super Hi-Vision standard cannot be completely transmitted on one physical channel, due to lack of transmission capacity.

In response, a technique is disclosed in which one content file is converted into a plurality of items of division distribution data and these items are transmitted on a plurality of different transmission paths (see Patent Document 2, for example). Consider the case where digital broadcasting is performed by distributing a Super Hi-Vision program into two items of division distribution data and transmitting these two items using two different physical channels. In this case, when an attempt is made to view this program with Super Hi-Vision video at the reception device end, the two physical channels are selected using two tuners, respectively, and thereby the items of division distribution data are received. In addition, the reception device requires a function of combining the received items of division distribution data and reconstructing the original Super Hi-Vision program.

Patent Document 1: Japanese Laid-Open Patent Publication No. 11-275476

Patent Document 2: International Application Published under the Patent Cooperation Treaty No. 01/056244

DISCLOSURE OF THE INVENTION

Problems to be Solved by the Invention

However, the broadcast transmission/reception methods described above have the following problems.

For example, in the case where: a single program (TS) of the Super Hi-Vision standard is divided; the divided TSs are transmitted using a plurality of physical channels; these channels are simultaneously received at the receiver end; and thereby one program is reproduced, and if all the broadcastings are performed under the Super Hi-Vision standard described above, an existing receiver (e.g., a single tuner device) that is incapable of simultaneously receiving a plurality of channels cannot allow any of these programs to be viewed.

Therefore an object of the present invention is to provide a digital broadcast transmission device, a digital broadcast reception device, and a digital broadcasting system that are capable of transmitting a program formed of video and audio signals having such a vast amount of information that cannot be completely transmitted on one physical channel, and capable of allowing the program to be viewed.

Further, in order to receive and view a Super Hi-Vision program in the reception device described above having mounted therein the two tuners, the two tuners need to select the two physical channels. Thus it is impossible to allow both the Super Hi-Vision program to be viewed and another program to be recorded (i.e., record another program on another channel). For example, if the reception and viewing of a Super Hi-Vision program is prioritized while a Hi-Vision program is being recorded (i.e., while only one tuner is being used), the recording process stops so that both two tuners are used to view the Super Hi-Vision program. On the other hand, if the recording process is prioritized, the Super Hi-Vision program cannot be viewed at all.

Therefore another object of the present invention is to provide a digital broadcast reception device capable of both allowing a program to be viewed that is compatible with transmission on a plurality of physical channels and recording a given program.

Further, the reception device described above having the two tuners and the function of combining and reconstructing the items of data received on the respective channels may receive a moving image content transmitted on two physical channels and allow the content to be viewed. However, the separate selection of two physical channels using two tuners also means that it is necessary to perform channel selection twice so as to view one moving image content (program). That is, it is necessary to perform the steps of: (1) the viewer's channel selection instruction operation; (2) a first-channel selection process; (3) a second-channel selection process; and (4) starting the combination/reproduction process of the items of data received on the respective channels and starting the output of the moving image. Therefore, due to the process of selecting the second channel, it takes longer to actually display the moving image after the channel selection instruction operation is performed than the conventional case where one moving image content is transmitted on only one physical channel.

Therefore yet another object of the present invention is to provide a digital broadcast reception device that is capable of reducing the time from when a channel selection operation is performed to when the image is displayed, the digital broadcast reception device receiving one moving image content subjected to bulk transmission using a plurality of physical channels.

Further, as described above, it may be possible to receive, with a double tuner, a Super Hi-Vision program transmitted on two physical channels, make a combination, and thereby view the Super Hi-Vision program. However, as a reception/reproduction process of the program, a process is assumed of selecting channels by the double tuner, making a combination, and reproducing one program. That is, two tuners are present for the reproduction of one program, i.e., the device becomes a viewing device exclusively used for a Super Hi-Vision program transmitted on two channels, and therefore cannot perform picture-in-picture simultaneous display of different programs as described above.

Therefore yet another object of the present invention is to provide a digital broadcast reception device having two tuners that is capable of both receiving/reproducing a program subjected to bulk transmission on two channels and receiving/reproducing a program transmitted on one channel.

Further, the receiver described above having the two tuners and the combination/reconstruction function may receive a moving image content and allow the content to be viewed. However, in order to congruously view a moving image content having high image quality and high capacity at the receiver end, a high transmission quality is required so that no pieces of data are missing. That is, it is considered that when the transmission quality has deteriorated, the moving image content cannot be completely reconstructed at the receiver end, due to missing pieces of data of the moving image content. As a result, the video and audio of the moving image content may be interrupted or disrupted at the time of viewing, and thus it is impossible for the viewer to continue comfortable viewing.

Therefore yet another object of the present invention is to provide a digital broadcast transmission/reception system and transmission/reception devices that are capable of, when a content having a vast amount of information is transmitted using a plurality of transmission paths, continuing congruous viewing of the content even if the transmission quality has deteriorated.

Solution to the Problems

The present invention has the following features to attain the object described above. Note that in this section, reference numerals, supplemental descriptions, and the like in parentheses merely indicate correspondence with the embodiments described below so as to assist understanding of the present invention, and do not limit the present invention in any way.

A first aspect is a digital broadcast transmission device for transmitting on a plurality of physical channels a bit stream (i.e., a transport stream) having a digital broadcast program and information related to the digital broadcast program, the digital broadcast transmission device including: channel combination information generation means (14, 18) for generating channel combination information associating the plurality of physical channels with each other; transmission means (15, 16, 17, 18) for dividing the bit stream into a plurality of bit streams and transmitting the divided bit streams with the channel combination information on the plurality of physical channels, respectively; light bit stream generation means (71, 72, 73, 74) for generating a light bit stream having a program that is the same in material as the digital broadcast program transmitted as the bit streams by the transmission means and being smaller in amount of information than the bit streams transmitted by the transmission means; and simultaneous transmission means (76, 77) for transmitting the light bit stream on a single physical channel simultaneously with the bit streams transmitted by the transmission means, the single physical channel being different from the physical channels used by the transmission means to transmit the bit streams.

Based on the first aspect, it is possible to transmit a television program having such a large amount of information that cannot be completely transmitted on one physical channel. Further, it is possible to prevent the case where a conventional reception device cannot allow broadcasting to be viewed at all.

In a second aspect, according to the first aspect, the simultaneous transmission means transmits simultaneous broadcast information with the light bit stream, the simultaneous broadcast information representing whether or not the bit streams are transmitted on the plurality of physical channels by the transmission means simultaneously with the light bit stream.

In a third aspect, according to the first aspect, the information related to the digital broadcast program is service information having written therein what program is present in the bit stream; and the transmission means includes a channel combination information addition means for adding the channel combination information to the service information.

Based on the second and third aspects, it is possible to obtain a similar effect to that of the first aspect.

A fourth aspect is a digital broadcast reception device having a plurality of front ends (32) for receiving and demodulating broadcast waves transmitted from a digital broadcast transmission device for transmitting on a plurality of physical channels bit streams having a digital broadcast program and information related to the digital broadcast program, the reception device including: judgment means (81) for judging whether or not a program is present that is the same in material as a program formed of a broadcast wave received on a single physical channel and that is transmitted on the plurality of physical channels simultaneously with the program transmitted on the single physical channel, the plurality of physical channels being different from the single physical channel; simultaneous channel-selection/demodulation means (32, 35) for selecting the plurality of physical channels using the plurality of front ends based on channel combination information associating the plurality of physical channels with each other, and for demodulating the broadcast waves received on the plurality of physical channels, respectively; combination means (33) for combining the bit streams obtained from the demodulation performed by the simultaneous channel-selection/demodulation means; and output means (33) for outputting the combined bit stream. When the judgment means judges that a program is present that is simultaneously transmitted on the plurality of physical channels, the simultaneous channel-selection/demodulation means selects the plurality of physical channels. The combination means combines, based on the channel combination information, the bit streams obtained from the demodulation performed by the simultaneous channel-selection/demodulation means.

Based on the fourth aspect, it is possible to receive and combine one television program having a large amount of information that is transmitted on a plurality of physical channels. Further, when a program formed of a bit stream having a large amount of information and a program formed of a bit stream having a small amount of information are simultaneously transmitted, it is possible to receive and reproduce the program formed of a bit stream having a large amount of information. Furthermore, it is possible to properly use a variety of methods as a method of combining channels.

In a fifth aspect, according to the fourth aspect, the channel combination information is included in service information having written therein what program is present in the bit streams; and the reception device further includes determination means for determining, based on the channel combination information included in the service information, whether or not a program selected to be viewed is the program transmitted on the plurality of physical channels. When the determination means determines that the program to be viewed is transmitted on the plurality of physical channels, the simultaneous channel-selection/demodulation means selects the plurality of physical channels based on the channel combination information.

Based on the fifth aspect, it is possible to obtain a similar effect to that of the fourth aspect.

A sixth aspect is a digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted, and on at least one of the physical channels on which the bulk program is transmitted, a lower-layer program is subjected to hierarchical transmission, the lower-layer program being the same in program material as the bulk program and different in video standard from the bulk program. The digital broadcast reception device includes: a plurality of tuners (2032, 2033); operation reception means (2048, 2049) for receiving a predetermined operation from a user; channel selection instruction means (2048) for, based on the operation received by the operation reception means, causing the tuners to select physical channels specified by the user; bulk channel detection means (2040, 2048) for detecting, based on the control information, whether or not the bulk program is transmitted on the physical channel selected in accordance with the channel selection instruction means; tuner usage detection means (2048) for, when the bulk channel detection means detects that the bulk program is transmitted, detecting usages of the plurality of tuners; receivability determination means (2048) for detecting, based on the detection result of the tuner usage detection means, whether or not, among the plurality of tuners, a sufficient number of tuners are available for selecting all the plurality of physical channels used for bulk transmission of the bulk program detected by the bulk channel detection means; and program reproduction means (2041, 2042, 2043, 2048) for, when the receivability determination means determines that a sufficient number of tuners are available for selecting all the plurality of physical channels used for the bulk transmission, performing a process of reproducing the bulk program detected by the bulk channel detection means and for, when the receivability determination means determines that a sufficient number of tuners are not available for selecting all the plurality of physical channels used for the bulk transmission, performing a process of reproducing the lower-layer program subjected to hierarchical transmission with the bulk program.

Based on the sixth aspect, it is possible to allow both a program corresponding to the transmission of a plurality of physical channels to be viewed and a given program to be recorded.

In a seventh aspect, according to the sixth aspect, the receivability determination means determines that, among the plurality of tuners, a tuner having selected, for recording, a physical channel different from the physical channels on which the bulk program is transmitted is not available.

Based on the seventh aspect, it is possible to obtain a similar effect to that of the sixth aspect.

In an eighth aspect, according to the sixth aspect, the digital broadcast reception device further includes OSD display means (2044, 2045) for performing OSD. When the program reproduction means performs the process of reproducing the lower-layer program subjected to the hierarchical transmission with the bulk program, the OSD display means outputs to a screen an OSD indicating that the lower-layer program is to be reproduced.

Based on the eighth aspect, it is possible to allow the user to understand a viewing condition with ease.

In a ninth aspect, according to the sixth aspect, the digital broadcast reception device further includes: timer-recording means (2048, 2054) for, based on the operation received by the operation reception means, registering timer-recording information including at least a broadcast period of a predetermined program to be broadcast, a physical channel on which the predetermined program is broadcast, and the identification information; timer-recording information storage means (2050) for storing the timer-recording information; conflicting program detection means (2048) for detecting, based on the timer-recording information stored in the timer-recording information storage means, whether or not a timer-recording setting of a conflicting program, whose broadcast period conflicts with a broadcast period of the program to be registered by the timer-recording means, has already been made; and timer-recording content change means (2048) for, when at least one of the program to be registered by the timer-recording means and the conflicting program is the bulk program, registering a timer-recording setting of the bulk program as a timer-recording setting of the lower-layer program.

In a tenth aspect, according to the ninth aspect, when the conflicting program is the bulk program, the timer-recording content change means changes the timer-recording setting of the conflicting program to a timer-recording setting of the lower-layer program.

In an eleventh aspect, according to the ninth aspect, when the program to be registered by the timer-recording means is the bulk program, the timer-recording content change means registers a timer-recording setting of the program to be registered by the timer-recording means as a timer-recording setting of the lower-layer program.

In a twelfth aspect, according to the ninth aspect, when both the program to be registered by the timer-recording means and the conflicting program are the bulk program, the timer-recording content change means registers timer-recording settings of both programs each as a timer-recording setting of the lower-layer program.

Based on the ninth through twelfth aspects, it is possible to prevent the case where a bulk program cannot be recorded. Further, it is possible to prevent the case where the timer-recording setting of a non-bulk program or the like cannot be made due to a bulk program that already has a timer-recording setting made. This makes it possible to improve the convenience of the digital broadcast reception device.

A thirteenth aspect is a digital broadcast reception device for receiving a digital broadcast signal transmitted from a transmission device, the digital broadcast signal representing a bulk program, a non-bulk program, and control information, the bulk program being a program subjected to bulk transmission using a plurality of physical channels, the non-bulk program being a program transmitted using a single physical channel, the control information including at least identification information identifying whether a program that is broadcast is the bulk program or the non-bulk program and bulk-channel information indicating physical channel numbers of the plurality of physical channels forming the bulk program, the digital broadcast reception device including: a first tuner (3032) and a second tuner (3033), each for receiving the digital broadcast signal by selecting a predetermined physical channel; broadcast type determination means (3046) for determining, based on the control information, whether a program that is being transmitted as the digital broadcast signal received by the first tuner is the bulk program or the non-bulk program; bulk program search means (3046) for searching information about the bulk program that is being broadcast or that is to be broadcast; channel selection control means (3046) for controlling channel selection operations performed by the first tuner and the second tuner; and program reproduction/output means (3041, 3042, 3043) for, based on the digital broadcast signal transmitted on the physical channel selected by at least one of the first tuner and the second tuner, reproducing the bulk program or the non-bulk program and for outputting the reproduced program to a screen. When the broadcast type determination means determines that the program that is being transmitted on the physical channel selected by the first tuner is the bulk program, the channel selection control means, based on the bulk-channel information, causes the first tuner and the second tuner to select the plurality of physical channels forming the bulk program, combines the digital broadcast signals received by both tuners, and outputs the combined broadcast signal to the program reproduction/output means. When the broadcast type determination means determines that the program that is being transmitted on the physical channel selected by the first tuner is the non-bulk program, the channel selection control means outputs to the program reproduction/output means the digital broadcast signal obtained through the first tuner, causes the bulk program search means to search for the physical channels on which the bulk program is being broadcast, and causes the second tuner to select one of the physical channels searched for by the bulk program search means.

Based on the thirteenth aspect, when the first tuner selects a non-bulk program, the second tuner selects a physical channel of a bulk program in advance. This makes it possible, when the user selects a channel of the bulk program, to reduce the latency from when the channel selection operation is performed to when the bulk program is actually displayed on the screen.

In a fourteenth aspect, according to the thirteenth aspect, the control information includes the identification information about all channels and the bulk-channel information about all channels. The bulk program search means, based on the identification information, searches for the bulk program that is being broadcast.

Based on the fourteenth aspect, during the period when the user is viewing a non-bulk program, it is possible to cause the second tuner to select a channel of a bulk program that is being broadcast on another channel. This makes it possible, when the bulk program is selected due to the user's zapping operation, reduce the latency from when the channel selection operation is performed to when the bulk program is actually displayed on the screen.

In a fifteenth aspect, according to the thirteenth aspect, the digital broadcast reception device further includes EPG acquisition means (3061) for acquiring an EPG. The bulk program search means, based on the EPG, searches for the physical channel numbers of the bulk program that is being broadcast or that is to be broadcast.

In a sixteenth aspect, according to the fifteenth aspect, the bulk program search means, based on the EPG, searches for the physical channel numbers of the bulk program to be broadcast within a predetermined time.

Based on the fifteenth and sixteenth aspects, with the use of an EPG, it is possible to cause the second tuner to select ahead a physical channel of a bulk program that is being broadcast or that is to be broadcast. This makes it possible, when the user selects a physical channel of the bulk program, to reduce the latency from when the channel selection operation is performed to when the bulk program is actually displayed on the screen.

In a seventeenth aspect, according to the thirteenth aspect, on each of the physical channels on which the bulk program is transmitted, a lower-layer program is subjected to hierarchical transmission, the lower-layer program being the same in program material as the bulk program and different in video standard from the bulk program. When the broadcast type determination means determines that the program on the physical channel selected by the first tuner is the bulk program, the channel selection control means outputs, to the program reproduction/output means, data forming the lower-layer program included in the digital broadcast signal received by the first tuner, combines the digital broadcast signals received by both tuners, and outputs the combined broadcast signal to the program reproduction/output means.

Based on the seventeenth aspect, after the channel selection operation for a channel of a bulk program is performed, it is possible to reduce the time when video is not displayed on the screen.

In an eighteenth aspect, according to the seventeenth aspect, the digital broadcast reception device further includes: OSD combination means (3051) for combining the output from the program reproduction/output means with a predetermined OSD and outputting the combined result to the screen; and OSD operation reception means (3047) for receiving a predetermined operation input in response to the OSD. After the channel selection control means outputs the data forming the lower-layer program to the program reproduction/output means, the OSD combination means generates, as the OSD, a message as to whether or not to switch to a reproduction of the bulk program, and outputs the message to the screen. After the OSD combination means displays the message, the channel selection control means acquires from the OSD operation reception means an operation input in response to the message, causes, based on the operation input, the first tuner and the second tuner to select the plurality of physical channels forming the bulk program, combines the digital broadcast signals received by both tuners, and outputs the combined broadcast signal to the program reproduction/output means.

Based on the eighteenth aspect, after the channel selection operation for a channel of a bulk program is performed, it is possible to reduce the time when video is not displayed on the screen. Further, since an inquiry is made to the user as to whether or not to switch the display of a lower-layer program to that of a bulk program, which is different in video standard from the lower-layer program, it is possible to allow the user to recognize that the displayed program (the program that is being broadcast) is a bulk program having higher image quality.

In a nineteenth aspect, according to one of the fifteenth through seventeenth aspects, the bulk program is a program created under a Super Hi-Vision standard; and the non-bulk program is a program created under a Hi-Vision standard or an SD standard.

Based on the nineteenth aspect, when the user views a program created under the Super Hi-Vision standard, it is possible to reduce the latency from when the channel selection operation is performed to when the Super Hi-Vision program is actually displayed on the screen.

In a twentieth aspect, according to the seventeenth aspect, the bulk program is a program created under a Super Hi-Vision standard; and the lower-layer program is a program created under a Hi-Vision standard or an SD standard.

Based on the twentieth aspect, after the user selects a channel on which a program created under the Super Hi-Vision standard is broadcast, it is possible to reduce the time when video is not displayed on the screen.

A twenty-first aspect is a digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted, the digital broadcast reception device including: a plurality of tuners (4032, 4033), each for receiving the digital broadcast signal by selecting a predetermined physical channel; bulk channel detection means (4040, 4048) for detecting, based on the control information, whether or not the bulk program is transmitted on one of the physical channels selected by the plurality of tuners; program reproduction means (4041, 4042, 4043, 4048) for, based on the detection result of the bulk channel detection means, switching a reproduction process mode between a first reproduction process mode and a second reproduction process mode, the first reproduction process mode reproducing the bulk program from the digital broadcast signals received by causing the plurality of tuners to select the plurality of physical channels on which the bulk program is transmitted, the first reproduction process mode outputting the reproduced bulk program, the second reproduction process mode reproducing the non-bulk program from the digital broadcast signal received by causing a single tuner among the plurality of tuners to select the physical channel on which the non-bulk program is transmitted, the second reproduction process mode outputting the reproduced non-bulk program; and at least one output section (4042, 4043) for outputting to a predetermined screen or a predetermined storage medium the bulk program or the non-bulk program output from the program reproduction means. When the bulk channel detection means detects that the bulk program is transmitted on one of the physical channels selected by the tuners, the program reproduction means switches the reproduction process mode to the first reproduction process mode; and when the bulk channel detection means detects that the bulk program is not transmitted on one of the physical channels selected by the tuners, the program reproduction means switches the reproduction process mode to the second reproduction process mode.

Based on the twenty-first aspect, it is possible to provide a convenient reception device that allows both a bulk program and a non-bulk program to be viewed.

In a twenty-second aspect, according to the twenty-first aspect, the digital broadcast reception device further includes: OSD generation means (4044, 4045) for generating an OSD content, the OSD content being a content to be displayed as an OSD; and OSD display means (4044, 4045) for performing OSD of the display content generated by the OSD generation means. When the bulk channel detection means detects that the bulk program is transmitted on one of the physical channels selected by the tuners, the OSD generation means generates a predetermined message as the OSD content and outputs the generated message to the OSD display means.

Based on the twenty-second aspect, it is possible to allow the user to recognize whether or not the program to be viewed is a bulk program, and therefore possible to improve the convenience of the digital broadcast reception device.

In a twenty-third aspect, according to the twenty-second aspect, the digital broadcast reception device further includes a reproducibility determination means for, when the bulk channel detection means detects that the bulk program is transmitted on one of the physical channels selected by the tuners, determining whether or not it is possible for the digital broadcast reception device to reproduce the bulk program. When the reproducibility determination means determines that it is impossible to reproduce the bulk program, the OSD generation means generates as the OSD content a message indicating that it is impossible to reproduce the bulk program.

Based on the twenty-third aspect, when a bulk program cannot be reproduced, it is possible to prevent a false impression from being given that a failure has occurred.

In a twenty-fourth aspect, according to the twenty-first aspect, on at least one of the physical channels on which the bulk program is transmitted, a lower-layer program is subjected to hierarchical transmission, the lower-layer program being the same in program material as the bulk program and different in video standard from the bulk program. The digital broadcast reception device includes a plurality of the output sections. The program reproduction means reproduces the bulk program from the digital broadcast signals received by causing the plurality of tuners to select the plurality of physical channels on which the bulk program is transmitted, outputs the reproduced bulk program to one of the plurality of the output sections, and further includes a third reproduction process mode for reproducing the lower-layer program and outputting the reproduced lower-layer program to another one of the plurality of the output sections that is different from the output section to which the bulk program is output. When the bulk channel detection means detects that the bulk program is transmitted on one of the physical channel selected by the tuners or when a predetermined operation signal is transmitted from a user while the bulk program is being reproduced in the first reproduction process mode, the program reproduction means switches the reproduction process mode to the third reproduction process mode.

Based on the twenty-fourth aspect, it is possible to simultaneously output a bulk program and a lower-layer program, and therefore possible to provide a convenient reception device.

In a twenty-fifth aspect, according to the twenty-fourth aspect, when outputting the lower-layer program in the third reproduction process mode, the program reproduction means outputs the lower-layer program to a predetermined storage medium used to record the lower-layer program.

Based on the twenty-fifth aspect, it is possible to use a structure used to record a non-bulk program, and therefore possible to provide, at low cost, a reception device that allows a bulk program to be viewed and a program having the same material as that of the bulk program to be recorded.

A twenty-sixth aspect is a digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted, and on at least one of the physical channels on which the bulk program is transmitted, a lower-layer program is subjected to hierarchical transmission, the lower-layer program being the same in program material as the bulk program and different in video standard from the bulk program. The digital broadcast reception device includes: at least one tuner for receiving the digital broadcast signal by selecting one of the physical channels; bulk channel detection means for detecting whether or not the bulk program is transmitted on the selected physical channel; program reproduction means for, based on the detection result of the bulk channel detection means, switching a reproduction process mode between a first reproduction process mode and a second reproduction process mode, the first reproduction process mode reproducing the lower-layer program from the digital broadcast signal received by selecting, among the plurality of physical channels on which the bulk program is transmitted, the physical channel used for the hierarchical transmission of the lower-layer program, the first reproduction process mode outputting the reproduced lower-layer program, the second reproduction process mode reproducing the non-bulk program from the digital broadcast signal received by selecting the physical channel on which the non-bulk program is transmitted, the second reproduction process mode outputting the reproduced non-bulk program; channel storage means for storing therein a physical channel number of the physical channel that is selected by the tuner; and an output section for outputting to a predetermined screen or a predetermined storage medium the lower-layer program or the non-bulk program output from the program reproduction means. When the reproduction process mode is the second reproduction process mode and the bulk channel detection means detects that the bulk program is transmitted, the program reproduction means, after storing in the channel storage means the physical channel number of the physical channel that is selected at that time, selects the physical channel used for the hierarchical transmission of the lower-layer program, and switches the reproduction process mode to the first reproduction process mode; and when a broadcast of the lower-layer program ends, the program reproduction means selects the physical channel number stored in the channel storage means, and switches the reproduction process mode to the second reproduction process mode.

Based on the twenty-sixth aspect, it is possible to provide a digital broadcast reception device having a single-tuner structure that allows a program having the same material as that of a program subjected to bulk transmission to be viewed, and that can further reduce the cost.

A twenty-seventh aspect is a digital broadcast transmission device for generating broadcast data based on program data that forms a digital broadcast content, dividing the generated broadcast data, and transmitting the divided broadcast data on a plurality of physical channels, the digital broadcast transmission device including: first encoding means (6011) for generating first broadcast data by performing a predetermined encoding process on the program data that forms the digital broadcast content; second encoding means (6012) for generating second broadcast data by performing on the program data a different encoding process from the encoding process performed by the first encoding means, the second broadcast data being capable of being transmitted in a transmission capacity of one physical channel; and a transmission section (6013-6020) for dividing the first broadcast data and transmitting the divided first broadcast data on a plurality of physical channels. On at least one of the plurality of physical channels, the transmission section performs hierarchical transmission of the first broadcast data and the second broadcast data.

Based on the twenty-seventh aspect, even when the transmission quality deteriorates while a moving image content having a large amount of information is transmitted using a plurality of physical channels, it is possible to allow the user to continue congruous viewing of the moving image content per se without causing disruption of video and audio.

In a twenty-eighth aspect, according to the twenty-seventh aspect, the transmission section performs the hierarchical transmission using a physical channel whose frequency is lowest among the plurality of physical channels.

Based on the twenty-eighth aspect, since the lower the frequency of the physical channel, the more stable the transmission path, it is possible to transmit second broadcast data with more certainty, and therefore possible to ensure the continuation of viewing of a moving image content.

In a twenty-ninth aspect, according to the twenty-seventh aspect, the first encoding means encodes program data whose video standard is Super Hi-Vision video. The second encoding means encodes program data whose video standard is one of Hi-Vision video and SD video.

Based on the twenty-ninth aspect, even a reception device incompatible to the Super Hi-Vision standard allows a content having the same material as that of a content of the Super Hi-Vision standard to be viewed.

A thirtieth aspect is a digital broadcast reception device for receiving, from a digital broadcast transmission device, broadcast data generated based on program data that forms a digital broadcast content to be divided and transmitted on a plurality of physical channels by the digital broadcast transmission device and for reproducing the program data, and on at least one of the plurality of physical channels, first broadcast data and second broadcast data that are different in video standards from each other are subjected to hierarchical transmission. The digital broadcast reception device includes: reception means (6032-6040) for receiving the first broadcast data and the second broadcast data by simultaneously selecting the plurality of physical channels; transmission quality detection means (6041, 6042, 6051, 6052) for detecting transmission qualities of the plurality of physical channels on which the first broadcast data is transmitted; and reproduction output means for reproducing the program data by performing a decoding process on the first broadcast data. When the transmission quality detection means detects that one of the transmission qualities of the plurality of physical channels on which the first broadcast data is transmitted has fallen below a predetermined threshold, the reproduction output means performs a decoding process on the second broadcast data subjected to the hierarchical transmission and reproduces the program data obtained from the decoding process.

Based on the thirtieth aspect, it is possible to obtain a similar effect to that of the first aspect.

In a thirty-first aspect, according to the twenty-ninth aspect, the transmission quality detection means detects a received CNR of each of the plurality of physical channels on which the first broadcast data is transmitted. When one of the received CNRs of the plurality of physical channels that are detected by the transmission quality detection means has fallen below a predetermined threshold, the reproduction output means performs the decoding process on the second broadcast data and reproduces the program data obtained from the decoding process.

In a thirty-second aspect, according to the thirty-first aspect, the transmission quality detection means detects a bit error rate of each of the plurality of physical channels on which the first broadcast data is transmitted. When one of the bit error rates of the plurality of physical channels that are detected by the transmission quality detection means has exceeded a predetermined threshold, the reproduction output means performs the decoding process on the second broadcast data and reproduces the program data obtained from the decoding process.

Based on the thirty-first and thirty-second aspects, it is possible to simply and accurately detect deterioration of the transmission quality, and therefore possible to switch the reproduction of the first broadcast data to the reproduction of the second broadcast data at a more appropriate time.

In a thirty-third aspect, according to the thirtieth aspect, on all of the plurality of physical channels, the first broadcast data and the second broadcast data are subjected to hierarchical transmission. When the transmission quality detection means detects that one of the transmission qualities of the plurality of physical channels on which the first broadcast data is transmitted has fallen below the predetermined threshold, the reproduction output means performs the decoding process on the second broadcast data subjected to the hierarchical transmission using a physical channel whose transmission quality is highest among the plurality of physical channels, and reproduces the program data obtained from the decoding process.

Based on the thirty-third aspect, when the transmission quality has deteriorated while the first broadcast data is being reproduced, it is possible to reproduce the second broadcast data on the physical channel of the better transmission quality selected between the plurality of physical channels.

Effect of the Invention

Based on the present invention, it is possible to transmit and receive digital broadcasting that includes video and audio signals having such a large amount of information that cannot be completely transmitted on one physical channel.

Based on the present invention, it is possible to both a program corresponding to bulk transmission to be viewed and a given program to be recorded.

Based on the present invention, it is possible to reduce the time from when a user selects a physical channel on which a bulk program is broadcast to when the video and audio of the program are actually output.

Based on the present invention, it is possible to provide a convenient reception device that allows both a bulk program and a non-bulk program to be viewed.

Based on the present invention, even when the transmission quality deteriorates while a moving image content having a large amount of information is transmitted using a plurality of physical channels, it is possible to allow the user to continue congruous viewing of the moving image content per se without causing interruption or disruption of video and audio.

BRIEF DESCRIPTION OF THE DRAWINGS

FIG. 1 is a diagram showing an example of the structure of a digital broadcasting system according to a first embodiment.

FIG. 8 is an example of the data structure of a channel selection table 60.

FIG. 16 is a diagram showing the concept of the transmission of a transport stream.

FIG. 17 is a diagram showing the structure of a conventional digital broadcast reception device.

FIG. 21 is a diagram showing an example of bulk-related information.

FIG. 24 is an example of a timer-recording setting list 2500 stored in a flash memory 2050.

FIG. 33 is a diagram showing an example of bulk-related information.

FIG. 34 is a functional block diagram showing the structure of a reception device 3030 according to the seventh embodiment of the present invention.

FIG. 43 is a diagram showing an example of bulk-related information.

FIG. 44 is a functional block diagram showing the structure of a reception device 4030 according to the tenth embodiment of the present invention.

FIG. 46 is an example of a broadcast schedule for describing the present embodiment.

FIG. 51 is an example of a program schedule.

FIG. 54 is a diagram illustrating a sorting method of higher-layer packets.

FIG. 55 is a block diagram showing details of a first main signal error-correction coding section 6015.

FIG. 56 is a diagram showing an example of bulk-transmission-related information.

FIG. 64 is a schematic diagram showing the case where one lower-layer AV stream is sorted into two channels for transmission.

Figure 2:
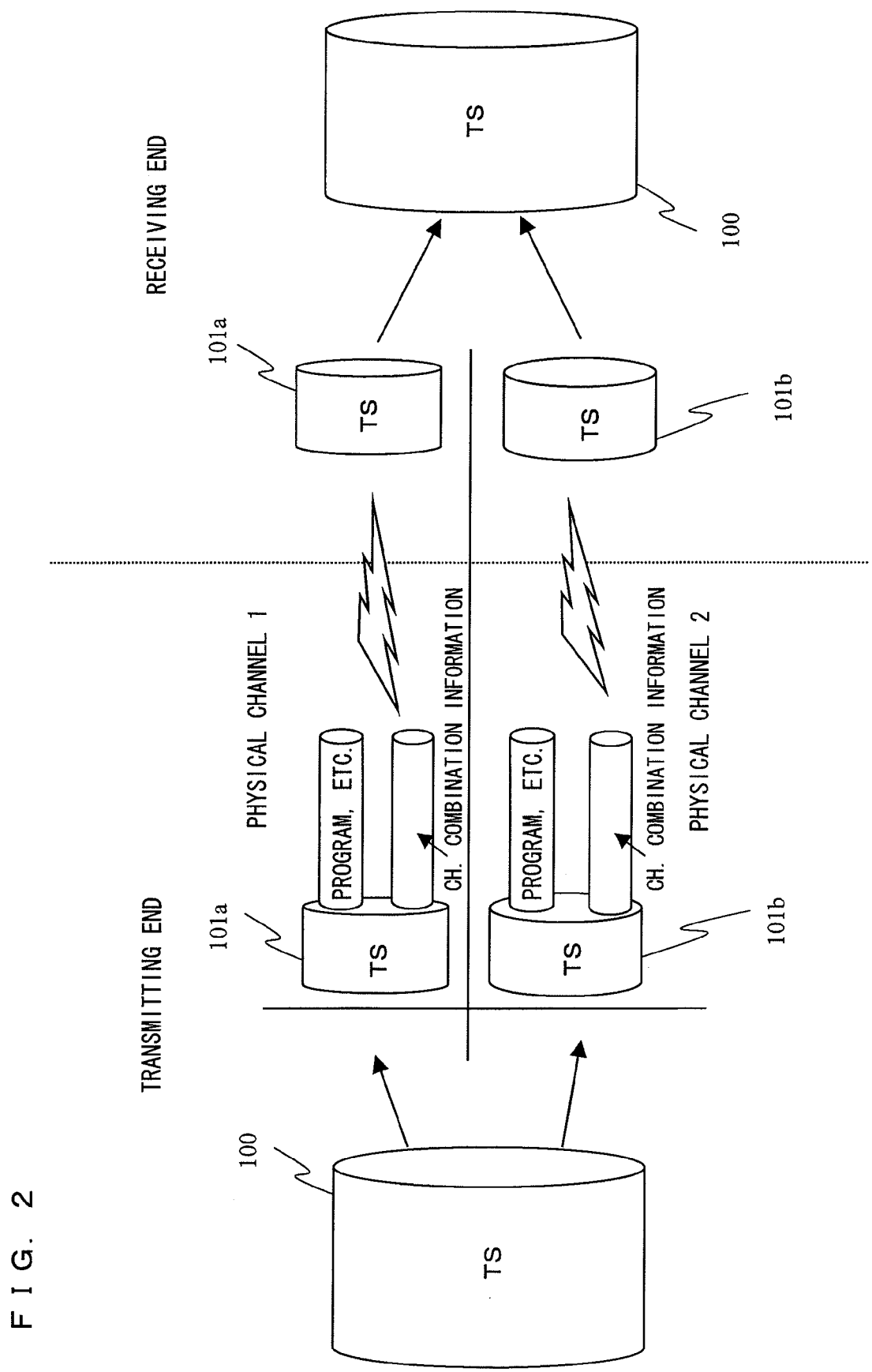
FIG. 2 is a diagram illustrating an overview of the process of the present invention.

DESCRIPTION OF THE REFERENCE CHARACTERS 10 transmission device
11 video encoding section
12 audio encoding section
13 data encoding section
14 multiplexer
15 division section
16 error-correction/modulation section
17 transmission section
18 CPU
19 memory
20 antenna
30 reception device
31 antenna
32 front end
33 combination section
34 demultiplexer
35 CPU
36 memory
37 video decoder
38 audio decoder
39 data processing section
50 NIT
60 channel selection table
2030 reception device
2031 antenna
2032 first tuner
2033 second tuner
2034 first demodulation section
2035 second demodulation section
2036 first main signal error-correction decoding section
2037 second main signal error-correction decoding section
2038 first TMCC decoding section
2039 second TMCC decoding section
2040 TMCC control section
2041 TS combination/separation section
2042 first AV decoder
2043 second AV decoder
2044 first OSD generation/combination section
2045 second OSD generation/combination section
2046 first display section
2047 second display section
2048 CPU
2049 remote-control process section
2050 flash memory
2051 remote control
2052 recording process section
2053 storage section
2054 EPG information acquisition section
2361 deinterleaving section
2362 inner code error decoding section
2363 energy dispersal removal section
2364 outer code error decoding section
3030 reception device
3031 antenna
3032 first tuner
3033 second tuner
3034 first demodulation section
3035 second demodulation section
3036 first main signal error-correction decoding section
3037 second main signal error-correction decoding section
3038 first TMCC decoding section
3039 second TMCC decoding section
3040 TMCC control section
3041 TS combination/separation section
3042 first AV decoder
3043 second AV decoder
3044 first display section
3045 second display section
3046 CPU
3047 remote-control process section
3048 flash memory
3049 remote control
3050 reception device
3051 first OSD generation/combination section
3052 second OSD generation/combination section
3060 reception device
3061 EPG information acquisition section
3361 deinterleaving section
3362 inner code error decoding section
3363 energy dispersal removal section
3364 outer code error decoding section
4030 reception device
4031 antenna
4032 first tuner
4033 second tuner
4034 first demodulation section
4035 second demodulation section
4036 first main signal error-correction decoding section
4037 second main signal error-correction decoding section
4038 first TMCC decoding section
4039 second TMCC decoding section 4040 TMCC control section
4041 TS combination/separation section
4042 first AV decoder
4043 second AV decoder
4044 first OSD generation/combination section
4045 second OSD generation/combination section
4046 first display section
4047 second display section
4048 CPU
4049 remote-control process section
4050 flash memory
4051 remote control
4060 reception device
4061 recording process section
4062 storage section
4070 reception device
4361 deinterleaving section
4362 inner code error decoding section
4363 energy dispersal removal section
4364 outer code error decoding section
6010 transmission device
6011 higher-layer encoder
6012 lower-layer encoder
6013 time-division multiplexing section
6014 TS division section
6015 first main signal error-correction coding section
6016 second main signal error-correction coding section
6017 first mapping section
6018 second mapping section
6019 first frequency conversion section
6020 second frequency conversion section
6021 CPU
6022 second lower-layer encoder
6023 first TMCC generation section
6024 second TMCC generation section
6030 reception device
6031 antenna
6032 first tuner
6033 second tuner
6034 first demodulation section
6035 second demodulation section
6036 first main signal error-correction decoding section
6037 second main signal error-correction decoding section
6038 first TMCC decoding section
6039 second TMCC decoding section
6040 TMCC control section
6041 first received-CNR detection section
6042 second received-CNR detection section
6043 TS combination/separation section
6044 AV decoder
6045 CPU
6046 display section
6050 reception device
6051 first higher-layer slot bit error detection section
6052 second higher-layer slot bit error detection section
6060 transmission device
6151 outer code error correction section
6152 energy dispersal section
6153 inner code error correction section
6154 interleaving section
6361 deinterleaving section
6362 inner code error decoding section
6363 energy dispersal removal section
6364 outer code error decoding section

BEST MODE FOR CARRYING OUT THE INVENTION

Embodiments of the present invention are described below with reference to the drawings. Note that the present invention is not limited to the embodiments.

First Embodiment

First, a first embodiment of the present invention is described. A digital broadcasting system according to the first embodiment is described, taking as an example a broadcasting system where a broadcast signal transmitted from a broadcast station for BS (Broadcast Satellite) digital broadcasting is received by one reception device. Note that the BS digital broadcasting may be replaced by CS (Communications Satellite) digital broadcasting or digital terrestrial broadcasting.

FIG. 1 is a diagram showing an example of the structure of the digital broadcasting system according to the present embodiment. Referring to FIG. 1, a broadcast station 1, which broadcasts a broadcast program, has an antenna 20 and a transmission device 10 that transmits broadcast waves through the antenna 20 and a broadcast satellite, not shown in the figures. In a viewer's house 2 an antenna 31 for receiving BS digital broadcasting is provided and is connected to a reception device 30 so that the viewer can view BS digital broadcasting by performing a channel selection operation. Here, a plurality of front ends mounted in the reception device 30 make it possible to simultaneously select and receive a plurality of physical channels.

Next, an overview of the process (the principle) of the present invention is described with reference to FIG. 2. In the present embodiment a transport stream (hereinafter referred to as a "TS") having such an amount of information that cannot be completely transmitted on one physical channel is transmitted using a plurality of physical channels. Referring to FIG. 2, first, at the transmitting end (in the broadcast station 1) a TS (hereinafter referred to as an "original TS") 100 having such an amount of information that cannot be completely transmitted on one physical channel is divided into a plurality of TSs. For ease of description, in the present embodiment the original TS 100 is divided into two TSs 101a and 101b. Hereinafter, these TSs, into which the division has been made, will be referred to as "divided TSs". Then the divided TSs 101a and 101b are separately transmitted using different physical channels. At this time, ch. (channel) combination information (e.g., frequency information about these two physical channels) for combining the divided TSs 101a and 101b back into the original TS 100 is generated. Then the ch. combination information is included in SI (Service Information) and is transmitted. The SI defines the sorting system, materials, schedule/timing, and the like of digital broadcast streams, and is information that has written therein what programs are present in a TS and to which one of the programs each ES (Elementary Stream) included in the TS belongs, and that includes information (PSI: Program Specific Information) for causing a receiver to execute a function of automatically demultiplexing the TS and decoding the ES, the PSI having added thereto the program materials, schedule information, and the like. The ch. combination information is included in the SI, and the SI is included in the divided TSs 101a and 101b and transmitted. In the present embodiment the ch. combination information is included in an NIT (Network Information Table), which is one item of the PSI.

Next, at the receiving end (in the viewer's house 2) the TSs are simultaneously received on the two physical channels based on the ch. combination information. Accordingly, a plurality of front ends (for tuning and demodulation) are required at the receiving end. The divided TSs 101*a* and 101*b* received on the two physical channels are combined to reconstruct the original TS 100. The original TS 100 is subjected to a channel selection process and the like as conventionally performed, and thereby video and audio signals and the like are output.

Thus, in the present embodiment an original TS is divided into a plurality of divided TSs, and the divided TSs are separately transmitted using different physical channels. At this time, in order to combine the divided TSs, ch. combination information, which is information associating these different physical channels with each other, is included in SI, and the SI, included in the divided TSs, is transmitted. At the receiving end the TSs are simultaneously received on the different physical channels based on the ch. combination information, and the divided TSs obtained by performing demodulation are combined to reconstruct the original TS (in other words, a plurality of channels are combined), and thereby a process of reproducing the original TS and the like is performed. This makes it possible to transmit and receive a program that cannot conventionally be completely transmitted on one physical channel.

Figure 3:
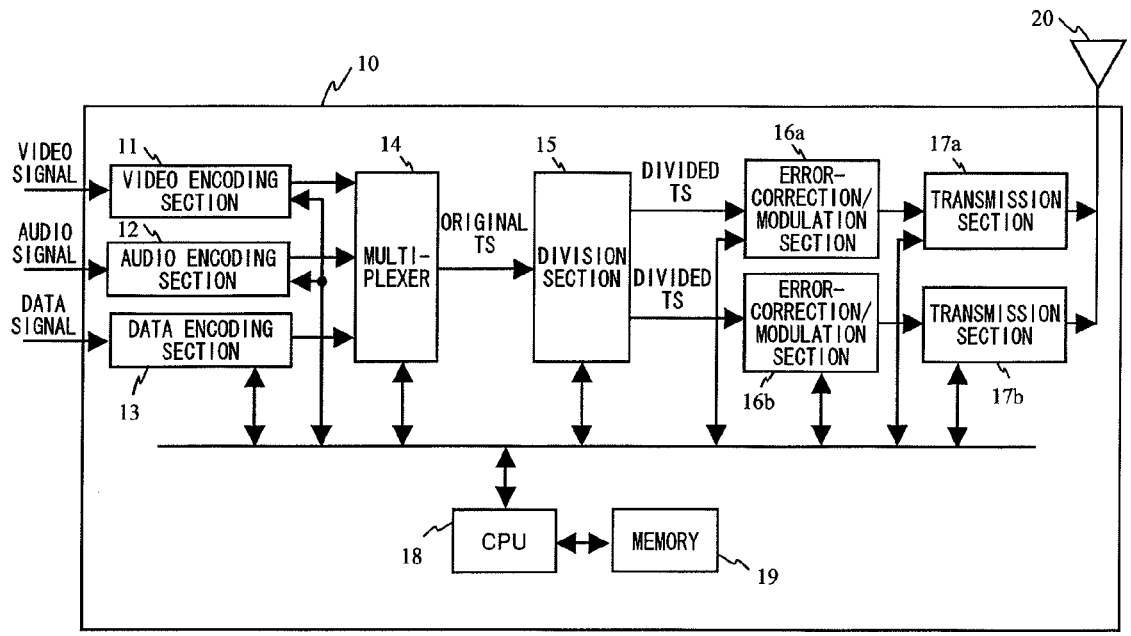
FIG. 3 is a functional block diagram showing an example of the structure of a transmission device 10 according to the first embodiment.

Next, the transmission device 10 according to the present embodiment is described with reference to FIG. 3. FIG. 3 is a functional block diagram showing an example of the structure of the transmission device 10 according to the present embodiment, with a focus on the block related to the present embodiment. Referring to FIG. 3, the transmission device 10 includes a video encoding section 11, an audio encoding section 12, a data encoding section 13, a multiplexer 14, a division section 15, error-correction/modulation sections 16*a* and 16*b*, transmission sections 17*a* and 17*b*, a CPU 18, and a memory 19.

The video encoding section 11 converts an analog video signal into a digital signal by sampling and quantizing the analog video signal. The video encoding section 11 also outputs to the multiplexer 14 the resulting digital signal obtained from the conversion. The audio encoding section 12 converts an analog audio signal into a digital signal by sampling and quantizing the analog audio signal. The audio encoding section 12 also outputs to the multiplexer 14 the resulting digital signal obtained from the conversion. The data encoding section 13 encodes a data signal used for data broadcasting. The data encoding section 13 also outputs the encoded signal to the multiplexer 14.

The multiplexer 14 generates an original TS by multiplexing the signals output from all the encoding sections. The multiplexer 14 also generates section data, i.e., PSI, such as an NIT, a PAT (Program Association Table), and a PMT (Program Map Table), and then includes the generated section data in the original TS as well. At this time, such ch. combination information as described above is written into the NIT. The multiplexer 14 also outputs the original TS to the division section 15.

The division section 15 divides the original TS into a plurality of divided TSs, and outputs the divided TSs to the error-correction/modulation sections 16*a* and 16*b*, respectively.

The error-correction/modulation sections 16*a* and 16*b* perform processes, such as the addition of a parity bit for error correction, on the respective divided TSs. The error-correction/modulation sections 16*a* and 16*b* also generate digital broadcast signals by performing carrier modulation using a predetermined scheme. The error-correction/modulation sections 16*a* and 16*b* output the digital broadcast signals to the transmission sections 17*a* and 17*b*, respectively.

The transmission sections 17*a* and 17*b* output through the antenna 20 the digital broadcast signals input from the error-correction/modulation sections 16*a* and 16*b*, respectively.

The CPU 18 controls the operations of the whole transmission device 10. The memory 19 stores various items of information for the operations of the CPU 18.

Figure 4:
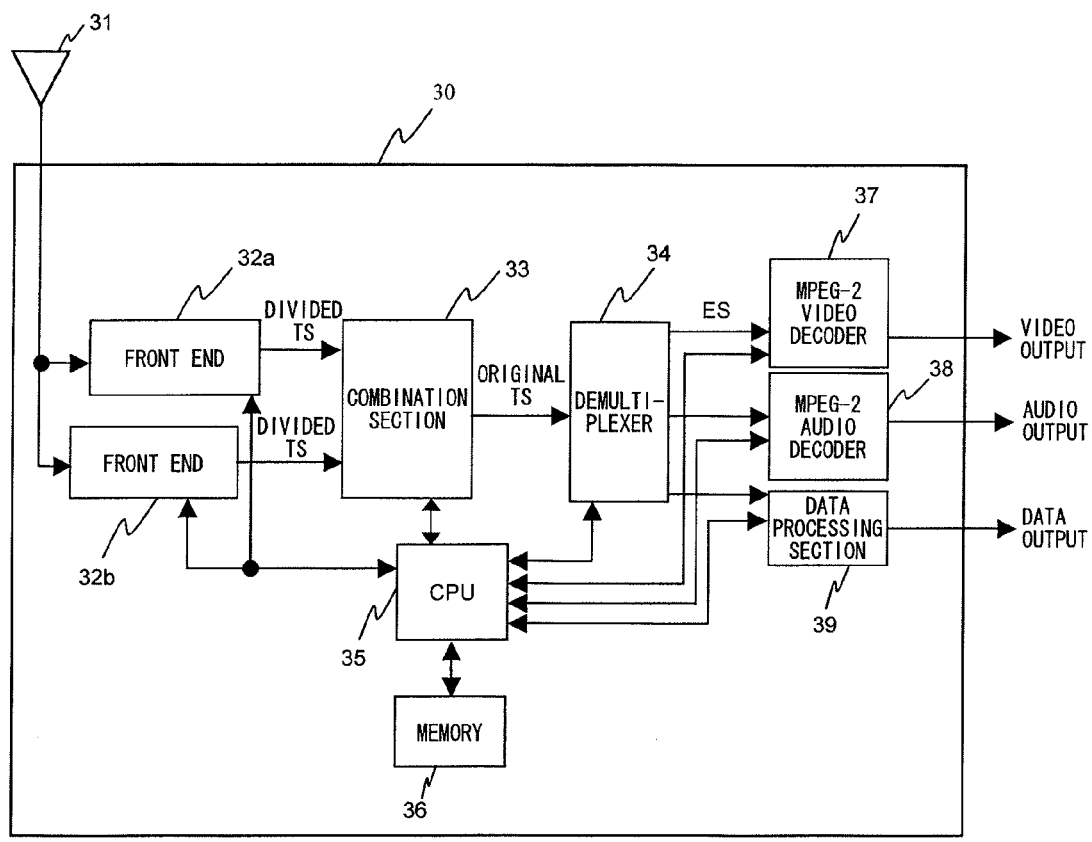
FIG. 4 is a functional block diagram showing an example of the structure of a reception device 30.

Next, a description is given of the structure of the reception device (typically, a television receiver capable of receiving digital broadcasting). FIG. 4 is a functional block diagram showing an example of the structure of the reception device 30. The reception device 30 includes: front ends 32*a* and 32*b* that receive the outputs of the receiving antenna 31; a combination section 33 that receives the outputs of the front ends 32*a* and 32*b*; a demultiplexer 34 that receives the output of the combination section 33; and an MPEG-2 video decoder 37, an MPEG-2 audio decoder 38, and a data processing section 39 that receive the outputs of the demultiplexer 34. The reception device 30 further includes a CPU 35 that controls this whole satellite digital broadcast reception device. The CPU 35 is connected to a memory 36.

Referring to FIG. 4, the divided TSs received by the receiving antenna 31 are subjected to processes in the respective front ends 32, such as the selection of a receiving transponder, demodulation, and error correction, and then are input to the combination section 33.

The combination section 33 generates the original TS by combining, based on the ch. combination information, the divided TSs input from the front ends 32. The original TS is output to the demultiplexer 34.

The demultiplexer 34 separates and extracts the PSI, an MPEG-2 video ES, an MPEG-2 audio ES, and a PS (Private Section) from the original TS. The PSI extracted from the original TS by the demultiplexer 34 is transmitted to the CPU 35, the MPEG-2 video ES to the MPEG-2 video decoder 37, the MPEG-2 audio ES to the MPEG-2 audio decoder 38, and the PS to the data processing section 39.

The MPEG-2 video decoder 37, the MPEG-2 audio decoder 38, and the data processing section 39 appropriately process the received MPEG-2 video ES, MPEG-2 audio ES, and PS, and then the resulting signals obtained from the processes performed by the MPEG-2 video decoder 37, the MPEG-2 audio decoder 38, and the data processing section 39 are output to the outside of the reception device 30 through a video output interface, an audio output interface, and a data output interface (not shown), respectively.

The CPU 35 controls the operations of the front ends 32, the MPEG-2 video decoder 37, the MPEG-2 audio decoder 38, and the data processing section 39, while using the memory 36. The CPU 35 also performs a channel selection operation, based on the PSI. That is, the CPU 35 performs channel selection by: setting, in the front ends 32, a physical channel frequency, a modulation scheme, and the like that are acquired from the NIT included in the PSI; setting, in the demultiplexer 34, the PIDs of the ESs and the PS that are acquired from the PMT included in the PSI; and assigning the ESs and the PS to the respective processing devices of the MPEG-2 video decoder 37, the MPEG-2 audio decoder 38, and the data processing section 39.

Figures 5, 6, 7:
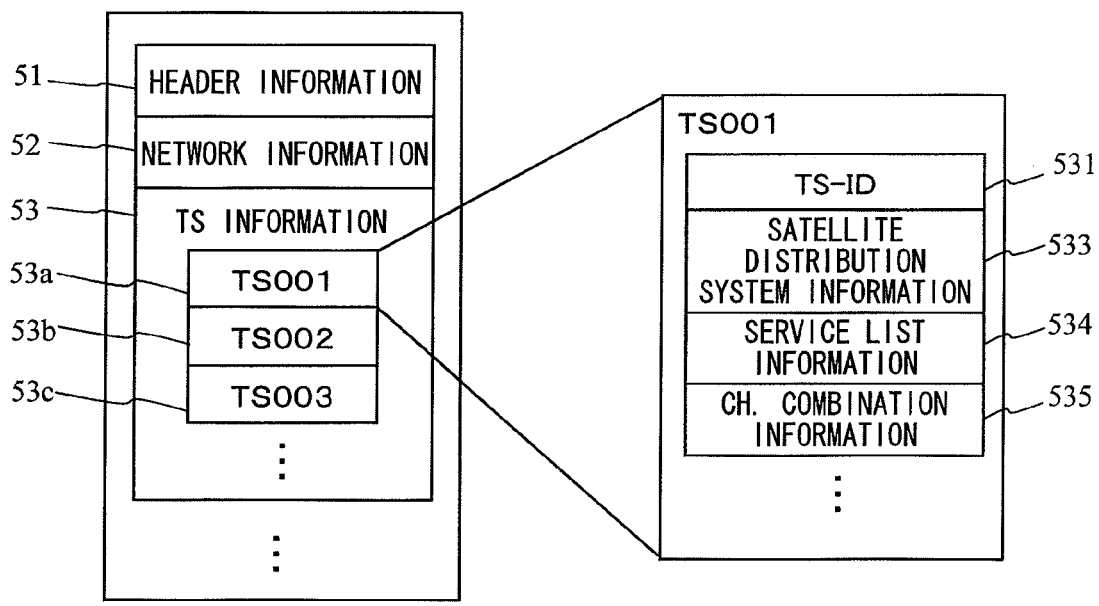
FIG. 5 is a diagram illustrating an NIT used in the first embodiment.
FIG. 6 is a diagram showing an example of the data structure of service list information 534.
FIG. 7 is a diagram showing an example of the data structure of ch. combination information 535.

Next, data used for the process of the present embodiment is described. FIG. 5 is an example of the data structure of the NIT used in the present embodiment. The NIT, which is one item of the PSI described above, is a table related to a network for the transmission. Referring to FIG. 5, an NIT 50 includes sets of header information 51, network information 52, and TS information 53.

The header information 51 includes information about the NIT 50 per se. For example, information such as a table identifier and version information is included.

The network information 52 includes information about the network. For example, information such as a network name and a network ID is included. Here, the network ID refers to an ID for identifying the type of the network, e.g., digital terrestrial broadcasting, BS digital broadcasting, or 110° CS digital broadcasting. Accordingly, all network IDs transmitted on all physical channels of, for example, BS digital broadcasting, are assigned the same ID.

The TS information 53 is information about all TSs transmitted in all broadcastings using the network. Accordingly, various items of information are defined for a plurality of TSs (typically, the number of the TSs is the number of broadcasters that broadcast), on a TS-by-TS basis (TS 001, TS 002, TS 003 . . . of FIG. 5). The TS information 53 about each TS includes a TS-ID 531, satellite distribution system information 533, service list information 534, and ch. combination information 535.

The TS-ID 531 is an ID for identifying the TS.

The satellite distribution system information 533 includes information about a physical channel frequency, a modulation scheme, an error correction scheme, and the like. Here, as described above, in the present embodiment one original TS is separately transmitted on two physical channels, and therefore the frequency of either one of the physical channels is included as the physical channel frequency. Hereinafter, the physical channel written in the satellite distribution system information 533 will be referred to as a "main channel", and the other physical channel will be referred to as a "subchannel".

The service list information 534 is information indicating each program included in the TS. FIG. 6 is a diagram showing an example of the data structure of the service list information 534. The service list information 534 includes an SID (Service Identifier) 5341, a service format 5342, and the like. The SID 5341 is information for identifying each program included in the TS. The service format 5342 is information indicating the format (e.g., TV, audio, data) of the program.

Referring back to FIG. 5, the ch. combination information 535 is information used to combine divided TSs into an original TS. FIG. 7 is a diagram showing an example of the data structure of the ch. combination information 535. The ch. combination information 535 includes a combination flag 5351, a subchannel frequency 5352, a modulation scheme 5353, an error correction scheme 5354, ch.-combination-related information 5355, and the like.

The combination flag 5351 is a flag for indicating whether or not the TS requires the combination of TSs, i.e., whether or not the TS is one of divided TSs. When set to "On", the combination flag 5351 indicates that the TS is one of divided TSs. When set to "Off", the combination flag 5351 indicates that the TS is not one of divided TSs, i.e., that the TS does not require the combination of TSs.

The subchannel frequency 5352 indicates the frequency of the subchannel. That is, when an original TS is separately transmitted on two physical channels, the frequency of the main channel is set in the satellite distribution system information 533, and the frequency of the subchannel is set in the ch. combination information 535.

The modulation scheme 5353 indicates the modulation scheme of the divided TS transmitted on the subchannel. The error correction scheme 5354 indicates the error correction scheme of the divided TS transmitted on the subchannel.

The ch.-combination-related information 5355 includes information that is necessary to combine the divided TSs into the original TS, e.g., information indicating a TS division rule (the order of dividing the TS into the main channel and the subchannel, the numbers of packets divided into the main channel and the subchannel, etc.). Note that when the TS division rule is uniquely determined or when no division rule is written in the TS itself, it is not necessary to include the ch.-combination-related information 5355 in the ch. combination information 535.

Next, a description is given of a channel selection table stored in the memory 36 of the reception device 30. The channel selection table is a table generated based on the NIT, the PAT, the PMT, and the like, and is information used for a channel selection process performed by the reception device 30. In the present embodiment the channel selection table is generated, for example, based on the NIT, which is acquired by receiving a TS transmitted on a specific physical channel when the reception device 30 is initialized, and based also on the PMT and the PAT, which are acquired by receiving a TS transmitted on a desired channel when a normal channel selection is performed, and then the generated channel selection table is stored in the memory 36 of the reception device 30. The channel selection table is, in other words, a table that defines the correspondence between a channel button of the remote control of the reception device 30 and broadcast data of each broadcast station.

FIG. 8 is an example of the data structure of a channel selection table 60. The channel selection table 60 includes sets of an SID 61, a TS-ID 62, a ch. combination flag 63, ch.-combination-related information 64, a transponder frequency 65, a PMT-PID PMI-PID 66, and an ES-PID 67.

The SID 61 is information for identifying each program included in a TS, and is a copy of the SID 5341 included in the service list information 534 of the NIT 50.

The TS-ID 62 is an ID for identifying the TS, and is a copy of the TS-ID 531 included in the TS information 53 of the NIT 50.

The ch. combination flag 63 is a flag for indicating whether or not the combination of TSs are required, and is a copy of the combination flag 5351 of the ch. combination information 535.

The ch.-combination-related information 64 is information that is necessary to combine the divided TSs into the original TS, and is a copy of the ch.-combination-related information 5355.

The transponder frequency 65 indicates a frequency for receiving the TS indicated by the TS-ID 62, and is a copy of the information about the frequency of the main channel included in the satellite distribution system information 533 of the NIT 50. In addition, when the ch. combination flag 63 is set to "On", the transponder frequency 65 further includes a copy of the subchannel frequency 5352.

The PMT-PID 66 is an ID for identifying the PMT of the program indicated by the SID 61, and is copied from the PAT at the reception of a TS transmitted on a desired channel when a normal channel selection is performed.

The ES-PID 67 is an ID for identifying the ES of the program indicated by the SID 61, and is copied from the PMT at the reception of a TS transmitted on a desired channel when a normal channel selection is performed.

Figure 9:
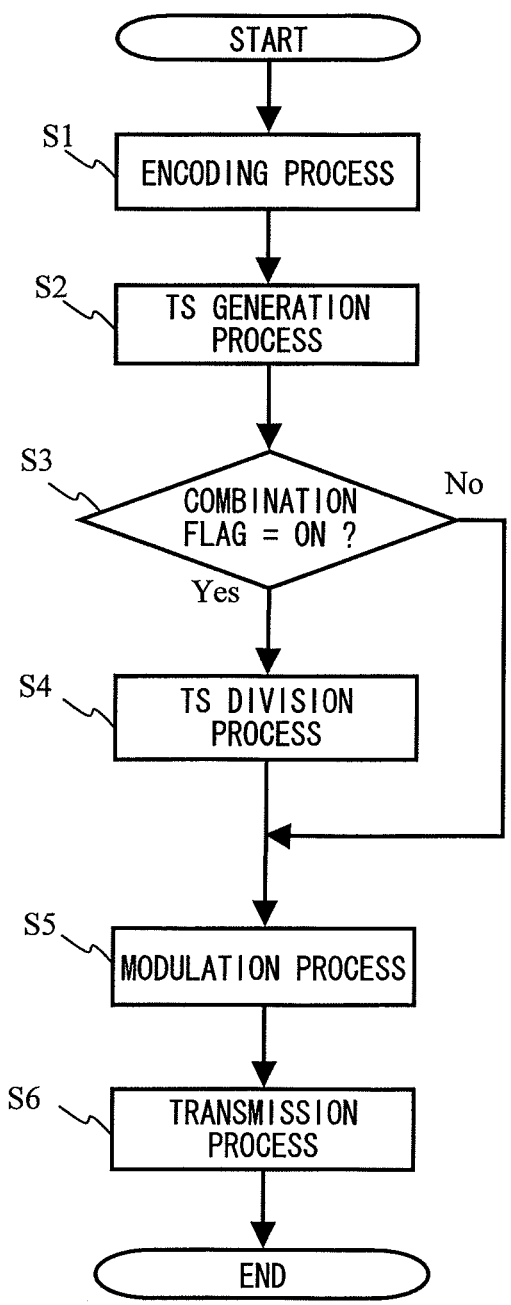
FIG. 9 is a flow chart showing details of the signal processing performed by the transmission device 10.

Next, a description is given of a transmission/reception process of the digital broadcasting system according to the present embodiment. First, a description is given of details of signal processing performed by the transmission device 10. FIG. 9 is a flow chart showing the details of the signal processing performed by the transmission device 10. In step S1 an encoding process is performed. More specifically, in the process of step S1 the CPU 18 causes the video encoding section 11 to compress/encode an input video signal and thereby to generate a video ES. The CPU 18 also causes the audio encoding section 12 to compress/encode an input audio signal and thereby to generate an audio ES. The CPU 18 also causes the data encoding section 13 to compress/encode an input data signal and thereby to generate a PS. Then the CPU 18 causes all the encoding sections to output the respective encoded signals to the multiplexer 14.

In step S2 a TS generation process is performed. More specifically, in the process of step S2 the CPU 18 causes the multiplexer 14 to packetize the signals input from all the encoding sections and thereby to generate PESs (Packetized Elementary Streams). The CPU 18 also causes the multiplexer 14 to disassemble the PESs and thereby to generate TS packets. At this time the CPU 18 also generates the NIT 50 described above with reference to FIG. 5. The ch. combination information 535, which is included in the NIT 50 as described above, is also generated at this time. Specifically, information that serves as a basis for the ch. combination information 535, e.g., information indicating the frequency of the subchannel and the TS division/combination method (rule), is set based on the broadcaster's input operation or the like, and is stored in advance in the memory 19. In addition, various items of information that are necessary to generate the NIT 50 are also stored in advance in the memory 19. Then the CPU 18 generates the NIT 50 having stored therein the ch. combination information 535, by reading these items of information from the memory 19. The CPU 18 also appropriately generates, as well as the NIT 50, other items of the section data such as the PMT and the PAT, and outputs the generated section data to the multiplexer 14. Then the CPU 18 causes the multiplexer 14 to packetize the section data into TS packets. The CPU 18 also causes the multiplexer 14 to generate an original TS by multiplexing these TS packets. Then the CPU 18 causes the multiplexer 14 to output the original TS to the division section 15.

In step S3 the CPU 18 determines, with reference to the NIT 50 included in the original TS, whether or not the combination flag 5351 is "On". When it is determined that the combination flag 5351 is "Off" ("No" in step S3), the CPU 18 causes the division section 15 to output the original TS, as it has been generated, to the error-correction/modulation sections 16, and the process proceeds to step S5 described below.

On the other hand, when it is determined that the combination flag 5351 is "On" ("Yes" in step S3), in step S4 a TS division process is performed. That is, the CPU 18 causes the division section 15 to divide the original TS into two divided TSs. At this time the CPU 18 also causes the division section 15 to appropriately generate the ch.-combination-related information 5355, which is information that is necessary for the reception device 30 to combine the divided TSs, such as the information indicating the division rule, and thereby to write the generated ch.-combination-related information 5355 into the ch. combination information 535. Then the CPU 18 causes the division section 15 to output one of the divided TSs to the error-correction/modulation section 16a and also to output the other divided TS to the error-correction/modulation section 16b. Note that any process method may be used as a method of dividing a TS into divided TSs, so long as the original TS can be divided and then the divided TSs can be combined at the reception device end. Alternatively, when the TS division rule is uniquely determined or when no division rule is written in the TS itself, it is not necessary to generate the ch.-combination-related information 5355.

In step S5 a modulation process is performed. That is, for an error correction process to be performed by the reception device 30, the CPU 18 causes the error-correction/modulation sections 16 to add a predetermined error-correction code to each packet of the input divided TSs (or the original TS, if not divided as a result of the determination of step S3). Then the CPU 18 causes the error-correction/modulation sections 16 to modulate in a predetermined scheme the TSs having the error-correction codes added thereto.

In step S6 a transmission process is performed. That is, the CPU 18 causes both the transmission sections 17 to output, as broadcast waves, the divided TSs modulated by the error-correction/modulation sections 16. As a result, the divided TSs are transmitted on different physical channels. Thus the signal processing performed by the transmission device 10 ends.

Next, a description is given of details of a channel selection process performed by the reception device 30. First, the channel selection table 60 is generated in the reception device 30 as shown in FIG. 8. The channel selection table 60 is generated, for example, by receiving a TS transmitted on a specific physical channel in the initialization process when the reception device 30 is installed after the user has purchased the reception device, and also by performing a normal channel selection. Specifically, in the initialization process the CPU 35 acquires the NIT 50 by receiving a TS transmitted on a specific physical channel. Then the CPU 35 acquires information, such as the TS-ID, the ch. combination flag, the ch.-combination-related information, and the transponder frequency, about each program (i.e., each SID) from the satellite distribution system information 533, the service list information 534, and the ch. combination information 535, of the NIT 50. Then in the channel selection table 60 a table is generated that includes the SID 61, the TS-ID 62, the ch. combination flag 63, the ch.-combination-related information 64, and the transponder frequency 65. The process described below is a process performed on the assumption that in the channel selection table 60 a table including the SID 61 through to the transponder frequency 65 has been generated in advance (i.e., the initialization of the reception device 30 is completed).

Figure 10:
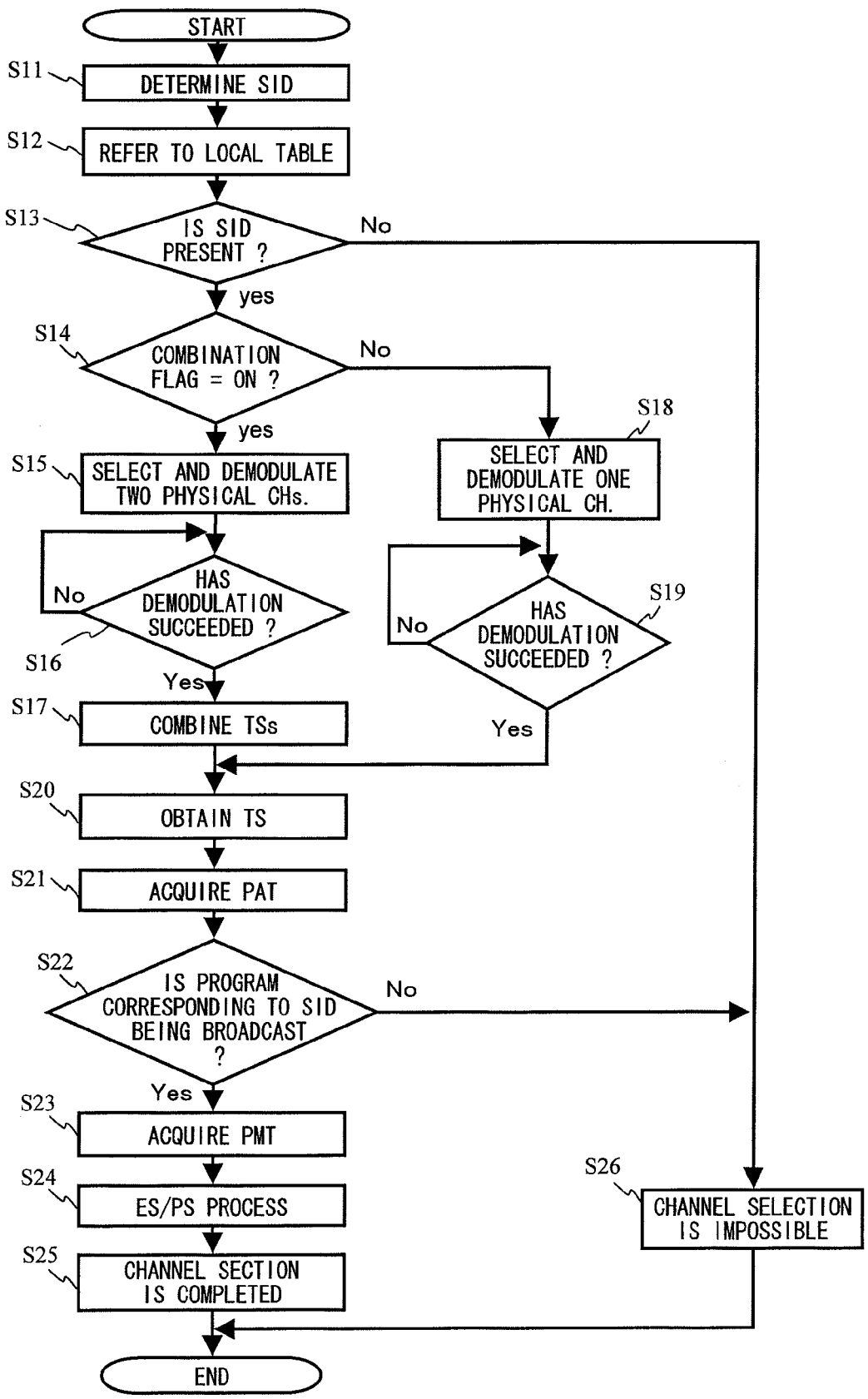
FIG. 10 is a flow chart showing details of a channel selection process performed by the reception device 30.

FIG. 10 is a flow chart showing the details of the channel selection process performed by the reception device 30. In step S11 the CPU 35 determines an SID based on the user's operation or the like. In step S12 the CPU 35 accesses the channel selection table 60 generated in the initialization described above.

In step S13 the CPU 35 determines whether or not the SID determined in step S11 is present in the SID 61 of the channel selection table 60. When it is determined that the determined SID is not present ("No" in step S13), in step S26 the CPU 35 displays on the screen a message that channel selection cannot be performed, so as to indicate that channel selection is impossible, and then ends the channel selection process.

On the other hand, when it is determined that the determined SID is present ("Yes" in step S13), in step S14 the CPU 35 determines whether or not the ch. combination flag 63 is "On". When the ch. combination flag 63 is "On" ("Yes" in step S14), the CPU 35 performs a process of selecting two physical channels and demodulating the respective broadcast waves. That is, with reference to the transponder frequency 65 of the channel selection table 60, the CPU 35 acquires information about a plurality of, two in the present embodiment, frequencies to be received. Referring to the example of FIG. 8, if the SID determined in step S11 is, for example, "100", the CPU 35 acquires information about two frequencies of "11.72748 GHz" and "11.80420 GHz". Then the CPU 35 causes the front end 32a to be tuned to one ("11.72748 GHz") of the frequencies and to receive the corresponding broadcast wave. The CPU 35 also causes the front end 32b to be tuned to the other frequency ("11.80420 GHz") and to receive the corresponding broadcast wave. The CPU 35 causes both the front ends 32 to demodulate the respective received broadcast waves.

In step S16 the CPU 35 determines whether or not both the front ends 32 have succeeded in demodulating the respective broadcast waves. This is designed on the assumption of the case where demodulation takes time when the reception is poor due to rain attenuation or the like. Accordingly, when it is determined that the demodulation has not succeeded ("No" in step S16), the determination of step S16 is repeated until the demodulation succeeds. Note that when it is still determined here that the demodulation has not succeeded even after a predetermined number of the determinations are repeated, a message may be displayed, as in step S26, to indicate that channel selection is impossible.

On the other hand, when it is determined that the demodulation has succeeded ("Yes" in step S16), in step S17 the CPU 35 performs a process of combining the divided TSs. That is, the CPU 35 acquires the ch.-combination-related information 64 from the channel selection table 60. Then the CPU 35 causes the combination section 33 to combine, based on the ch.-combination-related information 64, the divided TSs output from both the front ends 32. Then the CPU 35 causes the combination section 33 to output the combined original TS to the demultiplexer 34. Note that when the TS division rule is uniquely determined, it is not necessary to acquire the ch.-combination-related information 64.

On the other hand, when it is determined in step S14 that the ch. combination flag 63 is not "On", in step S18 the CPU 35 performs a channel selection process as conventionally performed, i.e., a process of selecting one physical channel and demodulating the received broadcast wave. Specifically, with reference to the transponder frequency 65 of the channel selection table 60, the CPU 35 acquires information about a frequency to be received. Referring to the example of FIG. 8, if the SID determined in step S11 is, for example, "101", the CPU 35 acquires information about one frequency of "11.76584 GHz". Then the CPU 35 causes the front end 32a to be tuned to this frequency ("11.76584 GHz") and to receive the broadcast wave. The CPU 35 causes the front end 32a to demodulate the received broadcast wave.

In step S19 the CPU 35 determines, as in step S16, whether or not the demodulation has succeeded. When it is determined that the demodulation has not succeeded ("No" in step S19), the determination process is repeated until the demodulation succeeds. When it is determined that the demodulation has succeeded ("Yes" in step S19), the process proceeds to step S20. Note that when it is still determined that the demodulation has not succeeded even after a predetermined number of the determinations are repeated, a message may be displayed, as in step S26, to indicate that channel selection is impossible.

In step S20 a process is performed of obtaining the TS output from the combination section 33. That is, the CPU 35 causes the demultiplexer 34 to obtain the original TS output from the combination section 33.

In step S21 the CPU 35 causes the demultiplexer 34 to acquire the PAT from the original TS. In step S22 the CPU 35 determines whether or not the program corresponding to the SID determined in step S11 is being broadcast. When it is determined that the program is not being broadcast ("No" in step S22), the CPU 35 performs the process of step S26. On the other hand, when it is determined that the program is being broadcast ("Yes" in step S22), in step S23 the CPU 35 causes the demultiplexer 34 to acquire the PMT from the TS, based on the PMT-PID corresponding to the SID and written in the PAT. In step S24 the CPU 35 performs channel selection by causing the demultiplexer 34 to separate the ESs and the PS using the PIDs written in the PMT, and then by assigning the separated ESs and PS to the respective processing sections of the MPEG-2 video decoder 37, the MPEG-2 audio decoder 38, and the data processing section 39. In step S25 the channel selection is thus completed. Thus the channel selection process performed by the reception device 30 ends.

As described above, in the present embodiment video, audio, and data signals (one television program) having such a large amount of information that cannot be completely transmitted on one physical channel is divided (into two TSs) and transmitted on two physical channels. Then in a reception device the two divided TSs are received on the two physical channels using two tuners (front ends), and then are combined. This makes it possible to receive a television program including video, audio, and data signals having such a large amount of information as described above and allow the television program to be viewed.

Note that for ease of description, the case of two physical channels is taken as an example above; however, three or more physical channels may be used so long as the corresponding number of tuners are mounted in the reception device.

Figure 11:
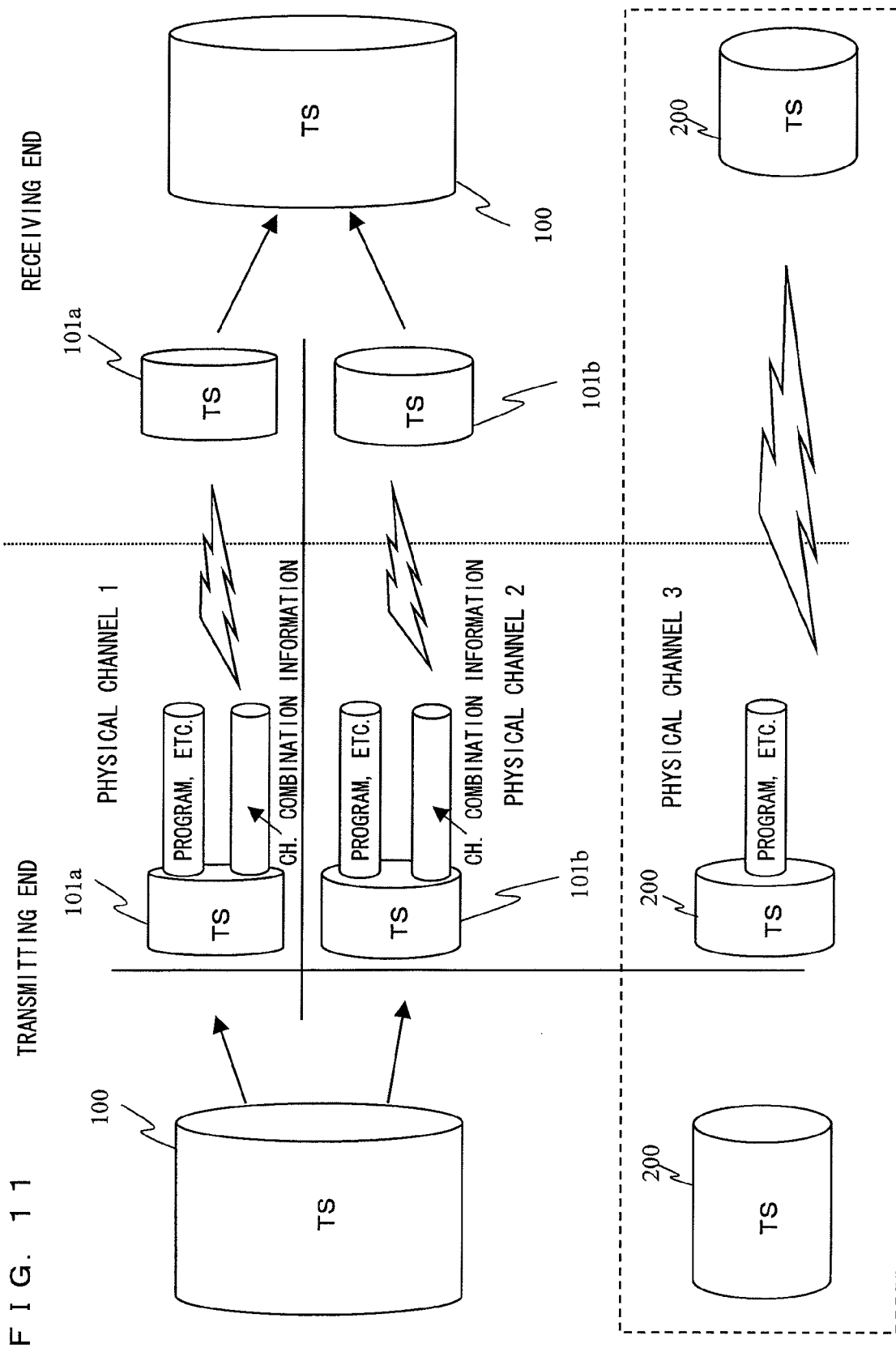
FIG. 11 is a schematic diagram illustrating the transmission using a third physical channel.

Further, in the first embodiment a program having such a large amount of information that cannot be completely transmitted on one physical channel is transmitted using two physical channels. As well as this, another program (TS) that has the same program material as that of the program but has a smaller amount of information with a lower image quality of the video and the like may be simultaneously transmitted using a third physical channel. FIG. 11 is a schematic diagram illustrating the transmission using a third physical channel. Referring to FIG. 11, as well as the transmission path shown in FIG. 2 through which one TS is transmitted on two physical channels, another TS 200 is transmitted on a third physical channel. Although the TS 200 has the same program material as that of the TS 100, the amount of information of the TS 200 is adjusted (encoded) so as to be completely transmitted on one physical channel, with lower qualities, e.g., lower bit rates, of the video and audio.

Thus, the transmission, on another physical channel, of another TS having the same program material but a smaller amount of information is designed on the assumption of the following case. That is, the transmission is designed on the assumption of the case where all the programs that are broadcast each have such an amount of information that uses two physical channels. In this case, a reception device (e.g., a reception device having a single tuner; hereinafter referred to as a "combination-function-incompatible device") that does not have the TS combination function described above does not allow any of the programs that are broadcast to be viewed at all. In response, as shown in FIG. 11, another TS is simultaneously broadcast that has an amount of information with the qualities of video and audio reduced so as to be transmitted on one physical channel. This makes it possible for even a combination-function-incompatible device, although the qualities of video and audio are lower, to allow the program material per se to be viewed, so as to prevent the case where the programs cannot be viewed at all.

The transmission form shown in FIG. 11 has the structure where, at the reception device end, when a predetermined broadcast station is selected, the physical channel on which the TS 200 is transmitted is selected by default. For example, it is defined in advance in the NIT and the like that the (default) channel of a predetermined broadcast station is physical channel 3. The NIT also includes in advance information (hereinafter referred to as "simultaneous broadcast information") indicating that the same program material is divided and transmitted on different physical channels (physical channel 1 and physical channel 2, in the example of FIG. 11). For example, the ch. combination information 535, shown in FIG. 7, having added thereto information indicating the frequency of the main channel is included as the simultaneous broadcast information in the NIT and is transmitted.

Due to the transmission with this structure, the combination-function-incompatible device selects physical channel 3, in the example of FIG. 11, by performing a predetermined channel selection operation, obtains the TS 200, and reproduces the program thereof (that is, the combination-function-incompatible device does not have a function of reading the simultaneous broadcast information included in the NIT and therefore can only select physical channel 3). In contrast, a reception device (hereinafter referred to as a "combination-function-compatible device") that has the TS combination function selects physical channel 3 at first by performing a predetermined channel selection operation, but thereafter determines, with reference to the NIT, the presence or absence of the simultaneous broadcast information described above. Then, when divided TSs are transmitted, the combination-function-compatible device selects, through the corresponding process described above, physical channels (physical channel 1 and physical channel 2, in the example of FIG. 11) on which the divided TSs are transmitted, combines the TSs through the corresponding process described above, and reproduces the program thereof. This makes it possible to allow the program per se to be viewed, regardless of whether by a combination-function-incompatible device or by a combination-function-compatible device. That is, it is possible for even a combination-function-incompatible device to prevent the case where the program cannot be viewed at all, and it is also possible for a combination-function-compatible device to allow the program, having the same material but higher image quality and higher sound quality, to be viewed.

Next, the structure of a transmission device used in the transmission form shown in FIG. 11 is described with reference to FIG. 12. The structure of a transmission device 70 shown in FIG. 12 corresponds to the functional structure of the transmission device 10, described above with reference to FIG. 3, having added thereto a video encoding section 71, an audio encoding section 72, a data encoding section 73, a multiplexer 74, an error-correction/modulation section 76, and a transmission section 77, and the other elements are the same as those shown in FIG. 3. The basic functions of these added elements are the same as those of the video encoding section 11, the audio encoding section 12, the data encoding section 13, the multiplexer 14, the error-correction/modulation section 16*a*, and the transmission section 17*a*, respectively. That is, the function of dividing a TS and sorting the divided TSs into a plurality of physical channels is eliminated. Therefore, referring to FIG. 12, when converting an analog video signal and an analog audio signal into digital signals, the video encoding section 71 and the audio encoding section 12 convert the analog signals into the digital signals by making the image and sound qualities lower than those of the resulting signals of the video encoding section 11 and the audio encoding section 12, so as to reduce the amount of information of the TS to such an amount of information that can be completely transmitted on one physical channel.

Figure 12:
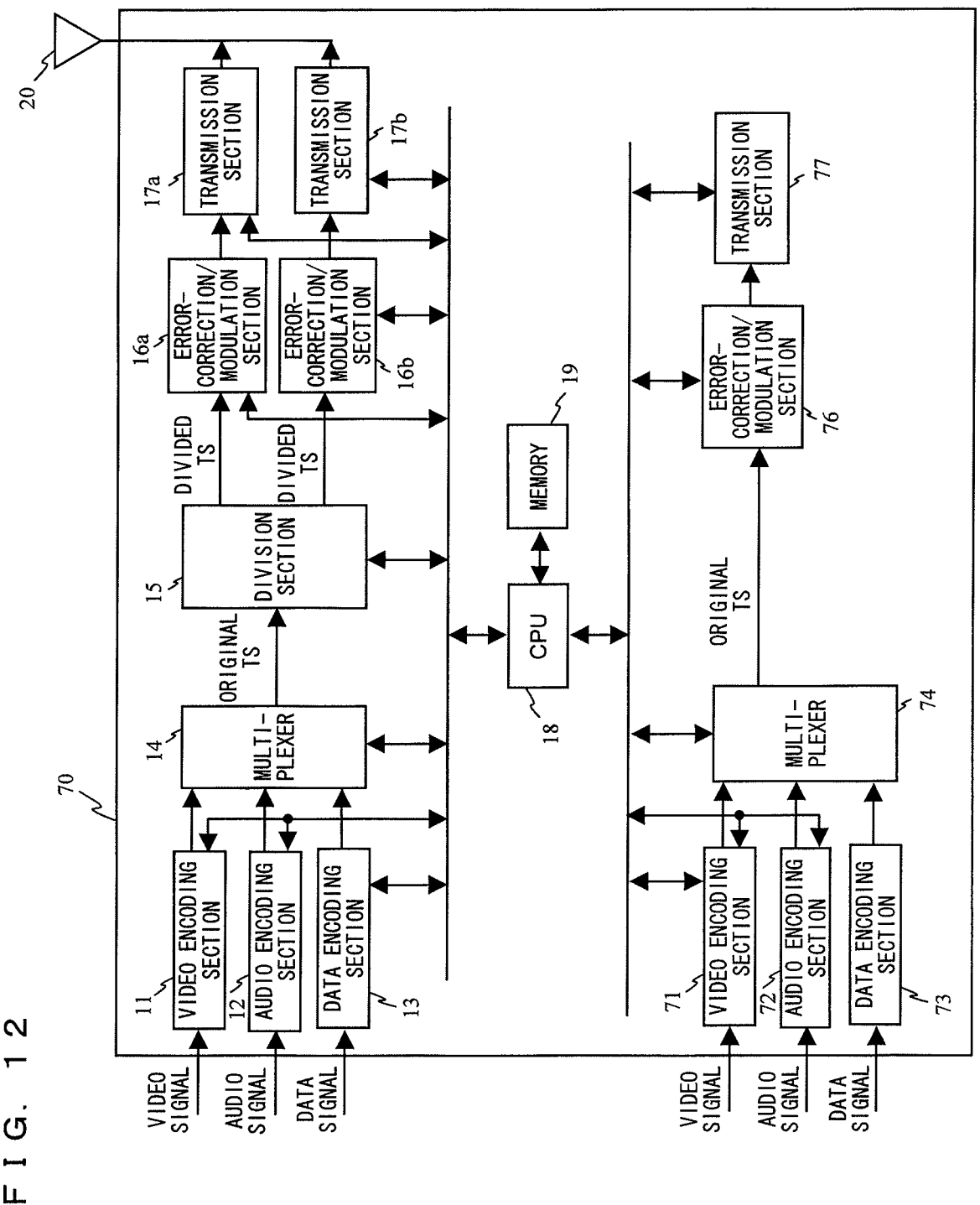
FIG. 12 is a functional block diagram showing the structure of a transmission device used in the transmission form shown in FIG. 11.

Further, referring to FIG. 12, the multiplexer 74 generates a TS 200 by multiplexing the signals output from the video encoding section 71, the audio encoding section 72, and the data encoding section 73. At this time, the multiplexer 74 generates the PSI, such as the NIT, and includes the generated PSI in the TS 200 appropriately, as does the multiplexer 14, while adding to the NIT the simultaneous broadcast information described above.

Thus, in the transmission device 70, while a TS having a large amount of information with high image quality and high sound quality is sorted and transmitted on a plurality of physical channels, another TS having the same material but a smaller amount of information with lower image quality and lower sound quality is simultaneously transmitted on another physical channel.

Next, a description is given of the structure of a reception device used in the transmission form shown in FIG. 11. There are two types of the reception device here, such as the combination-function-incompatible device and the combination-function-compatible device that are described above. Of these types, the combination-function-incompatible device is assumed to be a conventional digital broadcast reception device whose hardware structure, control method, and the like are known to those skilled in the art, and therefore will not be described in detail.

Figure 13:
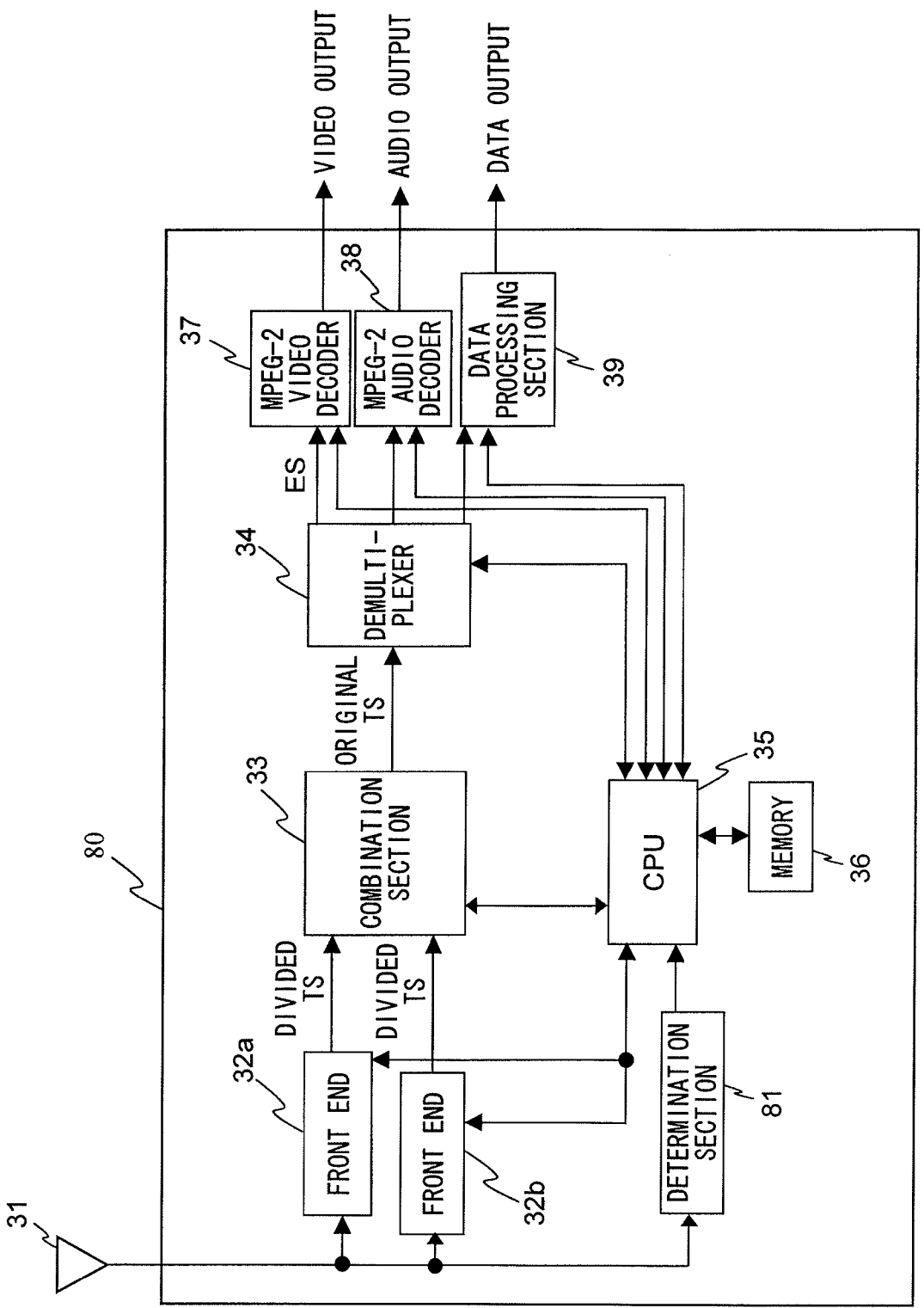
FIG. 13 is a functional block diagram showing an example of the structure of a combination-function-compatible device 80.

FIG. 13 is a functional block diagram showing an example of the structure of a combination-function-compatible device 80. The structure of the combination-function-compatible device 80 shown in FIG. 13 corresponds to the functional structure of the reception device 30, described above with reference to FIG. 4, having added thereto a determination section 81, and the other elements are the same as those of the reception device 30. Therefore the elements other than the determination section 81 will be denoted by the same numerals and will not be described in detail.

The determination section 81 performs processes, such as demodulation and error correction, on the broadcast waves received by the receiving antenna 31 and thereby extracts the NIT from the broadcast waves. Then the determination section 81 determines the presence or absence of the simultaneous broadcast information, and outputs to the CPU 35 a signal representing the determination result. In accordance with the signal, the CPU 35 performs a process of selecting physical channels on which the divided TSs are transmitted.

Figure 14:
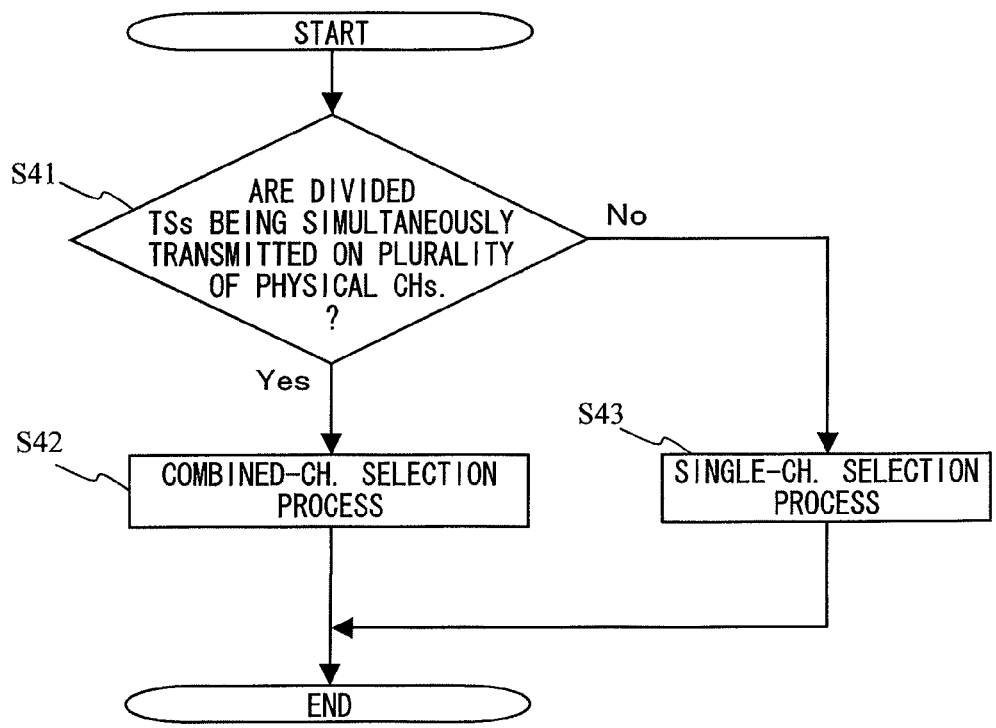
FIG. 14 is a flow chart showing a channel selection process performed by the combination-function-compatible device 80.

Next, a description is given of a channel selection process performed by the combination-function-compatible device 80 shown in FIG. 13. FIG. 14 is a flow chart showing the channel selection process performed by the combination-function-compatible device 80. Here, as an example, a case is described where, as shown in FIG. 11, a TS forming one program is divided and transmitted on physical channel 1 and physical channel 2, while another TS having the same program material but lower image quality and the like is transmitted using physical channel 3. When physical channel 3 is first selected based on a predetermined channel selection operation or the like performed by the user, in step S41 the NIT is acquired from the broadcast wave and the simultaneous broadcast information is referred to. Then the determination section 81 determines whether or not a program having the same material is being simultaneously transmitted using physical channels other than physical channel 3. As a result, when divided TSs are being simultaneously transmitted on a plurality of physical channels ("Yes" in step S41), in step S42 the physical channels (physical channel 1 and physical channel 2, in this example) on which the divided TSs are transmitted are selected, and a combined-ch. selection process for combining divided TSs, as described above, is performed. In this process, for example, the process described above with reference to FIG. 10 is performed. On the other hand, when divided TSs are not being simultaneously transmitted on a plurality of physical channels ("No" in step S41), in step S43 a single-ch. selection process for reproducing the program based on the TS transmitted on physical channel 3 is performed. This process (typically, a process of performing channel selection of so-called Hi-Vision broadcasting and reproducing the Hi-Vision broadcasting) is performed by a conventional digital broadcast reception device generally used whose control method and the like are known to those skilled in the art, and therefore will not be described in detail. Thus the channel selection process performed by the combination-function-compatible device 80 ends.

Thus, programs having the same material are transmitted as a TS having a large amount of information with high image quality and high sound quality on a plurality of physical channels, and simultaneously transmitted with a smaller amount of information on a single physical channel. This makes it possible for even a conventional reception device, which does not have the combination function of divided TSs, to prevent the case where the programs cannot be viewed at all.

Figure 15:
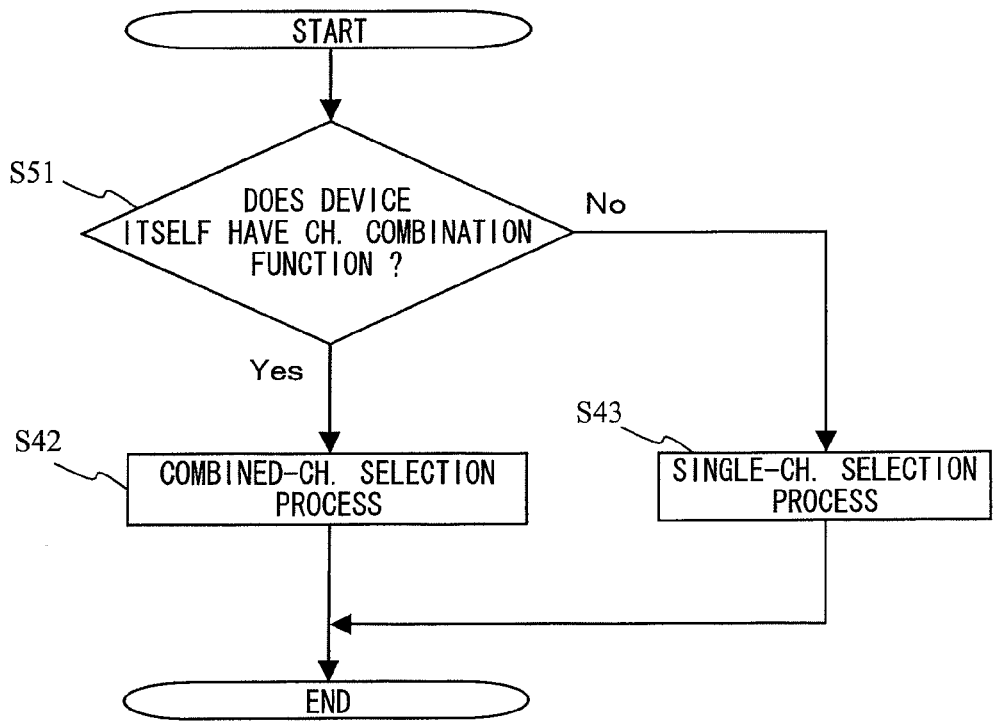
FIG. 15 is a flow chart showing a channel selection process performed based on combinability information.
Figure 18:
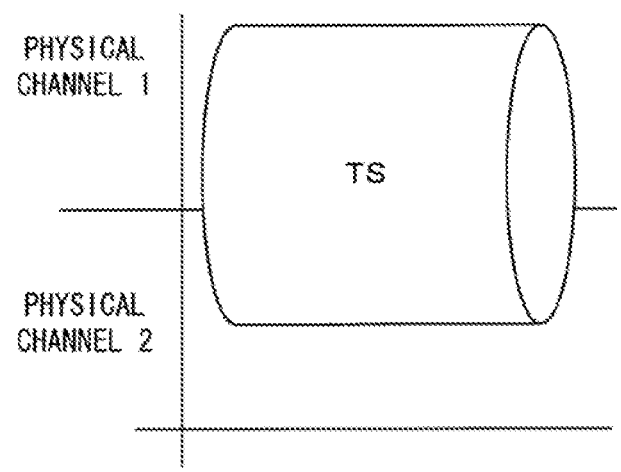
FIG. 18 is a diagram showing the concept of a transport stream that cannot be completely transmitted on one physical channel.

Alternatively, the combination-function-compatible device 80 may be configured to store in advance, in a non-volatile memory (not shown), information (hereinafter referred to as "combinability information") indicating whether or not the combination-function-compatible device 80 itself has the combination function of divided TSs. Then, with reference to the combinability information, the CPU 35 may switch channel selection processes based on the information. FIG. 15 is a flow chart showing a channel selection process performed based on the combinability information. Referring to FIG. 15, in step S51 the combinability information stored in the non-volatile memory is referred to. Then it is determined whether or not the combination-function-compatible device 80 itself has the combination function of divided TSs (or it may be determined whether or not the combinability information per se is present). The combinability information is, for example, 1-bit data, so that it is defined in advance that the data "0" indicates that the combination-function-compatible device 80 does not have the combination function of divided TSs, and the data "1" indicates that the combination-function-compatible device 80 has the combination function of divided TSs. Then, when it is determined that the combination-function-compatible device 80 itself has the combination function of divided TSs ("Yes" in step S51), a combined-ch. selection process similar to that of step S42 is performed. When it is determined that the combination-function-compatible device 80 itself does not have the combination function of divided TSs ("No" in step S51), a single-ch. selection process similar to that of step S43 is performed.

On the other hand, the combination-function-incompatible device may be provided with an execution program that executes the process shown in FIG. 15 and provided with the combinability information, by a method such as an upgrade of firmware (or the program and the combinability information may be initially implemented if the combination-function-incompatible device is newly shipped). Then the combination-function-incompatible device may be configured to perform the process shown in FIG. 15, so as to result in performing the single-ch. selection process. This makes it possible that, to take FIG. 11 as an example, the combination-function-incompatible device selects physical channel 3 and reproduces a program based on the TS 200, while the combination-function-compatible device selects physical channel 1 and physical channel 2, combines the divided TSs and the like, and reproduces a program based on the TS 100, which is a program having high image quality and high sound quality.

Second Embodiment

Figure 19:
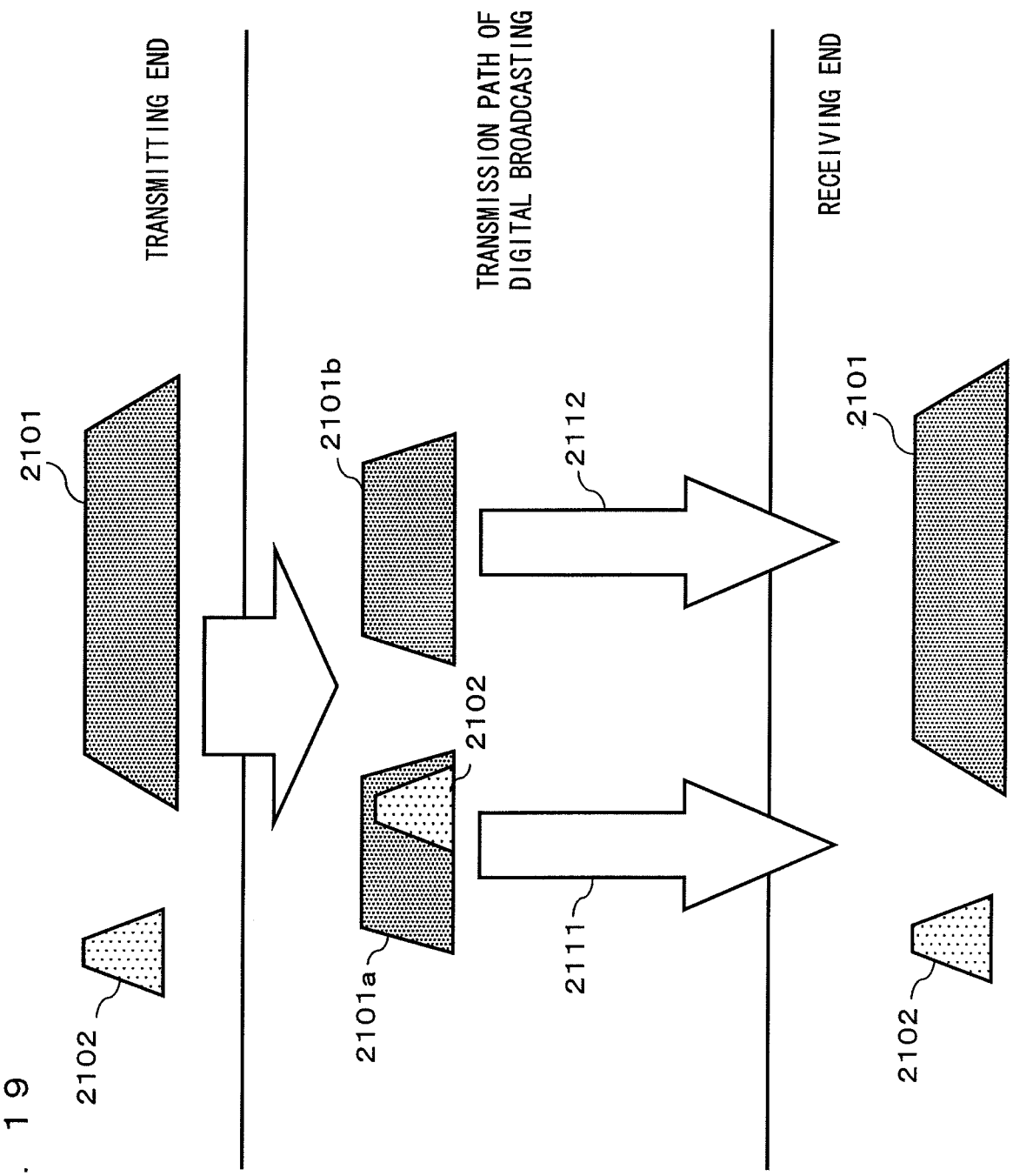
FIG. 19 is a schematic diagram illustrating the concept of the transmission of a Super Hi-Vision program in a second embodiment.

Next, a second embodiment of the present invention is described. Prior to describing details of the second embodiment, a description is given of an overview of transmission in a digital broadcasting system that is commonly assumed in the second embodiment and in third through sixth embodiments described thereafter. In the second embodiment a digital broadcasting system is assumed in which a moving image content of a so-called Hi-Vision standard and a moving image content of a so-called Super Hi-Vision standard are broadcast in a mixed manner. For example, a case is assumed where on specific channels, moving image contents of the Hi-Vision standard are broadcast from 8:00 p.m. to 9:00 p.m. and a moving image content of the Super Hi-Vision standard is broadcast from 9:00 p.m. to 11:00 p.m. Here, it is assumed that a program formed under the Hi-Vision standard has such an amount of information that can be completely transmitted on one physical channel. On the other hand, a program formed under the Super Hi-Vision standard has such an amount of information that cannot be completely transmitted on only one physical channel. Accordingly, when the program formed under the Hi-Vision standard is broadcast, one program is transmitted on one physical channel; whereas, as shown in FIG. 19, when the program formed under the Super Hi-Vision standard is broadcast, broadcast data (a transport stream) 2101 of the program is divided into two and transmitted using two physical channels 2111 and 2112. Hereinafter, such transmission of one program using two physical channels (i.e., using two physical channels bundled together into one transmission path) will be referred to as "bulk transmission". In addition, a program formed under the Super Hi-Vision standard that is subjected to bulk transmission will be referred to as a "bulk program", and a program formed under the Hi-Vision standard that can be completely transmitted on one physical channel will be referred to as a "non-bulk program". Accordingly, to take the above periods as an example, from 8:00 p.m. to 9:00 p.m., non-bulk programs having different materials are displayed on physical channel 1 and physical channel 2 (hereinafter referred to simply as "ch. 1", "ch. 2" . . . ), and from 9:00 p.m. to 11:00 p.m., a bulk program having the same material is displayed on both channels, for example. That is, the same program is displayed on the screen even if either channel is selected.

Here, in the present embodiment, when a bulk program is subjected to bulk transmission, hierarchical transmission is performed using one of the two physical channels used for the bulk transmission. Specifically, at the transmitting end a content having the same material as that of the bulk program is created under the Hi-Vision standard (such a content of the Hi-Vision standard will be hereinafter referred to as a "lower-layer program"). That is, the bulk program and the lower-layer program are different only in that the bulk program is created under the Super Hi-Vision standard and the lower-layer program is created under the Hi-Vision standard, and are the same in program material (the material that is broadcast). In the present embodiment, as modulation schemes, the bulk program is modulated using 32-APSK (Amplitude Phase Shift Keying), and the lower-layer program is modulated using QPSK (Quadrature Phase Shift Keying). Since the lower-layer program (of the Hi-Vision standard) has a smaller amount of information than that of the bulk program, the lower-layer program can be transmitted using a narrower network bandwidth. In the present embodiment, as shown in FIG. 19, on one of the channels used for bulk transmission, a bulk program 2101a and a lower-layer program 2102 are subjected to hierarchical transmission. Note that the video standards of the non-bulk program and the lower-layer program are not limited to Hi-Vision video, and may be SD (Standard Definition) video.

Figure 20:
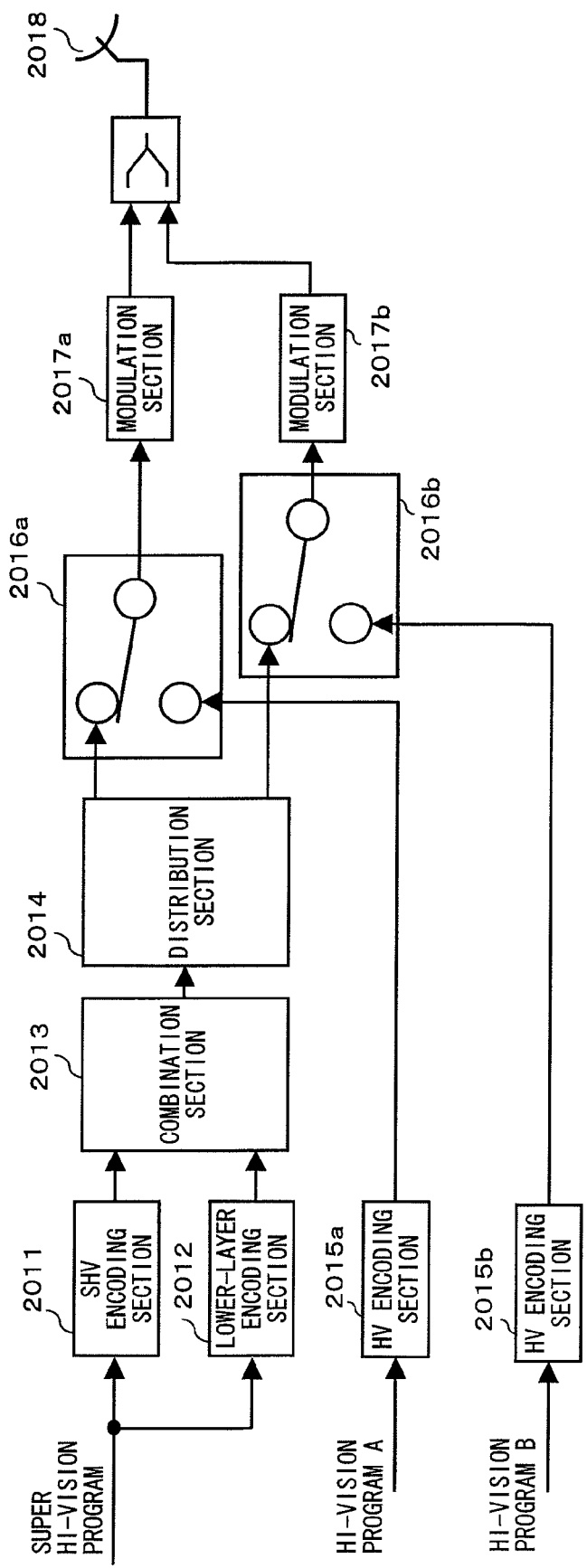
FIG. 20 is a functional block diagram showing an example of a system provided at the transmitting end according to the second embodiment.

FIG. 20 is a functional block diagram showing an example of a system (a transmission device) provided at the transmitting end for performing the broadcasting described above. The transmission device shown in FIG. 20 includes an SHV encoding section 2011, a lower-layer encoding section 2012, a combination section 2013, a distribution section 2014, HV encoding sections 2015a and 2015b, change-over switch sections 2016a and 2016b, modulation sections 2017a and 2017b, and a transmitting antenna 2018.

Referring to FIG. 20, first, a case is described where a program with Super Hi-Vision video is transmitted. In this case, the switches of the change-over switch sections 2016a and 2016b are set so that the modulation sections 2017a and 2017b are connected to the distribution section 2014. With the switches thus set, the program with Super Hi-Vision video is output to the SHV encoding section 2011, is encoded in a predetermined encoded form, and is output to the combination section 2013 as a bulk program 2101. The program with Super Hi-Vision video is also output to the lower-layer encoding section 2012, is encoded in a predetermined encoded form (here encoded so as to have an image quality corresponding to the Hi-Vision standard), and is output to the combination section 2013 as a lower-layer program 2102. The combination section 2013 generates a transport stream having multiplexed the bulk program 2101 and the lower-layer program 2102, and outputs the transport stream to the distribution section 2014. The distribution section 2014 distributes the transport stream to two output destinations, i.e., the change-over switch sections 2016a and 2016b, in accordance with a predetermined rule (at this time, data about the lower-layer program 2102 is output to only the path of either one of the change-over switch sections 2016a and 2016b). The output data is separately input to the modulation sections 2017a and 2017b and modulated into broadcast signals in a predetermined scheme. Then the broadcast signals are output through the transmitting antenna 2018, using different physical channels. As a result, to take FIG. 19 as an example, on one of the physical channels, the lower-layer program 2102 and the Super Hi-Vision program (bulk program) 2101a, which is one of the divided parts described above, are subjected to hierarchical transmission, and on the other physical channel, only a Super Hi-Vision program 2101b, which is the other divided part, is transmitted.

Next, a case is described where non-bulk programs are transmitted. In this case, two non-bulk programs having different materials are transmitted on different channels. The change-over switch sections 2016a and 2016b are switched so that the modulation section 2017a is connected to the HV encoding section 2015a and the modulation section 2017b is connected to the HV encoding section 2015b. Then a Hi-Vision program A, which is a program with Hi-Vision video, is input to the HV encoding section 2015a and is encoded in a predetermined encoded form. In addition, a Hi-Vision program B, which has a different material from that of the Hi-Vision program A, is input to the HV encoding section 2015b and is encoded in a predetermined encoded form. Then the encoded Hi-Vision program A is output from the HV encoding section 2015a to the modulation section 2017a and is modulated into a broadcast signal. Similarly, the encoded Hi-Vision program B is output from the HV encoding section 2015b to the modulation section 2017b and is modulated into a broadcast signal. The broadcast signals are transmitted through the transmitting antenna 2018, using different channels. Thus, in the present embodiment, digital broadcasting is performed while appropriately switching between the outputs of a bulk program and non-bulk programs.

Here, bulk transmission requires, at the reception device end (which is provided with at least two tuners so as to simultaneously receive two physical channels), information (hereinafter referred to as "bulk-related information") for reproducing the bulk program, such as information as to which physical channels are combined to form the bulk program. In the present embodiment the bulk-related information is attached to a so-called TMCC (Transmission and Multiplexing Configuration Control) signal (a signal including transmission parameters and the like) and is transmitted. At the reception device end the bulk-related information is acquired by separating the TMCC signal from a broadcast signal that is selected and received by either one of the tuners. Then, based on the bulk-related information, it is determined, for example, whether or not the program to be transmitted is a bulk program, and if the program is a bulk program, it is determined which channels are combined to form the bulk program. Then a process of performing channel selection, combination, and the like is to be performed.

FIG. 21 is a diagram showing an example of the bulk-related information used in the present embodiment. The bulk-related information includes sets of a physical ch. number 2131, a connection flag 2132, a connection target ch. 2133, and a hierarchical transmission ch. 2134. The bulk-related information includes information about all the physical channels, and the physical ch. number 2131 represents the number of each physical channel. The connection flag 2132 is a flag for identifying whether the program that is broadcast is a bulk program or a non-bulk program. When set to "On", the connection flag 2132 indicates that the program that is transmitted on the physical channel is a bulk program. On the other hand, when set to "Off", the connection flag 2132 indicates that a non-bulk program is broadcast using only the physical channel.

The connection target ch. 2133 is data for, when the program that is broadcast on the physical channel is a bulk program, indicating the physical channel number of the other physical channel that forms the bulk program with the physical channel. Referring to the example of FIG. 21, in a double-tuner reception device, for example, when one of the tuners selects ch. 1 and thereby the bulk-related information shown in FIG. 21 is acquired, it is understood that the program that is broadcast on ch. 1 is a bulk program, and the bulk program is formed of ch. 1 and ch. 2. Accordingly, it is understood that in order to reproduce the bulk program, the other tuner needs to select ch. 2.

The hierarchical transmission ch. 2134 is a flag for indicating, between the two channels used for bulk transmission, the physical channel used for the hierarchical transmission of the lower-layer program. When set to "On", the hierarchical transmission ch. 2134 indicates that the physical channel is the physical channel used for the hierarchical transmission of the lower-layer program.

Thus, in the digital broadcasting system assumed in the present embodiment, a bulk program and a non-bulk program are broadcast in a mixed manner, and the bulk program is subjected to bulk transmission, using two physical channels. A reception device used in each embodiment described below receives digital broadcasting transmitted as described above.

Figure 22:
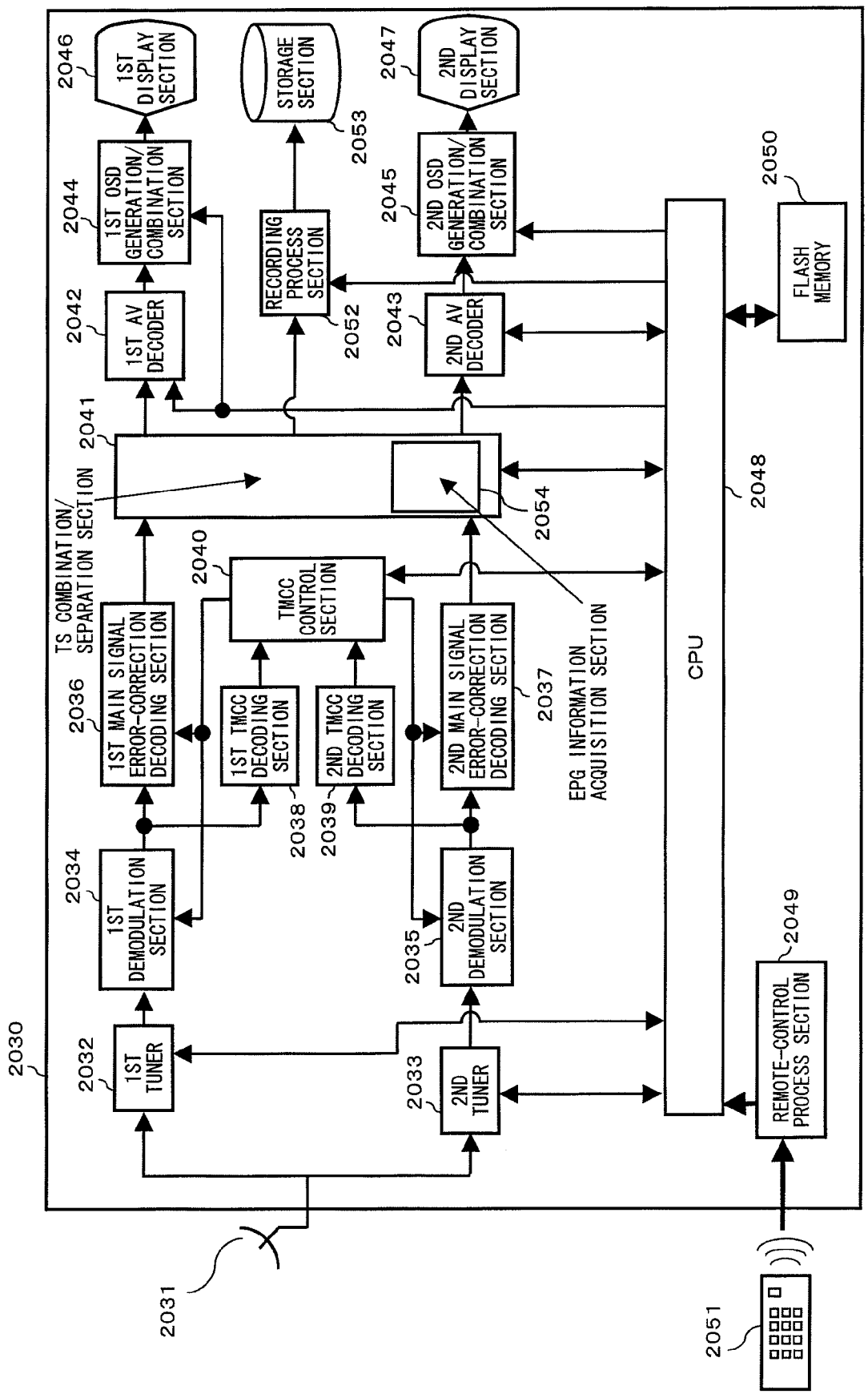
FIG. 22 is a functional block diagram showing the structure of a reception device 2030 according to the second embodiment of the present invention.

Next, a description is given of a reception device according to the second embodiment of the present invention. FIG. 22 is a functional block diagram showing an example of a reception device 2030 according to the second embodiment. Referring to FIG. 22, the reception device 2030 includes an antenna 2031, a first tuner 2032, a second tuner 2033, a first demodulation section 2034, a second demodulation section 2035, a first main signal error-correction decoding section 2036, a second main signal error-correction decoding section 2037, a first TMCC decoding section 2038, a second TMCC decoding section 2039, a TMCC control section 2040, a TS combination/separation section 2041, a first AV decoder 2042, a second AV decoder 2043, a first OSD generation/combination section 2044, a second OSD generation/combination section 2045, a first display section 2046, a second display section 2047, a CPU 2048, a remote-control process section 2049, a flash memory 2050, and a remote control 2051.

The first tuner 2032 and the second tuner 2033 select predetermined physical channels based on control signals from the CPU 2048, and receive digital broadcast signals through the antenna 2031, respectively.

The first demodulation section 2034 demodulates the transmitted signal output from the first tuner 2032 into digital signals, and outputs the digital signals to the first main signal error-correction decoding section 2036 and the first TMCC decoding section 2038.

Figure 23:
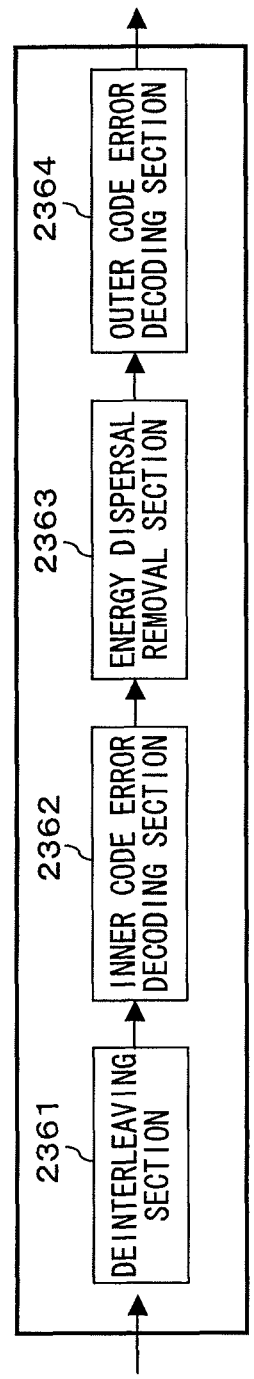
FIG. 23 is a block diagram showing details of a first main signal error-correction decoding section 2036.

The first main signal error-correction decoding section 2036 performs an error-correction decoding process on the digital signal output from the first demodulation section 2034, and thereby obtains a transport stream. Then the first main signal error-correction decoding section 2036 outputs the transport stream to the TS combination/separation section 2041. FIG. 23 is a block diagram showing details of the first main signal error-correction decoding section 2036. Referring to FIG. 23, in the first main signal error-correction decoding section 2036: a deinterleaving section 2361 deinterleaves the digital signal output from the first demodulation section 2034; an inner code error decoding section 2362 decodes an inner code of the digital signal; an energy dispersal removal section 2363 performs energy dispersal removal of the digital signal; and an outer code error decoding section 2364 decodes an outer code of the digital signal. Then the resulting digital signal is output as a transport stream.

The first TMCC decoding section 2038 decodes the digital signal (TMCC signal) output from the first demodulation section 2034, and thereby acquires TMCC information from the decoded digital signal. Then the first TMCC decoding section 2038 outputs the TMCC information to the TMCC control section 2040.

The second demodulation section 2035, the second main signal error-correction decoding section 2037, and the second TMCC decoding section 2039 perform, on the transmitted signal output from the second tuner 2033, similar processes to those performed by the first demodulation section 2034, the first main signal error-correction decoding section 2036, and the first TMCC decoding section 2038, respectively.

The TMCC control section 2040 controls the first demodulation section 2034 and the first main signal error-correction decoding section 2036 based on the TMCC information (more precisely, information about various transmission parameters acquired from the TMCC information, and the like) output from the first TMCC decoding section 2038. The TMCC control section 2040 also controls the second demodulation section 2035 and the second main signal error-correction decoding section 2037 based on the TMCC information output from the second TMCC decoding section 2039. The TMCC control section 2040 also outputs the acquired TMCC information to the CPU 2048.

The TS combination/separation section 2041 performs processes by switching between the following three types of process modes based on a control signal from the CPU 2048. As a first process mode, the TS combination/separation section 2041 performs a process of reproducing a bulk program. In this case, the TS combination/separation section 2041 combines both transport streams output from the first main signal error-correction decoding section 2036 and the second main signal error-correction decoding section 2037, and thereby reconstructs the transport stream that has yet to be divided into two at the transmitting end. The TS combination/separation section 2041 also separates and obtains an AV stream of a bulk program and an AV stream of the lower-layer program from the combined transport stream. Then the TS combination/separation section 2041 outputs at least one of the AV streams of the bulk program and the lower-layer program to at least one of the first AV decoder 2042 and the second AV decoder 2043, based on a control signal from the CPU 2048.

As a second process mode, the TS combination/separation section 2041 performs a process of reproducing non-bulk programs. In this case, the TS combination/separation section 2041 does not combine the transport streams output from the first main signal error-correction decoding section 2036 and the second main signal error-correction decoding section 2037. That is, the TS combination/separation section 2041 separates an AV stream from the transport stream output from the first main signal error-correction decoding section 2036, and outputs the AV stream to the first AV decoder 2042. The TS combination/separation section 2041 also separates an AV stream from the transport stream output from the second main signal error-correction decoding section 2037, and outputs the AV stream to the second AV decoder 2043.

As a third process mode, the TS combination/separation section 2041 performs a process of reproducing a lower-layer program. In this case, the TS combination/separation section 2041 separates an AV stream of a lower-layer program from the transport stream (a transport stream obtained on the physical channel used for hierarchical transmission) output from the first main signal error-correction decoding section 2036 or the second main signal error-correction decoding section 2037, and outputs the AV stream to the first AV decoder 2042 or the second AV decoder 2043. Hereinafter, the process mode for reproducing a bulk program will be referred to as a "bulk reproduction mode", and the process mode for reproducing non-bulk programs will be referred to as a "non-bulk reproduction mode". In addition, the process mode for reproducing a lower-layer program will be referred to as a "lower-layer reproduction mode". Note that the TS combination/separation section 2041 can simultaneously perform the processes of the non-bulk reproduction mode and the lower-layer reproduction mode. The TS combination/separation section 2041 also appropriately outputs each AV stream to a recording process section 2052, based on a control signal from the CPU 2048.

In addition, the TS combination/separation section 2041 includes an EPG information acquisition section 2054. The EPG information acquisition section 2054 separates and obtains data about an EPG (Electronic Program Guide) from the transport stream output from the first main signal error-correction decoding section 2036 or the second main signal error-correction decoding section 2037. Based on a control signal from the CPU 2048, the EPG information acquisition section 2054 also appropriately outputs the EPG to the screen for the use of the user's timer-recording operation. Here, the EPG includes, as well as data about the broadcast time and the broadcast material of each program, information indicating whether or not the program is a bulk program, and information indicating the physical channels forming the bulk program. As to the bulk program, the EPG further includes information about the physical channel used for the hierarchical transmission of the lower-layer program. Note that the EPG information acquisition section 2054 may be configured to acquire the EPG from, for example, the Internet.

Based on a control signal from the CPU 2048, the first AV decoder 2042 and the second AV decoder 2043 each decode the corresponding AV stream output from the TS combination/separation section 2041, and thereby obtain video and audio signals. The first AV decoder 2042 outputs to the first display section 2046 the resulting video and audio signals obtained from the decoding. The second AV decoder 2043 outputs to the second display section 2047 the resulting video and audio signals obtained from the decoding. Here, the first AV decoder 2042 and the second AV decoder 2043 are each capable of performing a decoding process at least in decoded forms corresponding to the encoded forms of both AV streams of a bulk program and a non-bulk program. Based on a control signal from the CPU 2048, the first AV decoder 2042 and the second AV decoder 2043 each perform the decoding process by appropriately switching between these decoded forms.

The first OSD generation/combination section 2044 generates an OSD to be displayed superimposed on a screen image that is output from the first AV decoder 2042 to the first display section 2046. Then the first OSD generation/combination section 2044 combines the output from the first AV decoder 2042 and the generated OSD, and outputs the combined result to the first display section 2046. The second OSD generation/combination section 2045 generates an OSD to be displayed superimposed on a screen image that is output from the second AV decoder 2043 to the second display section 2047, combines the output from second AV decoder 2043 and the generated OSD, and outputs the combined result to the second display section 2047.

The first display section 2046 and the second display section 2047 correspond to the two screen images of so-called picture-in-picture display, respectively. The first display section 2046 presents video and audio to the user based on the video and audio signals output from the first AV decoder 2042. The second display section 2047 presents video and audio to the user based on the video and audio signals output from the second AV decoder 2043.

The CPU 2048 performs a process of allowing the user to view a bulk program, a lower-layer program, or a non-bulk program, by controlling the first tuner 2032, the second tuner 2033, the TS combination/separation section 2041, the first AV decoder 2042, the second AV decoder 2043, and the like while switching between the bulk reproduction mode, the non-bulk reproduction mode, and the lower-layer reproduction mode.

The remote-control process section 2049 receives an operation signal from the remote control 2051, and outputs a signal representing the operating instruction to the CPU 2048.

The flash memory 2050 is a non-volatile memory and stores data (hereinafter referred to as a "timer-recording setting list") about timer-recording setting. FIG. 24 is a diagram showing an example of the data structure of the timer-recording setting list. Referring to FIG. 24, a timer-recording setting list 2500 includes sets of a broadcast period 2501, a broadcast channel 2502, program identification information 2503, program information 2054, and the like. The broadcast period 2501 represents the broadcast date and the broadcast period of a program to be timer-recorded. The broadcast channel 2502 represents the physical channel on which the program is broadcast. The broadcast channel 2502 stores two physical channels in the case of a bulk program, and stores only one physical channel in the case of a non-bulk program or a lower-layer program. The program identification information 2503 is information indicating the type of the program to be timer-recorded, i.e., indicating whether the program to be timer-recorded is a bulk program, a non-bulk program, or a lower-layer program. The program information 2054 is data of the bibliographical items (the program title, the names of the performers, etc.) of the program. The flash memory 2050 also stores data used for various controls performed by the CPU 2048.

Based on a control signal from the CPU 2048, the recording process section 2052 performs processes (an encoding process, a recording data management process, etc.) for recording each program (i.e., the AV streams output from the TS combination/separation section 2041) in a storage section 2053. The storage section 2053 is a storage medium for recording each program therein, and is implemented with, for example, a hard disk drive or an SSD (Solid State Drive).

Figure 25:
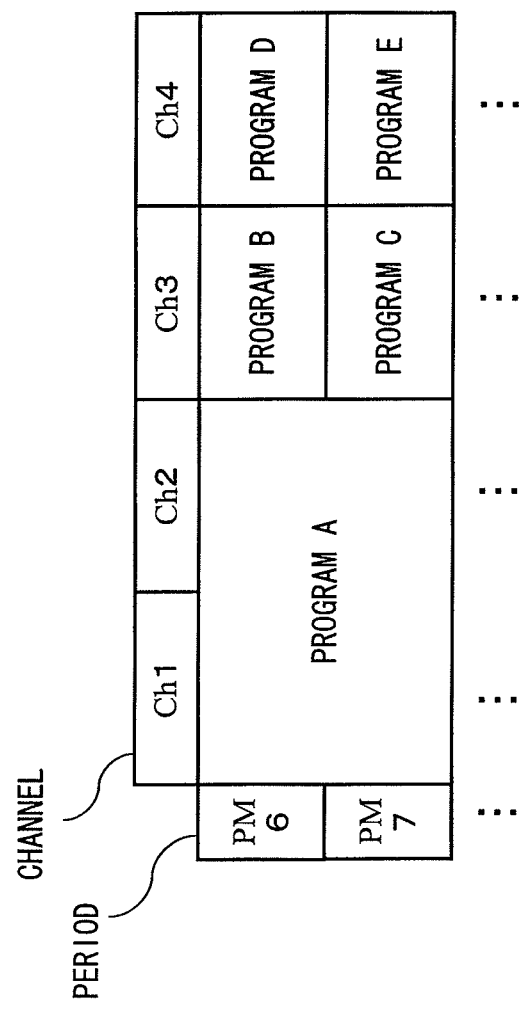
FIG. 25 is an example of a broadcast schedule for describing the present embodiment.

Next, a description is given of an overview of a channel-selection/reproduction process performed by the reception device 2030. In the present embodiment the following state is assumed as a premise of the description below. First, the channels to be viewed are ch. 1 through ch. 4. Then the broadcast schedule of these channels is set as a schedule as shown in FIG. 25. That is, it is assumed that on ch. 1 and ch. 2, a "program A", which is a bulk program, is broadcast from 6:00:00 p.m. to 7:59:59 p.m. On ch. 3, a "program B", which is a non-bulk program, is broadcast from 6:00:00 p.m. to 6:59:59 p.m., and a "program C", which is a non-bulk program, is broadcast from 7:00:00 p.m. to 7:59:59 p.m. On ch. 4, a "program D", which is a non-bulk program, is broadcast from 6:00:00 p.m. to 6:59:59 p.m., and a "program E", which is a non-bulk program, is broadcast from 7:00:00 p.m. to 7:59:59 p.m.

Consider the case where in this broadcast schedule the user selects ch. 1 while the "program B" is being recorded. The case is where, referring to FIG. 25, the user selects ch. 1 at 6:30:00 p.m., for example. In this case, the "program B" is being recorded, that is, either one of the tuners is being used (has selected ch. 3). On the other hand, the "program A", which is being broadcast on ch. 1, is a bulk program subjected to bulk transmission, using ch. 1 and ch. 2, and therefore requires two physical channels to be selected. However, since one of the tuners is being used to record the "program B", ch. 2 cannot be selected, and therefore the bulk program cannot be viewed. In response, in the present embodiment a process is performed of reproducing and displaying the lower-layer program subjected to the hierarchical transmission with the bulk program. That is, the lower-layer program can be reproduced if only the physical channel used for the hierarchical transmission can be selected, and the program material per se is the same as that of the bulk program. Accordingly, a process of reproducing the "program A" as the lower-layer program is performed. This makes it possible to allow the program per se corresponding to the bulk transmission to be viewed, even while the "program B" is being recorded.

Figure 26:
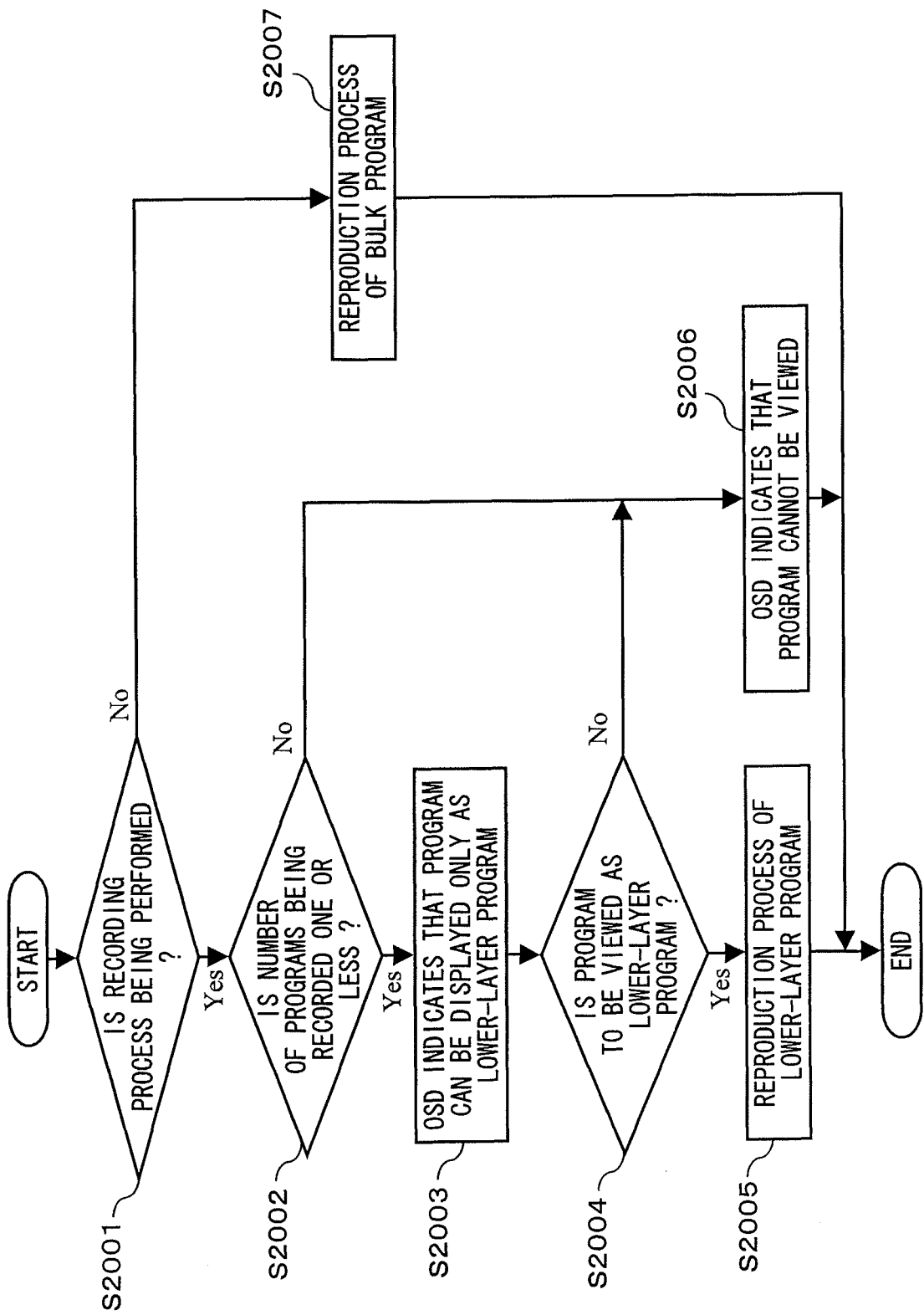
FIG. 26 is a flow chart showing details of a channel-selection/reproduction process according to the second embodiment.

Next, a description is given of details of a channel-selection/reproduction process according to the second embodiment. FIG. 26 is a flow chart showing the details of the channel-selection/reproduction process. Here, the process of the flow chart of FIG. 26 is performed based on the user's operation (e.g., pressing numeric button "1" of the remote control 2051) of selecting a physical channel on which a bulk program is being broadcast. Here, it is assumed that the first tuner 2032 is used to perform channel selection based on the user's operation.

Referring to FIG. 26, when the user selects a channel (ch. 1, in this example) of a bulk program with the remote control 2051, in step S2001 it is determined whether or not a recording process is being performed by the reception device 2030. That is, at the time when a channel of a bulk program has been selected, it is determined whether or not any other program is being recorded.

When it is determined that a recording process is not being performed ("No" in step S2001), in step S2007 a process is started of reproducing the bulk program that is being broadcast on the selected channel, since both two tuners are available. Specifically, with reference to the bulk-related information, the CPU 2048 performs a process of causing the second tuner 2033 to select the physical channel indicated by the connection target ch. 2133 regarding ch. 1. That is, a process is performed of causing the first tuner 2032 and the second tuner 2033 to have selected the two physical channels on which the bulk program is transmitted. Then broadcast signals received by both tuners are decoded and the like, and thereby transport streams are obtained. Then the CPU 2048 outputs to the TS combination/separation section 2041 a control signal for switching the process mode to the bulk reproduction mode. As a result, the TS combination/separation section 2041 starts a process of combining the transport stream obtained through the first tuner 2032 and the transport stream obtained through the second tuner 2033. Then the TS combination/separation section 2041 separates an AV stream of the bulk program from the combined transport stream, and outputs the AV stream of the bulk program to the first AV decoder 2042. The first AV decoder 2042 decodes the AV stream of the bulk program, and starts a process of outputting the resulting video and audio signals to the first display section 2046 through the first OSD generation/combination section 2044. Thus the bulk program is displayed on the screen, that is, the reproduction process of the bulk program is started. Then the channel-selection/reproduction process ends.

On the other hand, when it is determined that a recording process is being performed ("Yes" in step S2001), in step S2002 it is determined whether or not the number of the programs that are being recorded is one or less. When it is determined that the number of the programs that are being recorded is not one or less, i.e., when both two tuners are being used for recording, e.g., when both the "program B" and the "program D" of FIG. 25 are being recorded ("No" in step S2002), in step S2006 a process is performed of displaying an OSD to indicate that the specified channel cannot be selected or viewed. More specifically, the CPU 2048 outputs to the first OSD generation/combination section 2044 a control signal for causing the first OSD generation/combination section 2044 to generate a message to that effect. In response to this, the first OSD generation/combination section 2044 generates an OSD to the effect. Then the first OSD generation/combination section 2044 outputs the generated OSD to the first display section 2046. As a result, it is indicated on the screen that the selected channel cannot be viewed.

On the other hand, when it is determined that the number of the programs that are being recorded is one or less ("Yes" in step S2002), e.g., when only the "program B" of FIG. 25 is being recorded, in step S2003 a process is performed of displaying an OSD to indicate that the program on the selected physical channel can be displayed only as the lower-layer program, and to inquire as to whether or not the program is to be viewed as the lower-layer program. For example, a process is performed of displaying an OSD to indicate a message, such as "The program to be broadcast is a Super Hi-Vision program, but can be viewed only with Hi-Vision image quality. Do you wish to view it with Hi-Vision image quality?". Then the CPU 2048 receives a response operation from the user.

In step S2004 it is determined whether or not the user has chosen to view the lower-layer program as a result of the inquiry of step S2003. When the user has not chosen to view the lower-layer program ("No" in step S2004), the process proceeds to step S2006. On the other hand, when the user has chosen to view the lower-layer program ("Yes" in step S2004), in step S2005 a process of reproducing the lower-layer program is performed. That is, with reference to the hierarchical transmission ch. 2134 of the bulk-related information, the CPU 2048 detects the physical channel number of the physical channel used for the hierarchical transmission. When the physical channel used for the hierarchical transmission is not selected at that time, the CPU 2048 outputs to the first tuner 2032 a control signal for causing the first tuner 2032 to select the physical channel used for the hierarchical transmission. The CPU 2048 also outputs to the TS combination/separation section 2041 a control signal for switching the process mode to the lower-layer reproduction mode. The CPU 2048 also outputs to the first AV decoder 2042 a control signal for switching to the decoding process for the lower-layer program. As a result, when the transport stream obtained from the first tuner 2032 is input to the TS combination/separation section 2041, the TS combination/separation section 2041 separates an AV stream of the lower-layer program from the transport stream, and outputs the AV stream to the first AV decoder 2042. Then the resulting video and audio signals obtained from decoding are output from the first AV decoder 2042 to the first display section 2046 through the first OSD generation/combination section 2044. Thus the reproduction of the lower-layer program is started. Thus the channel-selection/reproduction process according to the second embodiment ends.

As described above, in the second embodiment, when a physical channel of a bulk program is selected while the recording process of a non-bulk program is being performed, a lower-layer program subjected to the hierarchical transmission with the bulk program is reproduced. This makes it possible to allow the program material of the bulk program to be viewed even while a given non-bulk program is being recorded. That is, it is possible to allow both a program corresponding to bulk transmission to be viewed and a non-bulk program to be recorded (i.e., record another program on another channel). In addition, an OSD is displayed to indicate that the program is to be reproduced as the lower-layer program or that the program cannot be viewed, and therefore the user can understand a viewing condition with ease.

Third Embodiment

Figure 27:
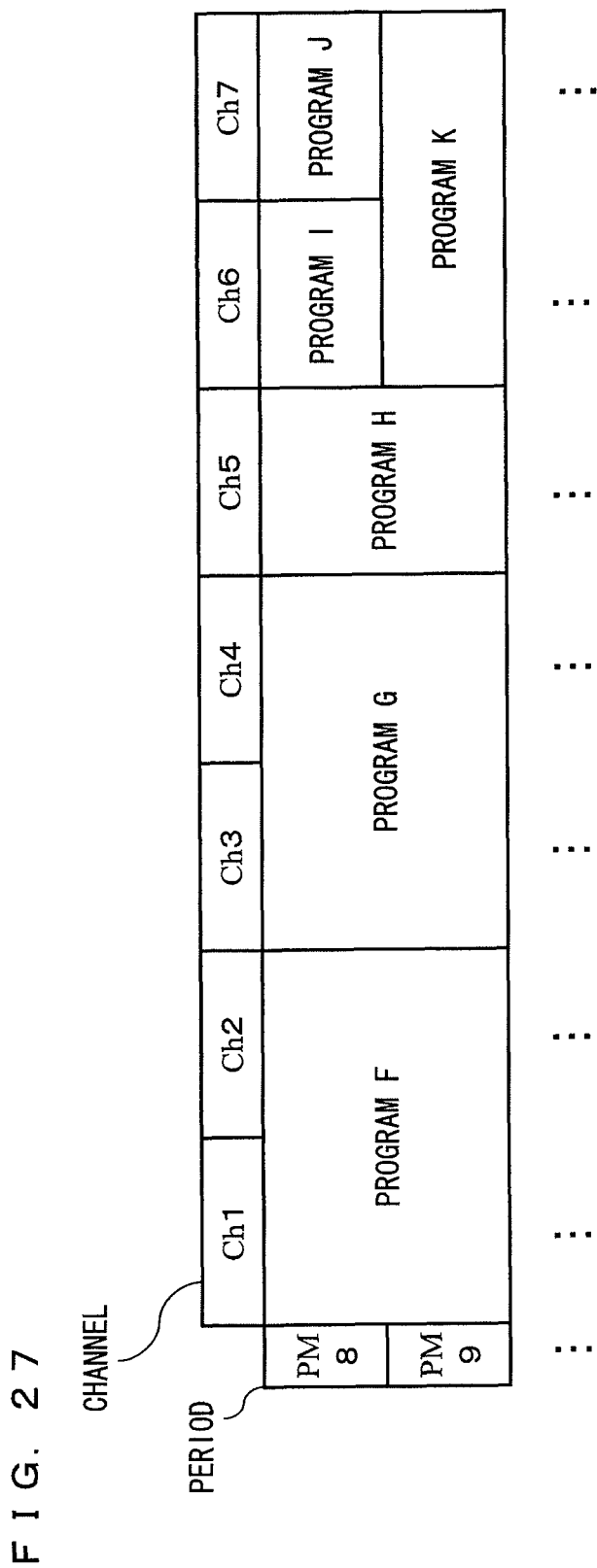
FIG. 27 is an example of a broadcast schedule for describing the present embodiment.

Next, a third embodiment of the present invention is described with reference to FIGS. 27 and 28. In the second embodiment described above a case is assumed where a physical channel of a bulk program is selected while a recording is being performed. In contrast, in the third embodiment a case is assumed where a timer-recording setting is made. Note that a reception device according to the present embodiment is the same as that according to the second embodiment, and therefore will be denoted by the same numerals and will not be described in detail.

A description is given below of an overview of the process of the third embodiment. In the third embodiment a broadcast schedule is assumed as shown in FIG. 27. Referring to FIG. 27, in a two-hour time slot from 8:00:00 p.m. to 9:59:59 p.m., a "program F", which is a bulk program, is broadcast on ch. 1 and ch. 2, and a "program G", which is also a bulk program, is broadcast on ch. 3 and ch. 4. Further, in the same two-hour time slot, a "program H", which is a non-bulk program, is broadcast on ch. 5. On ch. 6 and ch. 7, a "program I" and a "program J", which are non-bulk programs, are broadcast, respectively, from 8:00:00 p.m. to 8:59:59 p.m., and on both channels, a "program K", which is a bulk program, is broadcast from 9:00:00 p.m. to 9:59:59 p.m.

In the third embodiment the following process is performed in this broadcast schedule. For example, when the user attempts to make the timer-recording setting of the "program H", which is a non-bulk program, it is determined whether or not, in the reception device 2030, a program of which the timer-recording setting has already been made is present that conflicts with the broadcast period of the "program H". Then, when the timer-recording setting of a bulk program, e.g., the "program F", has already been registered, an OSD is displayed to indicate that the "program H" cannot be recorded.

A description is given of details of a timer-recording process according to the third embodiment. FIG. 28 is a flow chart showing the details of the timer-recording process. The process of the flow chart is performed when the user performs an operation of registering the timer-recording setting of a non-bulk program.

Figure 28:
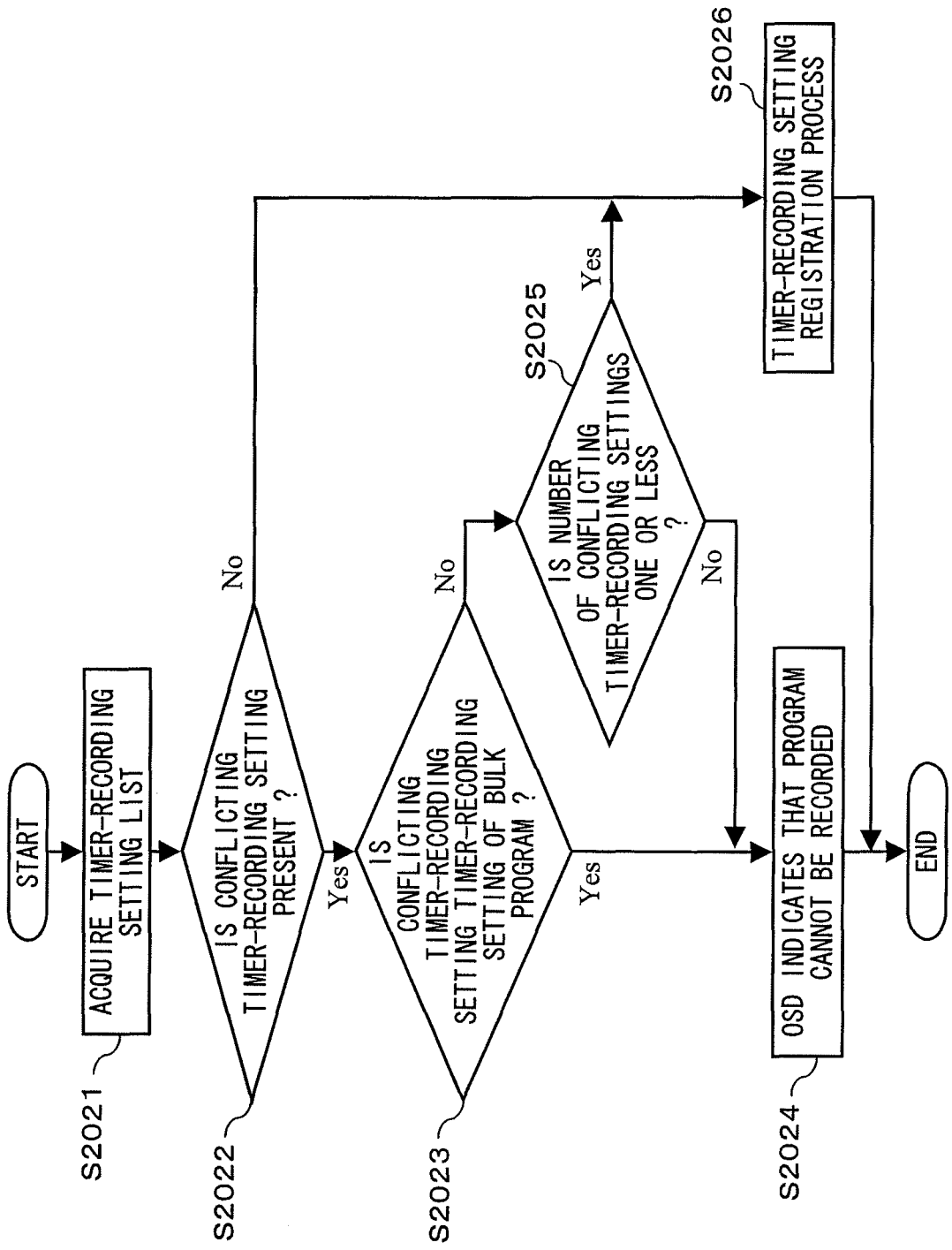
FIG. 28 is a flow chart showing details of a timer-recording process according to a third embodiment.

Referring to FIG. 28, in step S2021 the timer-recording setting list 2500 (see FIG. 24) is acquired from the flash memory 2050. In step S2022 it is determined whether or not a timer-recording setting is present that conflicts with the broadcast period of a program (hereinafter referred to as a "timer-recording-desired program") of which the timer-recording setting is to be made by the user. When it is determined that a conflicting timer-recording setting is not present ("No" in step S2021), in step S2026 a process is performed of registering the timer-recording setting of the timer-recording-desired program in the flash memory 2050.

On the other hand, when it is determined that a conflicting timer-recording setting is present ("Yes" in step S2022), in step S2023 it is determined, based on the program identification information 2503, whether or not the conflicting program to be timer-recorded is a bulk program. When it is determined that the conflicting program to be timer-recorded is a bulk program ("Yes" in step S2023), in step S2024 a process is performed of displaying an OSD to indicate that the timer-recording setting of the timer-recording-desired program cannot be made. The reason is that, since the recording of the bulk program requires two tuners, any further timer-recording setting cannot be made.

When it is determined that the conflicting program to be timer-recorded is not a bulk program, i.e., the conflicting program is a non-bulk program ("No" in step S2023), in step S2025 it is determined whether or not the number of the conflicting timer-recording settings is one or less. When it is determined that the number of the conflicting timer-recording settings is one or less ("Yes" in step S2025), only one of the tuners is to be used for recording in this period, and therefore the timer-recording-desired program can be recorded using the other tuner. Accordingly, in step S2026 a process is performed of making the timer-recording setting of the timer-recording-desired program. On the other hand, when the number of the conflicting timer-recording settings is not one or less ("No" in step S2025), it is considered that no tuner is available since the timer-recording settings of two non-bulk programs have already been registered. Accordingly, in this case, in step S2024 a process is performed of displaying an OSD to indicate that the timer-recording setting of the timer-recording-desired program cannot be made. Thus the timer-recording process according to the third embodiment ends.

As described above, in the third embodiment, when the timer-recording setting of a non-bulk program is made, it is determined whether or not the timer-recording setting of the non-bulk program conflicts with the timer-recording setting of a bulk program. When these timer-recording settings conflict with each other, an OSD is displayed to indicate a warning. This makes it possible to improve the convenience of the reception device when the user performs a timer-recording operation.

Fourth Embodiment

Next, a fourth embodiment of the present invention is described. In the fourth embodiment, similarly to the third embodiment, a case is assumed where the timer-recording setting of a non-bulk program is made. Note that in the third embodiment, when the period of a non-bulk program that is desired to be timer-recorded conflicts with the timer-recording setting of a bulk program, an OSD is displayed to only indicate that the timer-recording setting of the non-bulk program cannot be made. In the fourth embodiment, however, a lower-layer program is used in this case. That is, in the fourth embodiment the number of tuners to be used to record the bulk program is reduced to one by changing the prior timer-recording setting of the bulk program to the timer-recording setting of the lower-layer program so that the timer-recording setting of the timer-recording-desired program can be registered. To take the broadcast schedule shown in FIG. 27 as an example, a case is assumed where the user performs an operation of making the timer-recording setting of, for example, the "program H", which is a non-bulk program. At this time, when the timer-recording setting of the "program F", which is a bulk program, has already been made, in the present embodiment the recording setting of the "program F" as a bulk program is changed to the recording setting of the "program F" as a lower-layer program so that both the "program F" and the "program H" can be recorded. Note that a reception device according to the present embodiment is the same as that according to the second embodiment, and therefore will be denoted by the same numerals and will not be described in detail.

Figure 29:
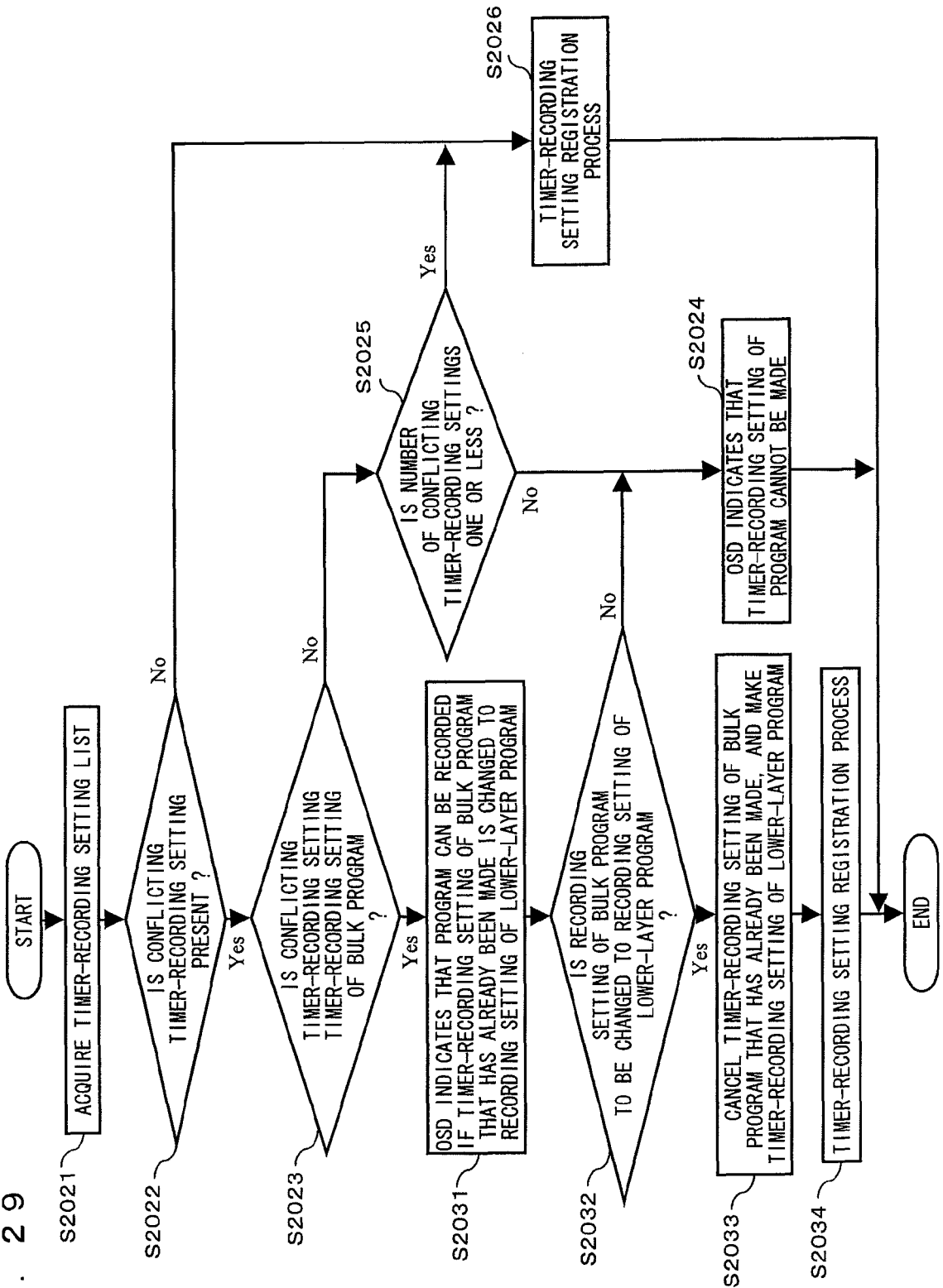
FIG. 29 is a flow chart showing details of a timer-recording process according to a fourth embodiment.

A description is given of details of a timer-recording process according to the fourth embodiment. FIG. 29 is a flow chart showing the details of the timer-recording process. The process of the flow chart is performed when the user performs an operation of registering the timer-recording setting of a non-bulk program. Note that the process of step S2021 through to step S2026 in FIG. 29 is the same as that of step S2021 through to step S2026 described above with reference to FIG. 28 in the third embodiment, and therefore will not be described in detail.

Referring to FIG. 29, in step S2023 it is determined whether or not the conflicting program to be timer-recorded is a bulk program. When it is determined that the conflicting program to be timer-recorded is a bulk program ("Yes" in step S2023), in step S2031 a process is performed of displaying an OSD to indicate the following. That is, the OSD is displayed to indicate that the timer-recording-desired program can be recorded if the timer-recording setting of the bulk program that has already been made is changed to the recording setting of the lower-layer program. That is, a process is performed of displaying an OSD to indicate that the non-bulk program that is desired to be timer-recorded can be recorded if the timer-recording setting that is currently made with Super Hi-Vision video is changed to the recording setting with Hi-Vision video. In addition, a process is performed of displaying an OSD to inquire as to whether or not the timer-recording setting of the bulk program that has already been made is to be changed to the recording setting of the lower-layer program. Then a response operation from the user is received.

In step S2032 it is determined whether or not the user's response to the inquiry indicates an instruction to change the recording setting of the bulk program to the recording setting of the lower-layer program. When it is determined that an instruction to change the recording setting of the bulk program to the recording setting of the lower-layer program is not indicated ("No" in step S2032), in step S2024 an OSD is displayed to indicate that the timer-recording setting of the timer-recording-desired program cannot be made.

On the other hand, when it is determined that an instruction to change the recording setting of the bulk program to the recording setting of the lower-layer program is indicated ("Yes" in step S2032), in step S2033 the conflicting timer-recording setting of the bulk program is canceled. Then the timer-recording setting of the lower-layer program subjected to the hierarchical transmission with the bulk program is registered in the timer-recording setting list 2500. Specifically, the physical channel used for the hierarchical transmission (it is assumed that information about the physical channel used for the hierarchical transmission is included in the EPG) is stored in the broadcast channel 2502 of the timer-recording setting list 2500. Information indicating a lower-layer program is stored in the program identification information 2503. The same information as that about the canceled bulk program is stored in the broadcast period 2501 and the program information 2054. In step S2034 the timer-recording setting of the timer-recording-desired program is registered in the timer-recording setting list 2500. Thus the timer-recording process according to the fourth embodiment ends.

As described above, in the fourth embodiment, if the timer-recording setting of a non-bulk program conflicts with the timer-recording setting of a bulk program, the timer-recording setting of the bulk program is changed to the timer-recording setting of the lower-layer program so that the non-bulk program can be timer-recorded. This makes it possible to prevent the case where any further program cannot be recorded in the period when the bulk program is timer-recorded. That is, it is possible to record both a program corresponding to bulk transmission (a program corresponding to Super Hi-Vision broadcasting) and a non-bulk program (a program corresponding to Hi-Vision broadcasting).

Fifth Embodiment

Next, a fifth embodiment of the present invention is described. In the third and fourth embodiments a case is assumed where the timer-recording setting of a non-bulk program is made. In contrast, in the fifth embodiment a case is assumed where the timer-recording setting of a bulk program is made. That is, this process is performed in the case where, when the timer-recording setting of a bulk program is made, the timer-recording setting of the bulk program conflicts with another timer-recording setting. Note that a reception device according to the present embodiment is the same as that according to the second embodiment, and therefore will be denoted by the same numerals and will not be described in detail. Also in the fifth embodiment the broadcast schedule shown in FIG. 27 is assumed.

Figure 30:
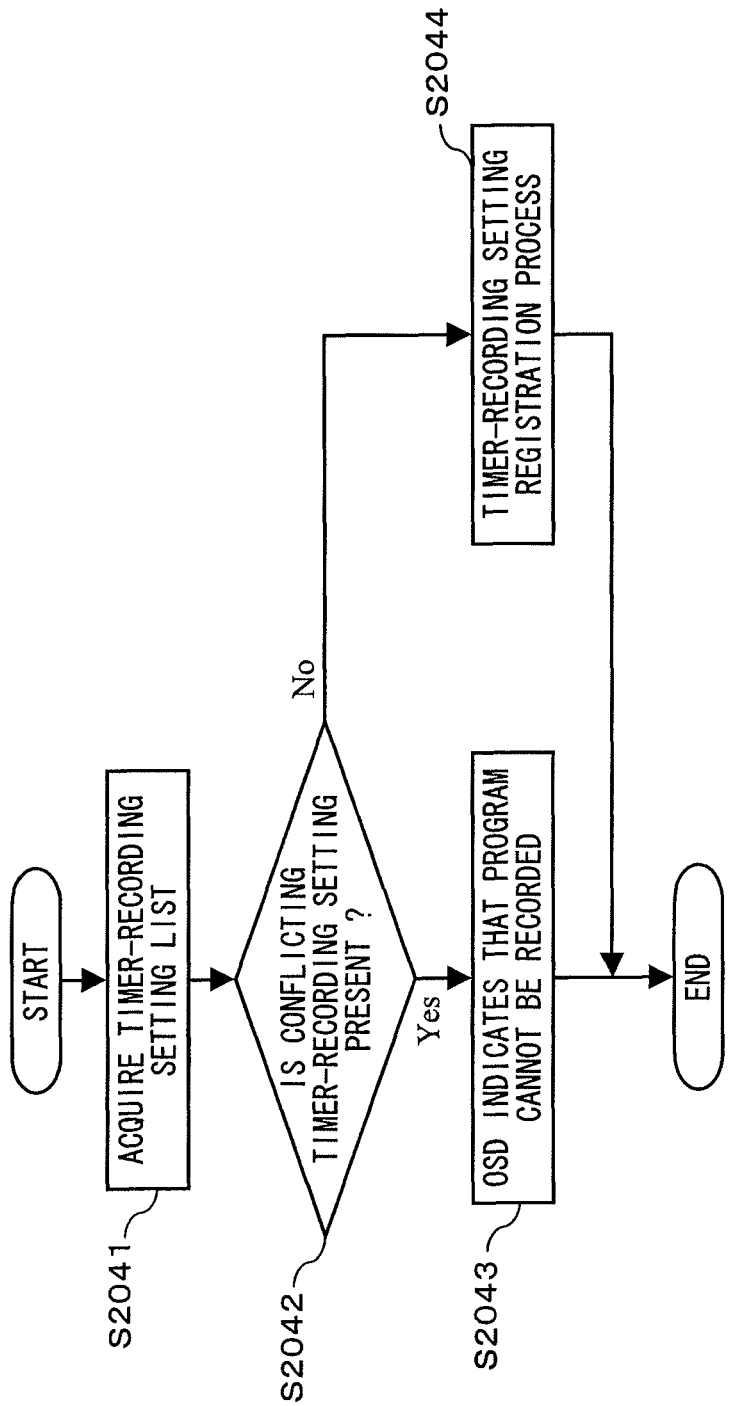
FIG. 30 is a flow chart showing details of a timer-recording process according to a fifth embodiment.

A description is given of details of a timer-recording process according to the fifth embodiment. FIG. 30 is a flow chart showing the details of the timer-recording process. The process of the flow chart is performed when the user performs an operation of registering the timer-recording setting of a bulk program. Note that the process of steps S2041 and S2042 is the same as that of steps S2021 and S2022 described above with reference to FIG. 28 in the third embodiment, and therefore will not be described in detail.

Referring to FIG. 30, in step S2041 the timer-recording setting list 2500 is acquired from the flash memory 2050. In step S2042 it is determined whether or not a timer-recording setting is present that conflicts with the broadcast period of a timer-recording-desired program. When it is determined that a conflicting timer-recording setting is not present ("No" in step S2042), in step S2044 a process is performed of registering the timer-recording setting of the timer-recording-desired program in the flash memory 2050.

On the other hand, when it is determined that a conflicting timer-recording setting is present ("Yes" in step S2042), in step S2043 a process is performed of displaying an OSD to indicate that the timer-recording setting of the timer-recording-desired program cannot be made. That is, since the recording of the bulk program requires two tuners, the timer-recording setting of the bulk program cannot be made if the timer-recording setting of the bulk program conflicts with any other timer-recording setting, regardless of whether it is another bulk program or a non-bulk program. Therefore, when a conflicting timer-recording setting is present, it is determined that the bulk program cannot be recorded. Thus the timer-recording process according to the fifth embodiment ends.

As described above, in the fifth embodiment, when the timer-recording setting of a bulk program is made, it is determined whether or not the timer-recording setting of the bulk program conflicts with any other timer-recording setting. When these recording settings conflict with each other, an OSD is displayed to indicate a warning that the timer-recording setting of the bulk program cannot be made. This makes it possible to improve the convenience of the reception device when the user performs a timer-recording operation.

Sixth Embodiment

Next, a sixth embodiment of the present invention is described. In the sixth embodiment, similarly to the fifth embodiment, a case is assumed where the timer-recording setting of a bulk program is made. Note that in the fifth embodiment, when the period of a bulk program that is desired to be timer-recorded conflicts with the timer-recording setting of any other program, an OSD is displayed to only indicate that the timer-recording setting of the bulk program cannot be made. In the sixth embodiment, however, a lower-layer program is used in this case. That is, in the sixth embodiment the number of tuners to be used to record the bulk program is reduced to one by appropriately changing the timer-recording setting of the bulk program to the timer-recording setting of the lower-layer program so that the timer-recording setting of the timer-recording-desired program can be registered. To take the broadcast schedule shown in FIG. 27 as an example, a case is assumed where the user performs an operation of making the timer-recording setting of, for example, the "program G". At this time, when the timer-recording setting of the "program F", which is a bulk program, has already been made, in the present embodiment both the "program F" and the "program G" are to be timer-recorded as the respective lower-layer programs so that both programs can be recorded. In addition, if the timer-recording setting of the "program H", which is a non-bulk program, has already been made when the user performs an operation of making the timer-recording setting of the "program G", the "program G" is to be timer-recorded as the lower-layer program so that both the "program G" and the "program H" can be recorded.

Note that a reception device according to the present embodiment is the same as that according to the second embodiment, and therefore will be denoted by the same numerals and will not be described in detail.

Figure 31:
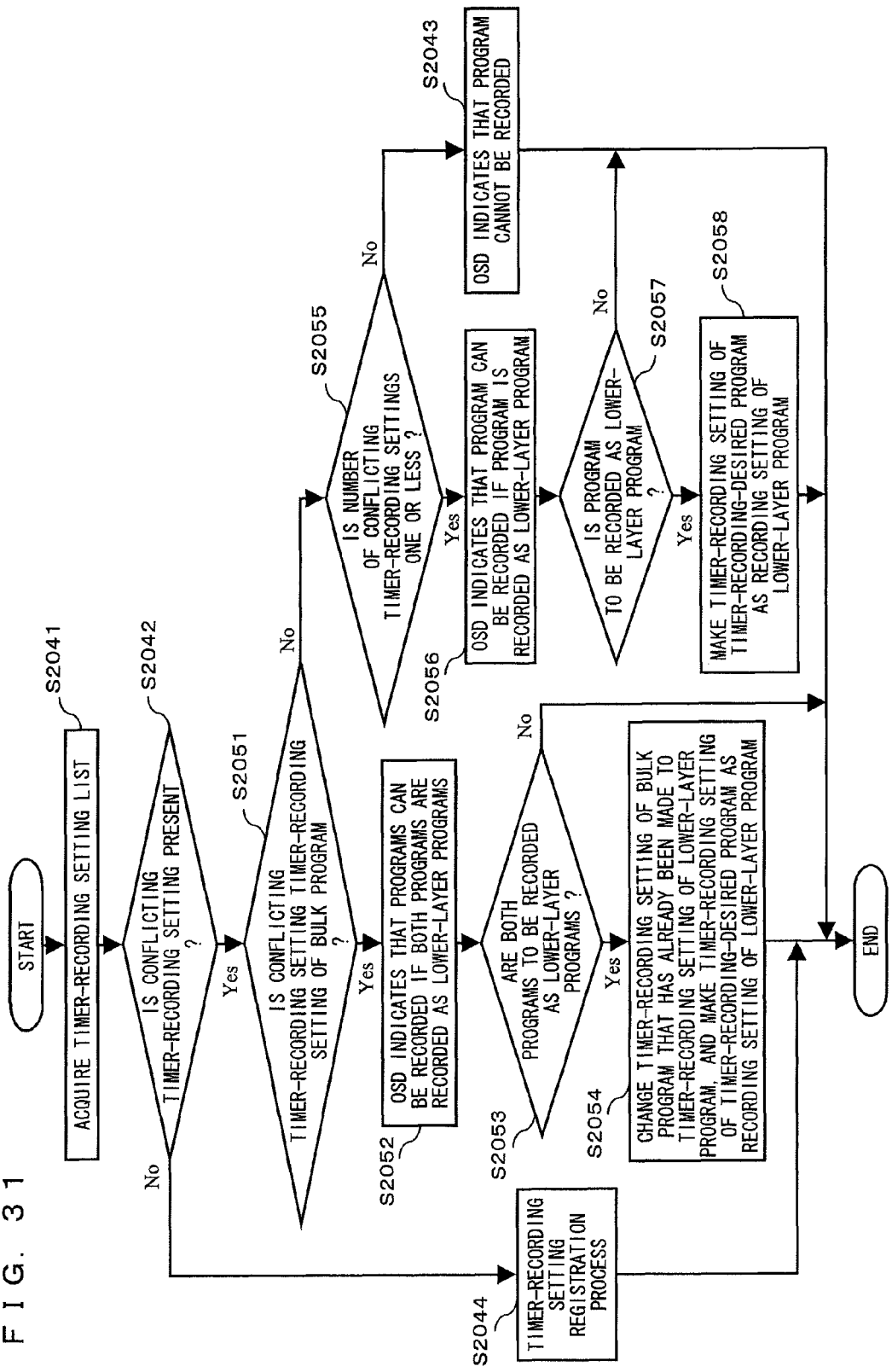
FIG. 31 is a flow chart showing details of a timer-recording process according to a sixth embodiment.

A description is given of details of a timer-recording process according to the sixth embodiment. FIG. 31 is a flow chart showing the details of the timer-recording process. The process of the flow chart is performed when the user performs an operation of registering the timer-recording setting of a non-bulk program. Note that the process of step S2041 through to step S2044 in FIG. 31 is the same as that of step S2041 through to step S2044 described above with reference to FIG. 30 in the fifth embodiment, and therefore will not be described in detail.

Referring to FIG. 31, when it is determined, as described above, that a timer-recording setting that conflicts with the broadcast period of a timer-recording-desired program is not present ("No" in step S2042), in step S2044 a process is performed of registering the timer-recording setting of the timer-recording-desired program.

On the other hand, when a conflicting timer-recording setting is present ("Yes" in step S2042), in step S2051 it is determined whether or not the conflicting program to be timer-recorded is a bulk program. When it is determined that the conflicting program to be timer-recorded is a bulk program ("Yes" in step S2051), in step S2052 a process is performed of displaying an OSD to indicate the following. That is, the OSD is displayed to indicate that the timer-recording-desired program can be recorded if the timer-recording setting of the bulk program that has already been made is changed to the timer-recording setting of the lower-layer program and also the timer-recording-desired program, which is a bulk program, is to be recorded as the lower-layer program. In addition, a process is performed of displaying an OSD to inquire as to whether or not the recording settings of both bulk programs are to be changed to the recording settings of the respective lower-layer programs. Then a response operation from the user is received.

In step S2053 it is determined whether or not the user's response to the inquiry indicates an instruction to change the recording settings of both bulk programs to the recording settings of the respective lower-layer programs. When it is determined that an instruction to change the recording settings of both bulk programs to the recording settings of the respective lower-layer programs is not indicated ("No" in step S2053), the timer-recording process immediately ends.

On the other hand, when it is determined that an instruction to change the recording settings of both bulk programs to the recording settings of the respective lower-layer programs is indicated ("Yes" in step S2053), in step S2054 the conflicting timer-recording setting of the bulk program is canceled. Then the timer-recording setting of the lower-layer program subjected to the hierarchical transmission with the bulk program is registered in the flash memory 2050. The timer-recording setting of the lower-layer program subjected to the hierarchical transmission with the timer-recording-desired program is registered in the flash memory 2050. As a result, the timer-recording settings of the two bulk programs are both registered as those of the respective lower-layer programs.

On the other hand, when it is determined that the conflicting program to be timer-recorded is not a bulk program, i.e., the program is a non-bulk program ("No" in step S2051), in step S2055 it is determined whether or not the number of the conflicting timer-recording settings is one or less. When it is determined that the number is one or less ("Yes" in step S2055), only one of the tuners is to be used for recording in this period. Accordingly, in step S2056 a process is performed of displaying an OSD to indicate that the timer-recording-desired program can be recorded if the recording setting of the timer-recording-desired program is changed to the recording setting of the lower-layer program. In addition, a process is performed of displaying an OSD to inquire as to whether or not the timer-recording setting of the timer-recording-desired program is to be made as that of the lower-layer program. Then a response operation from the user is received.

In step S2057 it is determined whether or not the user's response to the inquiry indicates an instruction to make the timer-recording setting of the timer-recording-desired program as that of the lower-layer program. When it is determined that an instruction to make the timer-recording setting of the timer-recording-desired program as that of the lower-layer program is not indicated ("No" in step S2057), the timer-recording process immediately ends.

On the other hand, when it is determined that an instruction to make the timer-recording setting of the timer-recording-desired program as that of the lower-layer program is indicated ("Yes" in step S2057), in step S2058 the timer-recording setting of the timer-recording-desired program as the lower-layer program is registered in the flash memory 2050.

On the other hand, when it is determined that the number of the conflicting timer-recording settings is not one or less ("No" in step S2055), it is considered that no tuner is available since the timer-recording settings of two non-bulk programs have already been registered. Accordingly, in this case, in step S2043 a process is performed of displaying an OSD to indicate that the timer-recording setting of the timer-recording-desired program cannot be made. Thus the timer-recording process according to the sixth embodiment ends.

As described above, in the sixth embodiment, if the timer-recording setting of a bulk program conflicts with the timer-recording setting of another bulk program, the timer-recording settings of both bulk programs are made as those of the respective lower-layer programs so that programs having the same materials as those of both bulk programs can be timer-recorded. This makes it possible to prevent the case where no program can be recorded at all, and therefore possible to improve the convenience for the user.

Note that in the digital broadcasting system described above, a lower-layer program is subjected to hierarchical transmission on only one of the two physical channels used for bulk transmission. As well as this, lower-layer programs may be subjected to hierarchical transmission on both channels (i.e., a doubling of a lower-layer program). In this case, it is possible to omit a process of detecting the physical channel used for the hierarchical transmission.

Seventh Embodiment

Figure 32:
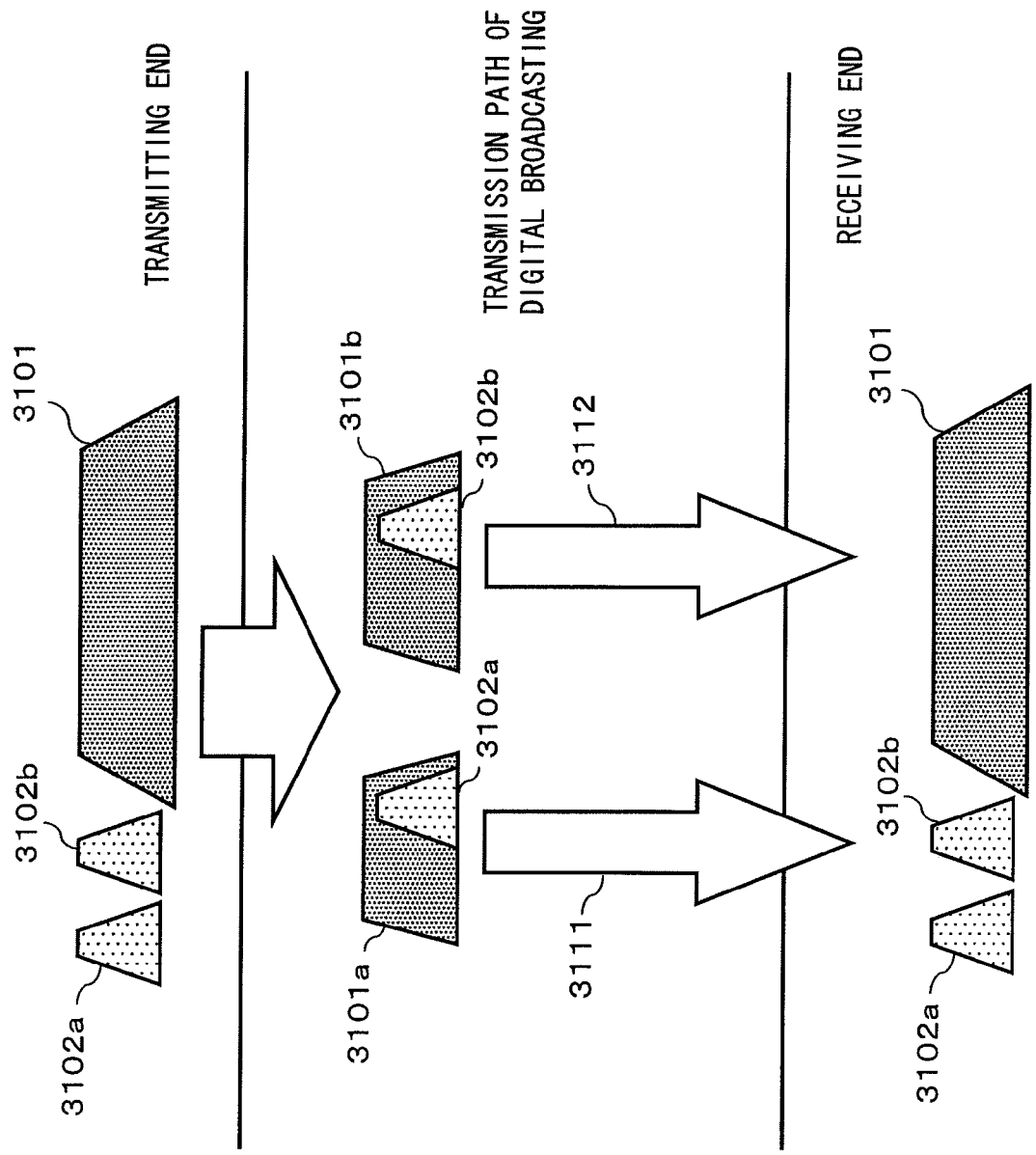
FIG. 32 is a schematic diagram illustrating the concept of the transmission of a program formed under a Super Hi-Vision standard in a seventh embodiment.

Next, a seventh embodiment of the present invention is described. Prior to describing details of the seventh embodiment, a description is given of an overview of transmission in a digital broadcasting system that is commonly assumed in the seventh embodiment and in eighth through ninth embodiments described thereafter. In the present embodiment a digital broadcasting system is assumed in which a moving image content of a so-called Hi-Vision standard and a moving image content of a so-called Super Hi-Vision standard are broadcast in a mixed manner. For example, a case is assumed where on specific channels, a moving image content of the Hi-Vision standard is broadcast from 8:00 p.m. to 9:00 p.m. and a moving image content of the Super Hi-Vision standard is broadcast from 9:00 p.m. to 11:00 p.m. Here, it is assumed that a program formed under the Hi-Vision standard has such an amount of information that can be completely transmitted on one physical channel. On the other hand, a program formed under the Super Hi-Vision standard has such an amount of information that cannot be completely transmitted on only one physical channel. Accordingly, when the program formed under the Hi-Vision standard is broadcast, one program is transmitted on one physical channel; whereas, when the program formed under the Super Hi-Vision standard is broadcast, broadcast data (a transport stream) of the program is divided into two and transmitted using two physical channels. FIG. 32 is a schematic diagram showing the concept of the transmission of the program formed under the Super Hi-Vision standard in the present embodiment. As shown in FIG. 32, in the present embodiment, broadcast data (a transport stream) 3101 of a program of the Super Hi-Vision standard is divided into two and transmitted using two physical channels 3111 and 3112. That is, a program of the Super Hi-Vision standard is transmitted using two physical channels bundled together. Hereinafter, such transmission of one program using two physical channels will be referred to as "bulk transmission". In addition, a program formed under the Super Hi-Vision standard that is subjected to bulk transmission will be referred to as a "bulk program", and a program formed under the Hi-Vision standard that can be completely transmitted on one physical channel will be referred to as a "non-bulk program". Accordingly, to take the above periods as an example, from 8:00 p.m. to 9:00 p.m., non-bulk programs having different materials are displayed on channel 1 and channel 2, and from 9:00 p.m. to 11:00 p.m., a bulk program having the same material is displayed on both channels, for example. That is, the same program is displayed on the screen even if either channel is selected.

Here, in the present embodiment, when a bulk program is subjected to bulk transmission, hierarchical transmission is performed using each of the two physical channels used for the bulk transmission. Specifically, at the transmitting end a content having the same material as that of the bulk program is created under the Hi-Vision standard (such a content of the Hi-Vision standard will be hereinafter referred to as a "lower-layer program"). That is, the bulk program and the lower-layer program are different only in that the bulk program is created under the Super Hi-Vision standard and the lower-layer program is created under the Hi-Vision standard, and are the same in program material (the material that is broadcast). In the present embodiment, as modulation schemes, the bulk program is modulated using 32-APSK (Amplitude Phase Shift Keying), and the lower-layer program is modulated using QPSK (Quadrature Phase Shift Keying). Since the lower-layer program (of the Hi-Vision standard) has a smaller amount of information than that of the bulk program, the lower-layer program can be transmitted using a narrower network bandwidth. In the present embodiment, as shown in FIG. 32, on the channels used for bulk transmission, a bulk program 3101a and a lower-layer program 3102a are subjected to hierarchical transmission, and a bulk program 3101b and a lower-layer program 3102b are also subjected to hierarchical transmission (two lower-layer programs having the same material are created and included in the respective channels, in FIG. 32).

Bulk transmission requires, at the reception device end (presuming that it is provided with at least two tuners so as to simultaneously receive two physical channels), information (hereinafter referred to as "bulk-related information") for reproducing the bulk program, such as information as to which physical channels are combined to form the bulk program. In the present embodiment the bulk-related information is attached to a so-called TMCC signal (a signal including transmission parameters and the like) and is transmitted. At the reception device end the bulk-related information is acquired by separating the TMCC signal from a broadcast signal that is selected and received by either one of the tuners. Then, based on the bulk-related information, it is determined, for example, whether or not the program to be transmitted is a bulk program, and if the program is a bulk program, it is determined which channels are combined to form the bulk program. Then a process of performing channel selection, combination, and the like is to be performed (described in detail below).

FIG. 33 is a diagram showing an example of the bulk-related information used in the present embodiment. The bulk-related information includes sets of a physical ch. number 3131, a connection flag 3132, and a connection target ch. 3133. The bulk-related information includes information about all the physical channels, and the physical ch. number 3131 represents the number of each physical channel. The connection flag 3132 is a flag for identifying whether the program that is broadcast is a bulk program or a non-bulk program. When set to "On", the connection flag 3132 indicates that the program that is transmitted on the physical channel is a bulk program. On the other hand, when set to "Off", the connection flag 3132 indicates that a non-bulk program is broadcast using only the physical channel.

The connection target ch. 3133 is data for, when the program that is broadcast on the physical channel is a bulk program, indicating the physical channel number of the other physical channel that forms the bulk program with the physical channel. In a double-tuner reception device, for example, when one of the tuners selects physical channel 1 (hereinafter referred to simply as "ch. 1", and other physical channels will be referred to likewise) and thereby the bulk-related information shown in FIG. 33 is acquired, it is understood that the program that is broadcast on ch. 1 is a bulk program, and the bulk program is formed of ch. 1 and ch. 2. Accordingly, it is understood that in order to reproduce the bulk program, the other tuner needs to select ch. 2.

Thus, in the digital broadcasting system assumed in the present embodiment, a bulk program and a non-bulk program are broadcast in a mixed manner, and the bulk program is subjected to bulk transmission, using two physical channels. In addition, a reception device, provided with a double tuner, distinguishes between a bulk program and a non-bulk program and performs the reproduction process of these programs based on the bulk-related information included in a TMCC signal.

Next, a description is given of the structure of a reception device according to the seventh embodiment, used in the digital broadcasting system as described above. FIG. 34 is a functional block diagram showing the structure of a reception device 3030 according to the seventh embodiment of the present invention. Referring to FIG. 34, the reception device 3030 includes an antenna 3031, a first tuner 3032, a second tuner 3033, a first demodulation section 3034, a second demodulation section 3035, a first main signal error-correction decoding section 3036, a second main signal error-correction decoding section 3037, a first TMCC decoding section 3038, a second TMCC decoding section 3039, a TMCC control section 3040, a TS combination/separation section 3041, a first AV decoder 3042, a second AV decoder 3043, a first display section 3044, a second display section 3045, a CPU 3046, a remote-control process section 3047, a flash memory 3048, and a remote control 3049.

The first tuner 3032 and the second tuner 3033 select predetermined physical channels based on control signals from the CPU 3046, and receive transmitted signals from a transmission device, not shown in the figures, through the antenna 3031, respectively.

The first demodulation section 3034 demodulates the transmitted signal output from the first tuner 3032 into digital signals, and outputs the digital signals to the first main signal error-correction decoding section 3036 and the first TMCC decoding section 3038.

Figure 35:
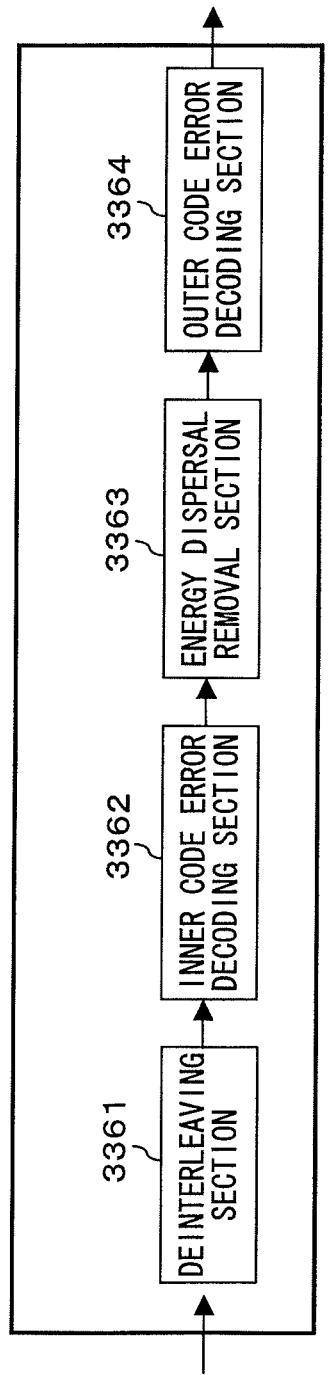
FIG. 35 is a block diagram showing details of a first main signal error-correction decoding section 3036.

The first main signal error-correction decoding section 3036 performs an error-correction decoding process on the digital signal output from the first demodulation section 3034, and thereby obtains a transport stream. Then the first main signal error-correction decoding section 3036 outputs the transport stream to the TS combination/separation section 3041. FIG. 35 is a block diagram showing details of the first main signal error-correction decoding section 3036. Referring to FIG. 35, in the first main signal error-correction decoding section 3036: a deinterleaving section 3361 deinterleaves the digital signal output from the first demodulation section 3034; an inner code error decoding section 3362 decodes an inner code of the digital signal; an energy dispersal removal section 3363 performs energy dispersal removal of the digital signal; and an outer code error decoding section 3364 decodes an outer code of the digital signal. Then the resulting digital signal is output as a transport stream.

The first TMCC decoding section 3038 decodes the digital signal (TMCC signal) output from the first demodulation section 3034, and thereby acquires TMCC information from the decoded digital signal. Then the first TMCC decoding section 3038 outputs the TMCC information to the TMCC control section 3040.

The second demodulation section 3035, the second main signal error-correction decoding section 3037, and the second TMCC decoding section 3039 perform, on the transmitted signal output from the second tuner 3033, similar processes to those performed by the first demodulation section 3034, the first main signal error-correction decoding section 3036, and the first TMCC decoding section 3038, respectively.

The TMCC control section 3040 controls the first demodulation section 3034 and the first main signal error-correction decoding section 3036 based on the TMCC information (more precisely, information about various transmission parameters acquired from the TMCC information, and the like) output from the first TMCC decoding section 3038. The TMCC control section 3040 also controls the second demodulation section 3035 and the second main signal error-correction decoding section 3037 based on the TMCC information output from the second TMCC decoding section 3039. The TMCC control section 3040 also outputs the acquired TMCC information to the CPU 3046.

The TS combination/separation section 3041 performs the following processes based on a control signal from the CPU 3046. First, when reproducing a bulk program, the TS combination/separation section 3041 combines both transport streams output from the first main signal error-correction decoding section 3036 and the second main signal error-correction decoding section 3037, and thereby reconstructs the transport stream that has yet to be divided into two at the transmitting end. The TS combination/separation section 3041 also separates and obtains an AV stream of a bulk program from the combined transport stream. Then the TS combination/separation section 3041 outputs the AV stream of the bulk program to at least one of the first AV decoder 3042 and the second AV decoder 3043, based on a control signal from the CPU 3046. Alternatively, when reproducing a lower-layer program, the TS combination/separation section 3041 separates an AV stream of a lower-layer program from the transport stream output from either one of the first main signal error-correction decoding section 3036 and the second main signal error-correction decoding section 3037, without combining the TSs as described above. Then the TS combination/separation section 3041 outputs the AV stream of the lower-layer program to at least one of the first AV decoder 3042 and the second AV decoder 3043, based on a control signal from the CPU 3046.

Based on a control signal from the CPU 3046, the first AV decoder 3042 and the second AV decoder 3043 each decode the corresponding AV stream output from the TS combination/separation section 3041, and thereby obtain video and audio signals. The first AV decoder 3042 outputs to the first display section 3044 the resulting video and audio signals (typically, a bulk program, or a non-bulk program that is obtained through the first tuner 3032) obtained from the decoding. Further, the second AV decoder 3043 outputs to the second display section 3044 the resulting video and audio signals (typically, a non-bulk program that is obtained through the second tuner 3033) obtained from the decoding. Here, the first AV decoder 3042 and the second AV decoder 3043 are each capable of performing a decoding process at least in decoded forms corresponding to the encoded forms of a higher-layer AV stream of a bulk program and a lower-layer AV stream of a lower-layer program. For example, a higher-layer AV stream can be decoded in H.264 and a lower-layer AV stream can be decoded in MPEG-2. Based on a control signal from the CPU 3046, the first AV decoder 3042 and the second AV decoder 3043 each perform the decoding process by appropriately switching between these decoded forms.

The first display section 3044 and the second display section 3045 correspond to the two screen images of so-called picture-in-picture display, respectively. The first display section 3044 presents video and audio to the user based on the video and audio signals output from the first AV decoder 3042. The second display section 3045 presents video and audio to the user based on the video and audio signals output from the second AV decoder 3043.

The CPU 3046 performs a process of allowing the user to view a moving image content by controlling the first tuner 3032, the second tuner 3033, the TS combination/separation section 3041, the first AV decoder 3042, the second AV decoder 3043, and the like while performing the process of the flow chart described below with reference to FIG. 36.

The remote-control process section 3047 receives an operation signal from the remote control 3049, and outputs a signal representing the operating instruction to the CPU 3046.

The flash memory 3048 stores data used for various controls performed by the CPU 3046.

Next, a description is given of an overview of a channel-selection/reproduction process performed by the reception device 3030. The reception device according to the present embodiment performs the following process when a channel selection operation is performed, such as when the user presses channel up/down buttons of the remote control 3049. First, the first tuner 3032 selects the physical channel specified by the user. Next, the bulk-related information described above is acquired by separating a TMCC signal from a received broadcast signal. Then, with reference to the bulk-related information (see FIG. 33), it is determined whether the program that is being broadcast on the channel selected by the first tuner is a bulk program or a non-bulk program. When the program is a non-bulk program, it is examined, with reference to the bulk-related information, whether or not a bulk program is being broadcast on another channel. As a result, when a bulk program is being broadcast on another channel, a process is performed of causing the second tuner to select one of the physical channels of the bulk program in advance. That is, since only one of the tuners is used to view the non-bulk program, a process is performed of causing the unused tuner to select one of the channels of the bulk program in advance. With this process performed in advance, for example, when the first tuner 3032 selects the other channel of the bulk program later, the second tuner 3033 will have already selected the one channel, and therefore the reproduction process (a combination of transport streams, a decoding process, etc.) of the bulk program can be quickly performed. As a result, it is possible to reduce the time from when the user performs a channel selection operation to when the video of the program is actually displayed on the screen.

Details of the channel-selection/reproduction process performed by the reception device 3030 is described below with reference to FIG. 36. FIG. 36 is a flow chart showing the channel-selection/reproduction process performed by the reception device 3030 when the user performs a channel selection operation with the remote control 3049 or the like.

Figure 36:
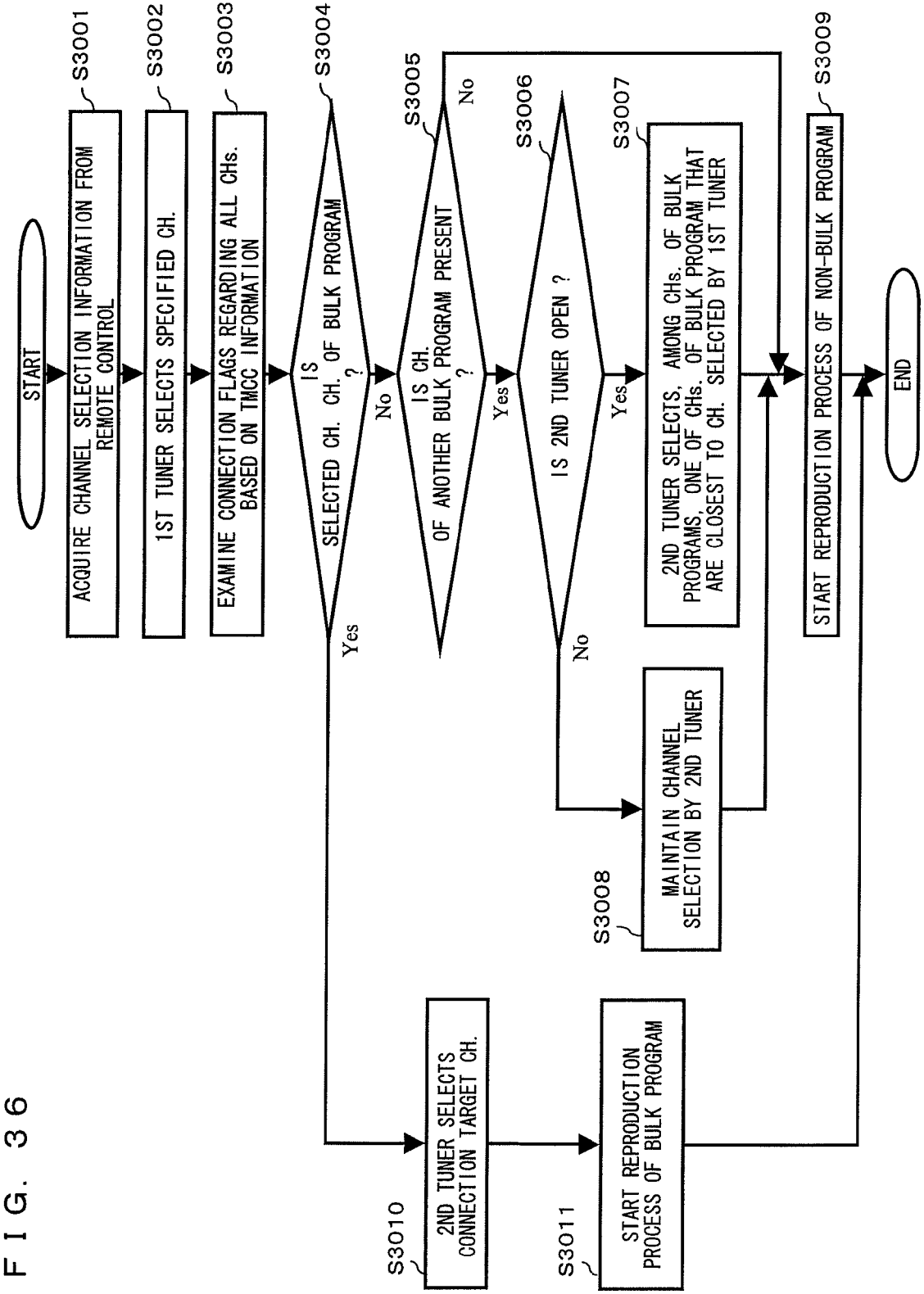
FIG. 36 is a flow chart showing a channel-selection/reproduction process performed by the reception device 3030.

Referring to FIG. 36, in step S3001, channel selection information from the remote control 3049 is acquired. That is, the CPU 3046 acquires, through the remote-control process section 3047, information representing the user's channel selection operation. In step S3002 the first tuner 3032 performs a channel selection process based on the channel selection information. More specifically, the CPU 3046 outputs to the first tuner 3032 a control signal for causing the first tuner 3032 to select the physical channel selected by the user. In response to this, the first tuner 3032 selects the physical channel specified by the user.

In step S3003 a process is performed of acquiring the TMCC information and examining the connection flags 3132 regarding all the physical channels. More specifically, a TMCC signal is separated from a signal received on the physical channel selected by the first tuner 3032, and is input to the first TMCC decoding section 3038. The first TMCC decoding section 3038 acquires the TMCC information from decoding and outputs the decoded TMCC information to the TMCC control section 3040. The TMCC control section 3040 extracts the bulk-related information (see FIG. 33) from the TMCC information and outputs the bulk-related information to the CPU 3046. With reference to the connection flags 3132 regarding all the physical channels that are included in the bulk-related information, the CPU 3046 acquires the physical ch. numbers 3131 that represent the physical channels, regarding which the connection flags are set to "On".

In step S3004 it is determined whether or not the physical channel selected in step S3002 is a channel on which a bulk program is being broadcast. That is, the CPU 3046 determines whether or not the physical channel number of the physical channel selected in step S3002 is included in the physical ch. numbers 3131 acquired in step S3003. When it is determined that a bulk program is not being broadcast on the physical channel selected in step S3002, i.e., that a non-bulk program is being broadcast ("No" in step S3004), in step S3005 it is determined, with reference to the physical ch. numbers 3131 acquired in step S3003, whether or not a bulk program is being broadcast on another physical channel. When it is determined that a bulk program is not being broadcast on another physical channel either, i.e., that no bulk program is being broadcast in the period in which the channel selection operation is performed ("No" in step S3005), the process proceeds to step S3007 described below.

On the other hand, when a bulk program is being broadcast on another physical channel ("Yes" in step S3005), in step S3006 it is determined whether or not the second tuner 3033 is open. Here, "not being open" refers to a state where the second tuner is currently being used, e.g., picture-in-picture display is being performed or another program on another channel is being recorded. "Being open" refers to a state where the second tuner 3033 is not currently being used. When the second tuner 3033 is not open ("No" in step S3006), in step S3008 the current channel selection by the second tuner 3033 is maintained. Then the process proceeds to step S3009 described below.

On the other hand, when the second tuner 3033 is open ("Yes" in step S3006), in step S3007 the second tuner 3033 selects said another physical channel on which the bulk program is being broadcast. If a plurality of bulk programs are being broadcast at this time, the second tuner 3033 selects the physical channels of a bulk program that are closest to the physical channel selected by the first tuner 3032 (if it is impossible to differentiate the physical channels, the second tuner 3033 randomly selects one of them). Here, in the present embodiment, between the two physical channels used for the transmission of the selected bulk program, the channel having the frequency further from that of the physical channel selected by the first tuner 3032 is selected (here, the frequencies have the relationships of 1 ch.<2 ch. . . . <4 ch. . . . <9 ch. . . . ). For example, it is assumed that the first tuner 3032 selects 4 ch. and the bulk program is being broadcast using 1 ch. and 2 ch. in the same period. In this case, the second tuner 3033 selects 1 ch. Similarly, when the first tuner 3032 selects 4 ch. and the bulk program is being broadcast using 8 ch. and 9 ch. in the same period, the second tuner 3033 selects 9 ch. This is designed on the assumption of an operation with the channel up/down buttons of the remote control (i.e., an operation of specifying channel numbers in ascending/descending order). That is, when a channel-up operation is performed from 4 ch., the channel switches from 4 ch. to 5 ch. to 6 ch., and then, 8 ch. is selected ahead of 9 ch. In order to have 9 ch. already selected when 8 ch. is selected in this case, the physical channel, between the two physical channels, that is further from the physical channel selected by the first tuner 3032 is selected as described above.

Note that when the determination of step S3006 is made after the second tuner 3033 selects the channel in step S3007, it is determined that the second tuner 3033 is "not open". As a result, the second tuner 3033 keeps 9 ch. selected in each operation until 4 ch. to 5 ch. through to 8 ch. are selected.

Following the process of step S3007, in step S3009 a process is started of reproducing the non-bulk program that is being broadcast on the physical channel selected by the first tuner 3032. More specifically, the TMCC control section 3040 acquires transmission parameters and the like from the TMCC information. Then the TMCC control section 3040 outputs to the first demodulation section 3034 a control signal for causing the first demodulation section 3034 to perform a demodulation process based on the transmission parameters. In response to this, the first demodulation section 3034 starts demodulation to obtain a main signal (a signal including data of the program). The demodulated main signal is output to the first main signal error-correction decoding section 3036. Then a transport stream obtained from an error correction process performed by the first main signal error-correction decoding section 3036 is output to the TS combination/separation section 3041. The TS combination/separation section 3041 starts, based on a control signal from the CPU 3046, a process of separating an AV stream from the transport stream and outputting the AV stream to the first AV decoder 3042. The first AV decoder 3042 starts a process of decoding the AV stream based on a control signal from the CPU 3046, and starts a process of outputting to the first display section 3044 the resulting video and audio signals obtained from the decoding. As a result of the process described above, the non-bulk program is displayed on the screen.

On the other hand, when it is determined that a physical channel on which a bulk program is being broadcast is selected ("Yes" in step S3004), in step S3010 the second tuner 3033 selects, with reference to the bulk-related information, the physical channel indicated by the connection target ch. 3133. Note, however, that the process of step S3010 is skipped when, as described above, the connection target ch. has been selected ahead as a result of selecting the physical channel of a non-bulk program in advance. This makes it possible to omit a channel selection process performed by the second tuner 3033. In other words, this step is performed when a physical channel of a bulk program has been selected in the first channel selection operation.

In step S3011 a process of reproducing the bulk program is performed. Specifically, the transport stream obtained through the first tuner 3032 and the transport stream obtained through the second tuner 3033 are output to the TS combination/separation section 3041, and a process of combining both transport streams is started. Then an AV stream of the bulk program and an AV stream of the lower-layer program are separated from the combined transport stream, and the AV stream of the bulk program is output to the first AV decoder 3042. The first AV decoder 3042 starts a process of decoding the AV stream of the bulk program and outputting the resulting video and audio signals to the first display section 3044. As a result, the bulk program is displayed on the screen.

As described above, in the present embodiment, when the first tuner 3032 selects a non-bulk program, a physical channel of a bulk program that is being broadcast on another physical channel is selected in advance using the second tuner 3033. As a result of thus selecting a physical channel of a bulk program in advance, when the first tuner 3032 selects another physical channel of the bulk program, it is possible to omit a channel selection process performed by the second tuner 3033. Consequently, it is possible to reduce the time from when the viewer selects a physical channel of the bulk program to when the bulk program is actually displayed on the screen, and thus it is possible to provide a digital broadcast reception device that is convenient for the viewer.

Note that in the present embodiment a moving image content of the Hi-Vision standard is taken as an example of a non-bulk program, but a non-bulk program may be a moving image content of an SD (Standard Definition) standard. Similarly, a lower-layer program may also be a moving image content of the SD standard.

Note that in the present embodiment, in the process of step S3007 the second tuner 3033 selects the channels of a bulk program that are closest to the physical channel selected by the first tuner 3032, on the assumption of an operation with the channel up/down buttons of the remote control 3049. As well as this, the physical channel to be selected by the second tuner 3033 may be determined as follows. First, the reception device 3030 stores the viewing history of each channel in the flash memory 3048. Then the reception device 3030 also stores the operation history of the user's channel selection operation in the flash memory 3048. Specifically, the reception device 3030 stores, in the flash memory, information representing the number of channel selection operations by channel up/down and the number of channel selection operations by the pressing of the numeric buttons, both performed on the remote control 3049.

In the process of step S3007, with reference to the operation history stored in the flash memory 3048, it is determined which is greater: the number of channel selection operations with the channel up/down buttons or the number of channel selection operations by the pressing of the numeric buttons, i.e., operations by direct channel selection. When it is determined that the number of channel selection operations by channel up/down is greater, the process described above is performed. On the other hand, when it is determined that the number of channel selection operations by direct channel selection is greater, the viewing history stored in the flash memory 3048 is subsequently referred to. Then, among the physical channels detected in the process of step S3003 on which bulk programs are being broadcast, the physical channels that have been most frequently viewed by the user may be searched for and selected.

Eighth Embodiment

Next, an eighth embodiment of the present invention is described with reference to FIGS. 37 and 38. In the seventh embodiment the second tuner 3033 selects a channel ahead when a non-bulk program is selected, so that the time from when a channel of a bulk program is selected to when the bulk program is displayed on the screen is reduced. In contrast, in the eighth embodiment, when a channel selection operation for a bulk program is performed, a process is performed of outputting ahead to the screen the lower-layer program subjected to the hierarchical transmission with the bulk program. The reason is that: the lower-layer program can be reproduced so long as one of the channels can be received; the processing speed of the lower-layer program is faster due to the small amount of information; and as described above, the program material is the same. Therefore the lower-layer program is output ahead to the screen so as to reduce the time from the channel selection operation to the screen output.

Figure 37:
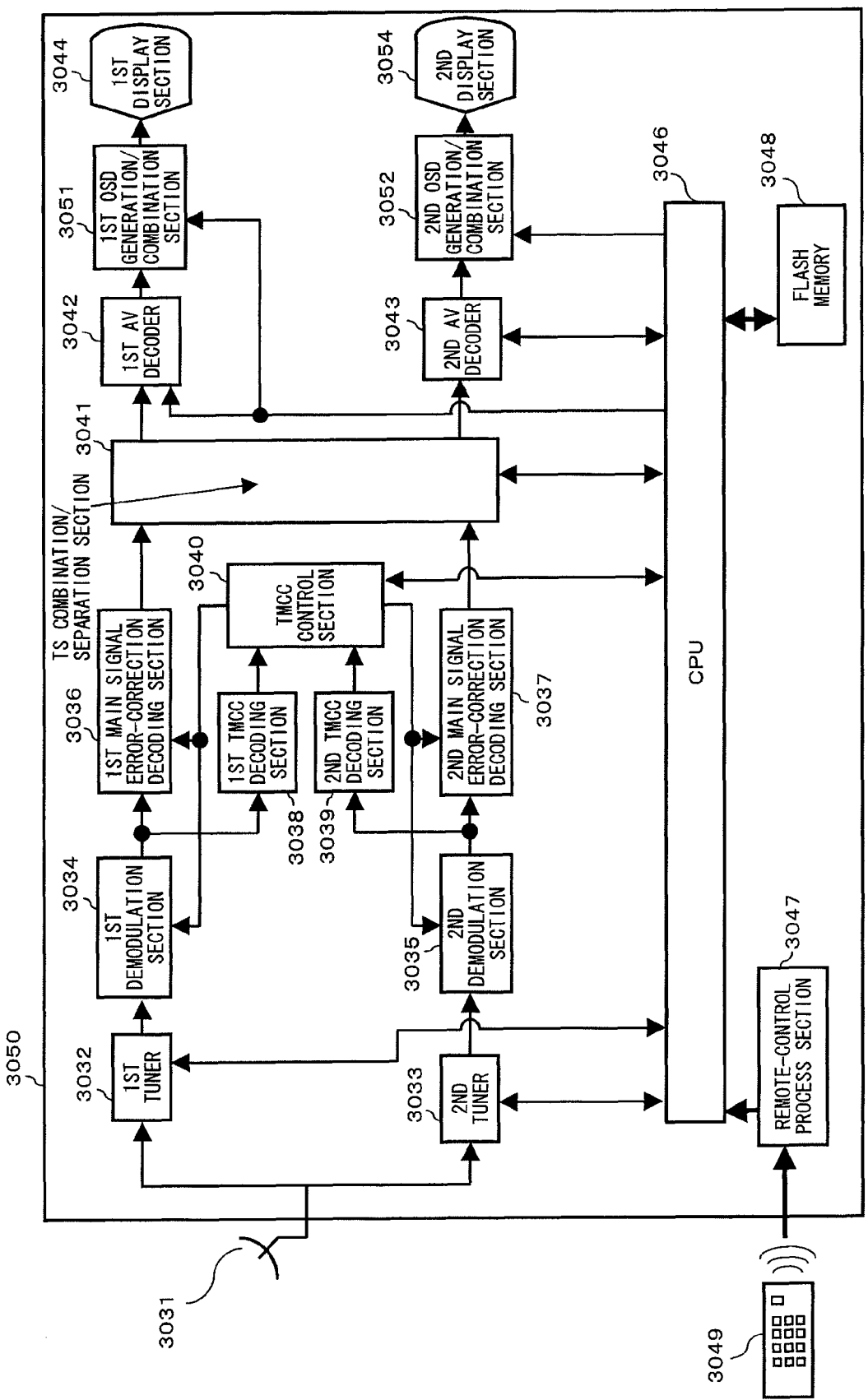
FIG. 37 is a block diagram showing the structure of a reception device 3050 according to an eighth embodiment of the present invention.

FIG. 37 is a block diagram showing the structure of a reception device 3050 according to the eighth embodiment of the present invention. The reception device 3050 according to the present embodiment corresponds to the functional structure of the reception device 3030, described above with reference to FIG. 34 in the seventh embodiment, having added thereto a first OSD generation/combination section 3051 and a second OSD generation/combination section 3052, and the other elements are the same as those of the seventh embodiment. Therefore the elements other than the first OSD generation/combination section 3051 and the second OSD generation/combination section 3052 will be denoted by the same numerals and will not be described in detail.

Referring to FIG. 37, the first OSD generation/combination section 3051 generates a screen image (hereinafter referred to as an "OSD") to be displayed superimposed on a screen image that is output from the first AV decoder 3042 to the first display section 3044. Then the first OSD generation/combination section 3051 combines the output from the first AV decoder 3042 and the generated OSD, and outputs the combined result to the first display section 3044. The second OSD generation/combination section 3052 generates an OSD to be displayed superimposed on a screen image that is output from the second AV decoder 3043 to the second display section 3045, combines the output from the second AV decoder 3043 and the generated OSD, and outputs the combined result to the second display section 3045.

Next, a description is given of the process performed by the reception device 3050 according to the eighth embodiment. FIG. 38 is a flow chart showing details of a channel-selection/reproduction process performed by the reception device 3050 according to the eighth embodiment. Referring to FIG. 38, in step S3021, channel selection information from the remote control 3049 is acquired. That is, the CPU 3046 acquires, through the remote-control process section 3047, information representing the user's channel selection operation.

In step S3022 the first tuner 3032 performs a channel selection process based on the channel selection information. More specifically, the CPU 3046 outputs to the first tuner 3032 a control signal for causing the first tuner 3032 to select the channel selected by the user. In response to this, the first tuner 3032 selects the channel specified by the user.

In step S3023 the bulk-related information is acquired from a TMCC signal. With reference to the connection flags 3132 regarding all the physical channels that are included in the bulk-related information, the physical ch. numbers 3131 are acquired that represent the physical channels, regarding which the connection flags are set to "On".

In step S3024 it is determined whether or not the physical channel selected in step S3022 is a physical channel on which a bulk program is being broadcast. When it is determined that the selected physical channel is a physical channel on which a non-bulk program is being broadcast ("No" in step S3024), the process similar to that of step S3009 described in the seventh embodiment is performed, so that a process of reproducing the non-bulk program is started.

On the other hand, when the selected physical channel is a physical channel on which a bulk program is being broadcast ("Yes" in step S3024), in step S3025 a process of reproducing the lower-layer program is started. That is, the transport stream obtained through the first tuner 3032 is output to the TS combination/separation section 3041, and an AV stream of the lower-layer program is separated from the transport stream and output to the first AV decoder 3042. The first AV decoder 3042 starts a process of decoding the AV stream of the lower-layer program and outputting the video and audio signals of the lower-layer program to the first display section 3044. As a result, the lower-layer program is displayed on the screen.

In step S3026 a process is performed of generating an OSD and outputting the OSD to the first display section 3044. Here, the OSD is a display for inquiring of the user as to whether or not to switch the screen display to that with Super Hi-Vision video (SHV). For example, the OSD is a message such as "Do you wish to switch to Super Hi-Vision video?". The CPU 3046 outputs to the first OSD generation/combination section 3051 a control signal for causing the first OSD generation/combination section 3051 to generate such an OSD and display the generated OSD on the screen image in the first display section 3044 in a combined manner. Then the CPU 3046 receives a response operation from the user.

In step S3027 a determination is made as to the user's response to the inquiry displayed in step S3026. When it is determined that the user's response indicates that the user does not wish to switch to Super Hi-Vision video ("No" in step S3027), the process immediately ends. As a result, the output of the lower-layer program to the first display section 3044 is continued.

On the other hand, when the user's response indicates that the user wishes to switch to Super Hi-Vision video ("Yes" in step S3027), in step S3028 the second tuner 3033 performs a process of selecting the connection target channel. In step S3029 a process similar to that of step S3011 described in the seventh embodiment is performed, and a process of reproducing the bulk program is started. As a result, the bulk program is displayed in the first display section 3044. Thus the channel-selection/reproduction process according to the eighth embodiment ends.

As described above, in the eighth embodiment, when a physical channel on which a bulk program is being broadcast is selected, the lower-layer program is displayed ahead before the bulk program is displayed. This makes it possible to reduce the time from when the user performs a channel selection operation to when the program is actually displayed on the screen.

Figure 38:
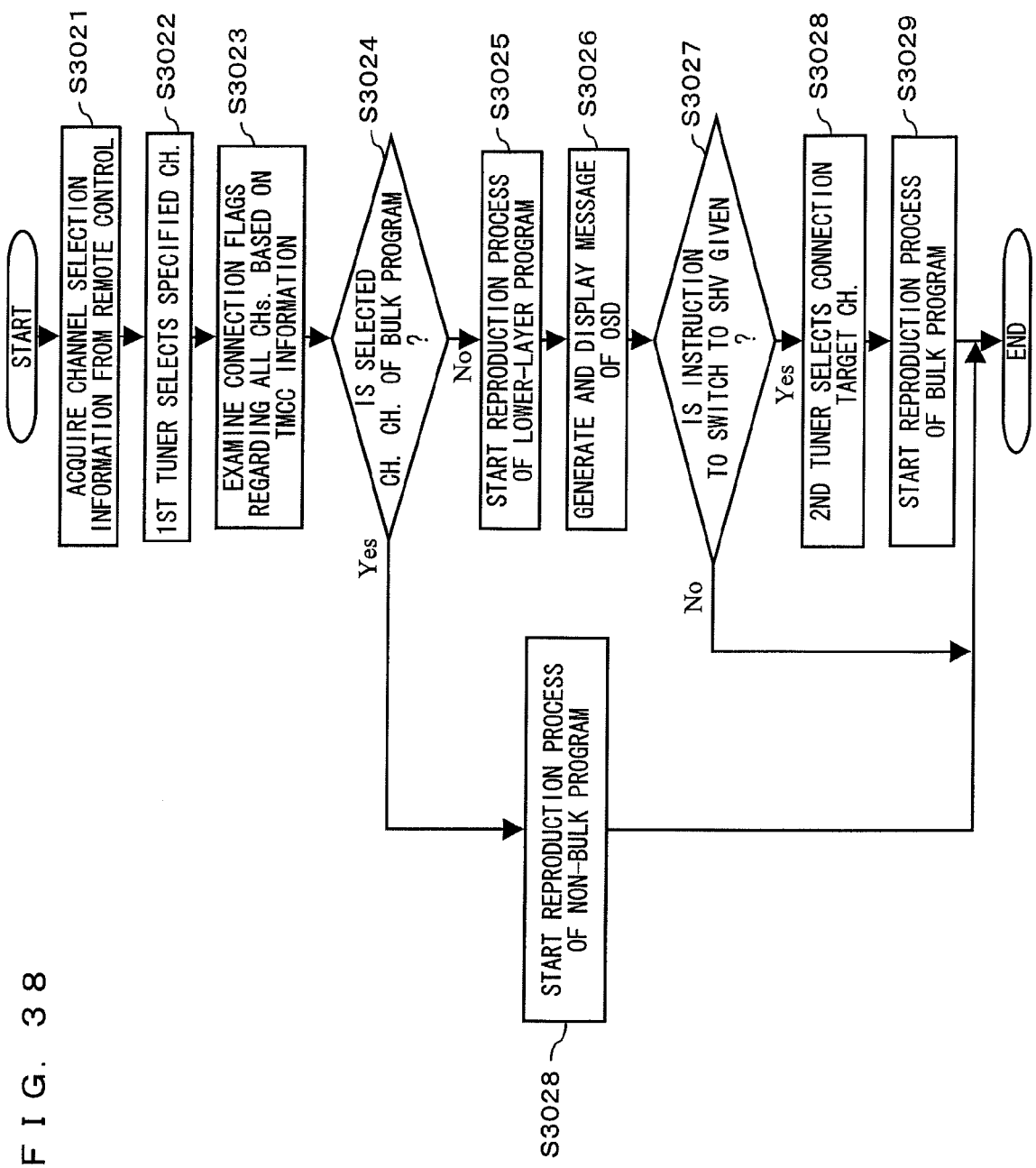
FIG. 38 is a flow chart showing details of a channel-selection/reproduction process performed by a reception device 3050 according to the eighth embodiment.

Note that in the eighth embodiment the second tuner 3033 performs the channel selection process in step S3028 of FIG. 38 after the response to the message indicated by the OSD is received; however, as well as this, the second tuner 3033 may perform the channel selection process in advance, before the OSD is displayed (at the time that follows step S3025 of FIG. 38) or before the response operation to the message indicated by the OSD is received (at the time that follows step S26 of FIG. 38). This makes it possible to reduce the time from when the user gives an instruction to switch to Super Hi-Vision video to when the bulk program is actually displayed.

Ninth Embodiment

Next, a ninth embodiment of the present invention is described with reference to FIGS. 39 and 40. In the seventh embodiment the second tuner 3033 selects a channel ahead when a non-bulk program is selected, so that the time from when a physical channel of a bulk program is selected to when the bulk program is displayed on the screen is reduced. In contrast, in the ninth embodiment, when a non-bulk program is selected, it is determined, with reference to an EPG whether or not the programs scheduled to be broadcast in the future include a bulk program. Then, when a bulk program is scheduled to be broadcast, a process is performed of selecting a physical channel of the bulk program in advance. Accordingly, the EPG needs to have been transmitted to the reception device in advance in some way, and in the present embodiment it is assumed that the EPG is included in a broadcast signal transmitted from the transmission device. This makes it possible, as in the seventh embodiment, to omit a channel selection operation performed by the second tuner 3033 when the bulk program is selected later, and therefore possible to further reduce the time from when the user gives an instruction to perform channel selection to when the video is actually displayed.

Figure 39:
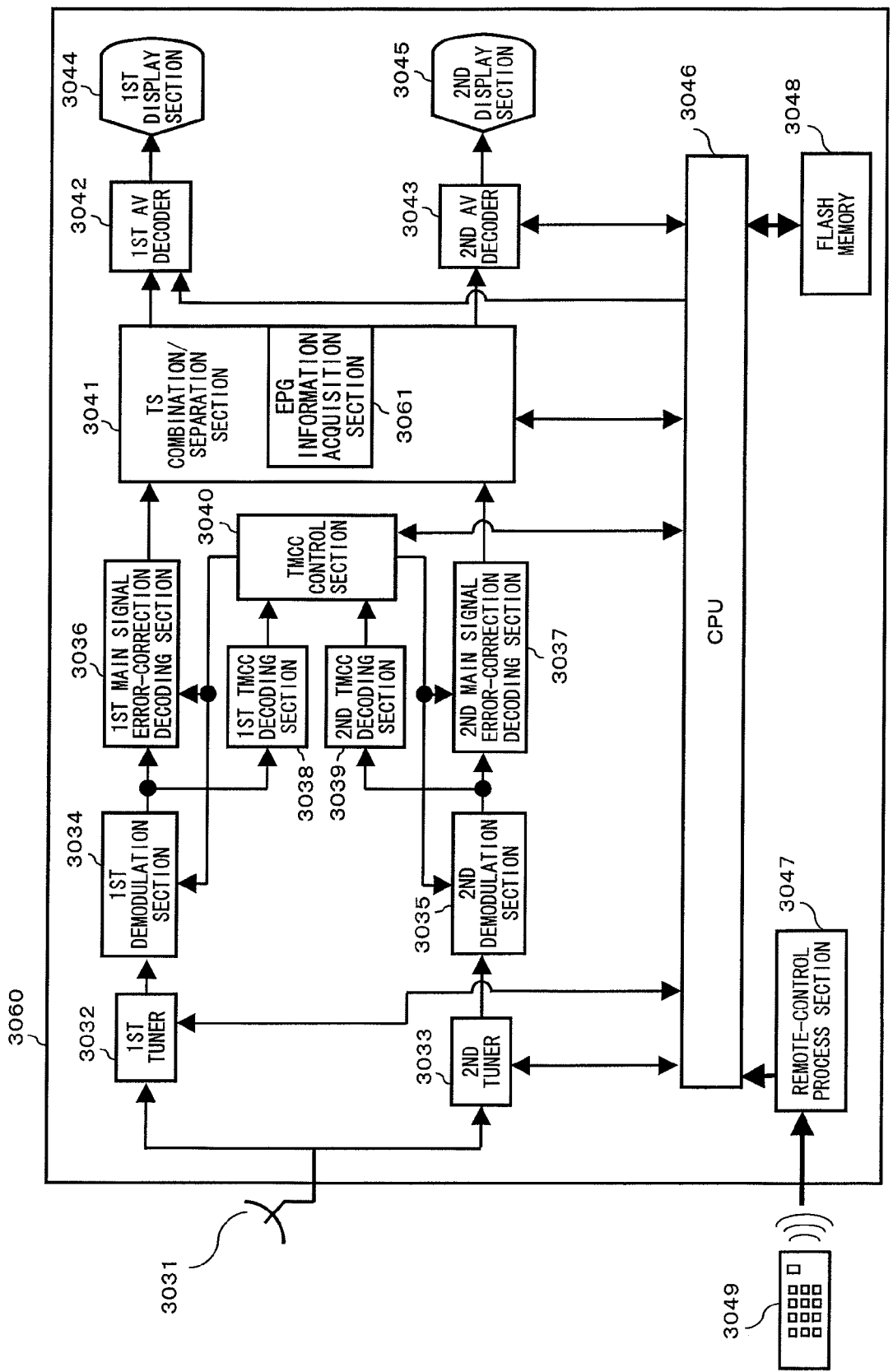
FIG. 39 is a block diagram showing the structure of a reception device 3060 according to a ninth embodiment of the present invention.

FIG. 39 is a block diagram showing the structure of a reception device 3060 according to the ninth embodiment of the present invention. The reception device 3060 according to the present embodiment corresponds to the functional structure of the reception device 3030, described above with reference to FIG. 34 in the seventh embodiment, having added thereto an EPG information acquisition section 3061, and the other elements are the same as those of the seventh embodiment. Therefore the elements other than the EPG information acquisition section 3061 will be denoted by the same numerals and will not be described in detail.

Referring to FIG. 39, the TS combination/separation section 3041 includes the EPG information acquisition section 3061. The EPG information acquisition section 3061 separates and obtains data about the EPG from the transport stream output from the first main signal error-correction decoding section 3036. Based on a control signal from the CPU 3046, the EPG information acquisition section 3061 searches the EPG for programs satisfying predetermined conditions and outputs the search result to the CPU 3046. Here, the EPG includes, as well as data about the broadcast time and the broadcast material of each program, information indicating whether or not the program is a bulk program, and information indicating the physical channels forming the bulk program. Accordingly, based on a control signal from the CPU 3046, the EPG information acquisition section 3061 can search the EPG for a bulk program scheduled to be broadcast within a predetermined time and the channels forming the bulk program. Note that the EPG information acquisition section 3061 may be configured to acquire the EPG from, for example, the Internet.

Next, a description is given of the process performed by the reception device 3060 according to the ninth embodiment.

Figure 40:
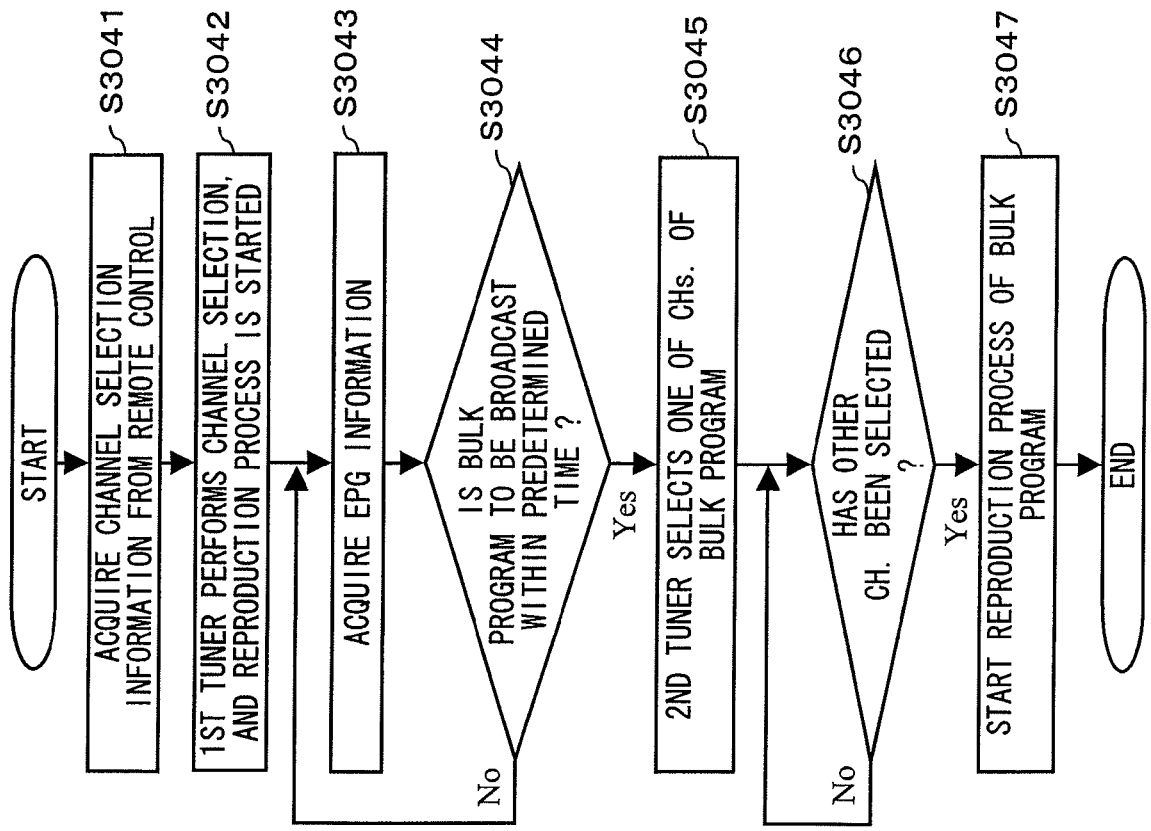
FIG. 40 is a flow chart showing details of a channel-selection/reproduction process performed by the reception device 3060 according to the ninth embodiment.

FIG. 40 is a flow chart showing details of a channel-selection/reproduction process performed by the reception device 3060 according to the ninth embodiment. Here, the process of the flow chart is described on the assumption that the channel of a non-bulk program has been selected as a result of the user's channel selection operation.

Referring to FIG. 40, in step S3041, channel selection information from the remote control 3049 is acquired. That is, the CPU 3046 acquires, through the remote-control process section 3047, information representing the user's channel selection operation.

In step S3042 the first tuner 3032 performs a channel selection process based on the channel selection information. More specifically, the CPU 3046 outputs to the first tuner 3032 a control signal for causing the first tuner 3032 to select the channel selected by the user. In response to this, the first tuner 3032 selects the physical channel specified by the user. Here, as described above, it is assumed that a physical channel on which a non-bulk program is being broadcast is selected.

Then, as described in the seventh embodiment, various processes for reproducing the non-bulk program are performed, and the reproduction of the non-bulk program on the selected physical channel is started.

In step S3043 the EPG is acquired. That is, the CPU 3046 outputs to the EPG information acquisition section 3061 a control signal for causing the EPG information acquisition section 3061 to acquire the EPG In response to this, the EPG information acquisition section 3061 acquires the EPG from the transport stream output from the first main signal error-correction decoding section 3036.

In step S3044 it is determined whether or not a bulk program is present that is scheduled to be broadcast within a predetermined time of the current time. Specifically, the CPU 3046 outputs to the EPG information acquisition section 3061 a control signal representing an instruction to perform a search with specified search conditions, such as "within an hour of the current time" and "a bulk program". In response to this, the EPG information acquisition section 3061 searches the acquired EPG with respect to all the physical channels for programs satisfying these conditions. When a bulk program satisfying these conditions is not present ("No" in step S3044), the process is repeated, returning to step S3043.

Note that the time specified above as one of the search conditions is merely illustrative, and needless to say, may be "within two hours of the current time" or the like.

On the other hand, when a bulk program satisfying these conditions is present ("Yes" in step S3044), the physical channel numbers of the physical channels forming the bulk program are acquired and are output to the CPU 3046. In step S3045 the second tuner 3033 performs a process of selecting either one of the two physical channels forming the bulk program scheduled to be broadcast. It may be determined by the method described in the first embodiment which one of the two physical channels forming the bulk program is to be selected.

In step S3046, in the broadcast period of the bulk program scheduled to be broadcast, it is determined whether or not the first tuner 3032 has selected the physical channel not selected by the second tuner 3033 in step S3045. When it is determined that the first tuner 3032 has not selected the physical channel, the process of step S3046 is repeated until the physical channel is selected.

On the other hand, when the first tuner 3032 has selected the physical channel not selected by the second tuner 3033 ("Yes" in step S3046), in step S3047 a process of reproducing the bulk program on the selected physical channels is started.

The process of reproducing the bulk program after selecting the two physical channels is similar to that of the seventh embodiment, and therefore will not be described. Thus the channel-selection/reproduction process in the ninth embodiment ends.

As described above, in the ninth embodiment a bulk program scheduled to be broadcast is searched for in advance using the EPG, and the second tuner 3033 selects ahead one of the channels of the bulk program scheduled to be broadcast. This makes it possible to omit a channel selection process performed by the second tuner 3033 when the first tuner 3032 selects a physical channel of the bulk program based on the user's channel selection operation. As a result, it is possible to reduce the latency from when the user's channel selection operation is performed to when the video and audio of the bulk program are actually output.

Note that in step S3044, as to search conditions used to search the EPG for bulk programs, not all the channels may necessarily be the search targets, and only the physical channel selected by the first tuner 3032 in step S3042 may be the search target. This makes it possible to increase the search speed.

Tenth Embodiment

Figure 41:
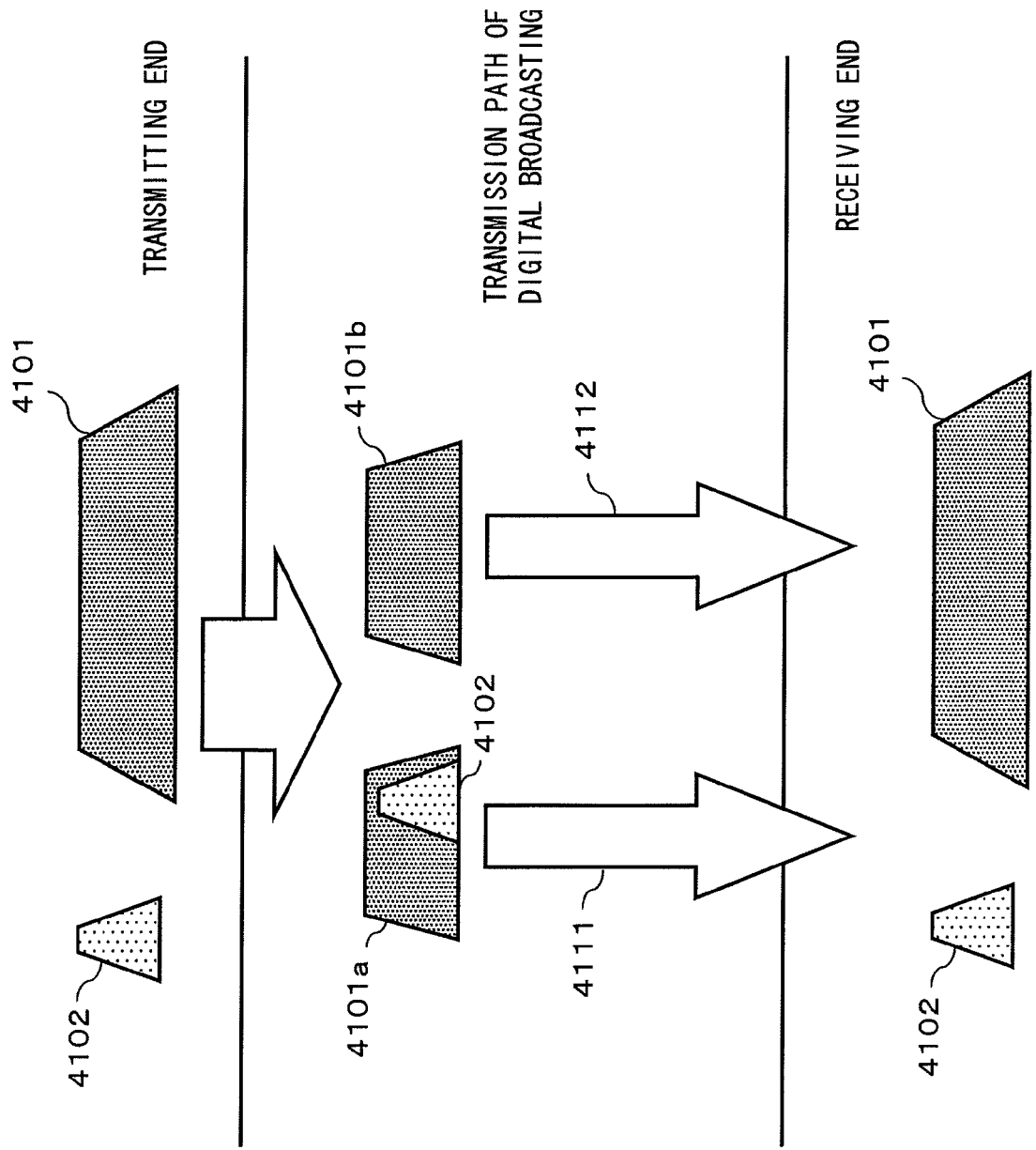
FIG. 41 is a schematic diagram illustrating the concept of the transmission of a Super Hi-Vision program in a tenth embodiment.

Next, a tenth embodiment of the present invention is described. Prior to describing details of the tenth embodiment, a description is given of an overview of transmission in a digital broadcasting system that is commonly assumed in the tenth embodiment and in eleventh and twelfth embodiments described thereafter. In the present embodiment a digital broadcasting system is assumed in which a moving image content of a so-called Hi-Vision standard and a moving image content of a so-called Super Hi-Vision standard are broadcast in a mixed manner. For example, a case is assumed where on specific channels, a moving image content of the Hi-Vision standard is broadcast from 7:00 p.m. to 8:00 p.m. and a moving image content of the Super Hi-Vision standard is broadcast from 8:00 p.m. to 10:00 p.m. Here, it is assumed that a program formed under the Hi-Vision standard has such an amount of information that can be completely transmitted on one physical channel. On the other hand, a program formed under the Super Hi-Vision standard has such an amount of information that cannot be completely transmitted on only one physical channel. Accordingly, when the program formed under the Hi-Vision standard is broadcast, one program is transmitted on one physical channel; whereas, as shown in FIG. 41, when the program formed under the Super Hi-Vision standard is broadcast, broadcast data (a transport stream) 4101 of the program is divided into two and transmitted using two physical channels 4111 and 4112. Hereinafter, such transmission of one program using two physical channels (i.e., using two physical channels bundled together into one transmission path) will be referred to as "bulk transmission". In addition, a program formed under the Super Hi-Vision standard that is subjected to bulk transmission will be referred to as a "bulk program", and a program formed under the Hi-Vision standard that can be completely transmitted on one physical channel will be referred to as a "non-bulk program". Accordingly, to take the above periods as an example, from 7:00 p.m. to 8:00 p.m., non-bulk programs having different materials are displayed on physical channel 1 and physical channel 2 (hereinafter referred to simply as "ch. 1", "ch. 2" . . . ), and from 8:00 p.m. to 10:00 p.m., a bulk program having the same material is displayed on both channels, for example. That is, the same program is displayed on the screen even if either channel is selected.

Here, in the present embodiment, when a bulk program is subjected to bulk transmission, hierarchical transmission is performed using one of the two physical channels used for the bulk transmission. Specifically, at the transmitting end a content having the same material as that of the bulk program is created under the Hi-Vision standard (such a content of the Hi-Vision standard will be hereinafter referred to as a "lower-layer program"). That is, the bulk program and the lower-layer program are different only in that the bulk program is created under the Super Hi-Vision standard and the lower-layer program is created under the Hi-Vision standard, and are the same in program material (the material that is broadcast). In the present embodiment, as modulation schemes, the bulk program is modulated using 32-APSK (Amplitude Phase Shift Keying), and the lower-layer program is modulated using QPSK (Quadrature Phase Shift Keying). Since the lower-layer program (of the Hi-Vision standard) has a smaller amount of information than that of the bulk program, the lower-layer program can be transmitted using a narrower network bandwidth. In the present embodiment, as shown in FIG. 41, on one of the channels used for bulk transmission, a bulk program 4101a and a lower-layer program 4102 are subjected to hierarchical transmission. Note that the video standards of the non-bulk program and the lower-layer program are not limited to Hi-Vision video, and may be SD (Standard Definition) video.

Figure 42:
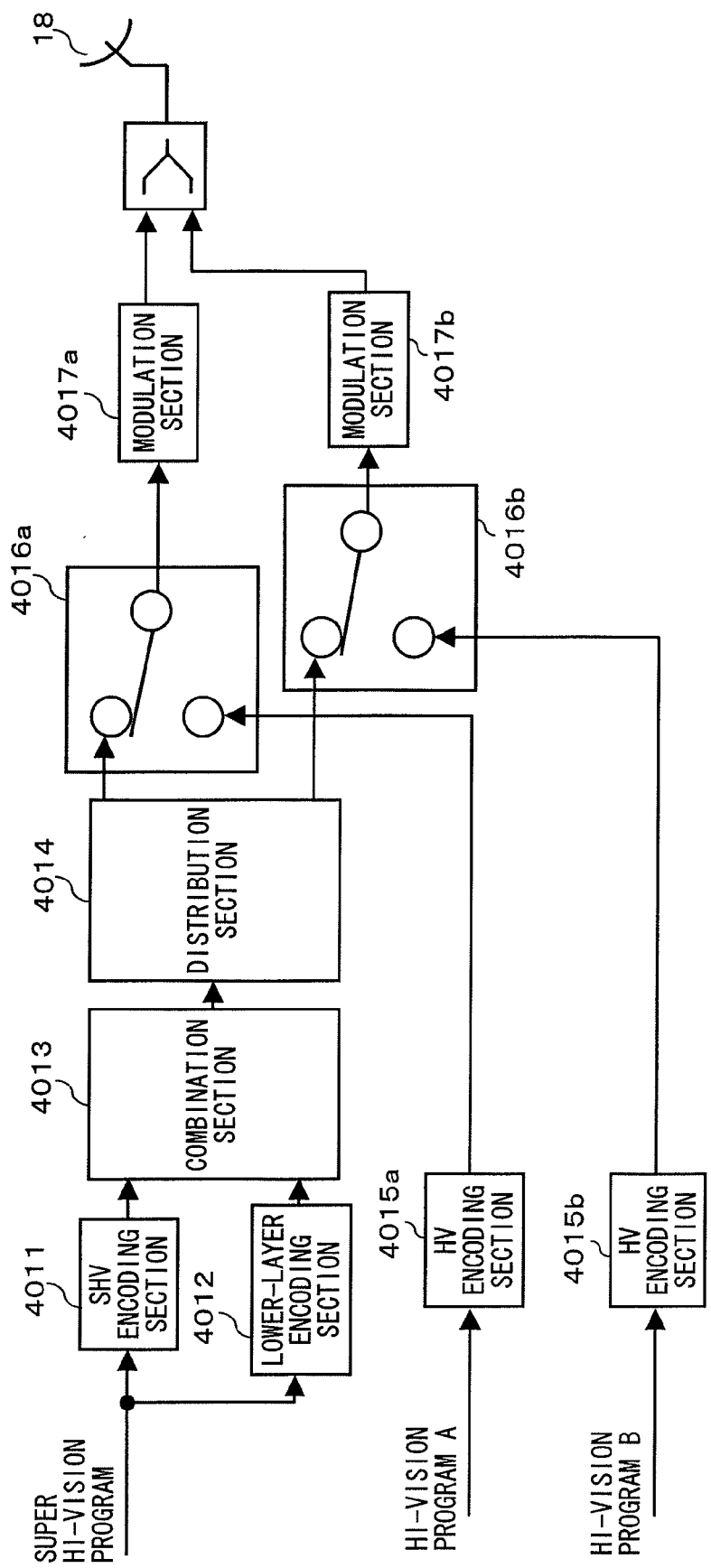
FIG. 42 is a functional block diagram showing an example of a system provided at the transmitting end according to the tenth embodiment.

FIG. 42 is a functional block diagram showing an example of a system (a transmission device) provided at the transmitting end for performing the broadcasting described above. The transmission device shown in FIG. 42 includes an SHV encoding section 4011, a lower-layer encoding section 4012, a combination section 4013, a distribution section 4014, HV encoding sections 4015a and 4015b, change-over switch sections 4016a and 4016b, modulation sections 4017a and 4017b, and a transmitting antenna 4018.

Referring to FIG. 42, first, a case is described where a program with Super Hi-Vision video is transmitted. In this case, the switches of the change-over switch sections 4016a and 4016b are set so that the modulation sections 4017a and 4017b are connected to the distribution section 4014. With the switches thus set, the program with Super Hi-Vision video is output to the SHV encoding section 4011, is encoded in a predetermined encoded form, and is output to the combination section 4013 as a bulk program 4101. The program with Super Hi-Vision video is also output to the lower-layer encoding section 4012, is encoded in a predetermined encoded form (here encoded so as to have an image quality corresponding to the Hi-Vision standard), and is output to the combination section 4013 as a lower-layer program 4102. The combination section 4013 generates a transport stream having multiplexed the bulk program 4101 and the lower-layer program 4102, and outputs the transport stream to the distribution section 4014. The distribution section 4014 distributes the transport stream to two output destinations, i.e., the change-over switch sections 4016a and 4016b, in accordance with a predetermined rule (at this time, data about the lower-layer program 4102 is output to only the path of either one of the change-over switch sections 4016a and 4016b). The output data is separately input to the modulation sections 4017a and 4017b and modulated into broadcast signals in a predetermined scheme. Then the broadcast signals are output through the transmitting antenna 4018, using different physical channels. As a result, to take FIG. 41 as an example, on one of the physical channels, the lower-layer program 4102 and the bulk program 4101a, which is one of the divided parts described above, are subjected to hierarchical transmission, and on the other physical channel, only a bulk program 4101b, which is the other divided part, is transmitted.

Next, a case is described where non-bulk programs are transmitted. In this case, two non-bulk programs having different materials are transmitted on different channels. The change-over switch sections 4016a and 4016b are switched so that the modulation section 4017a is connected to the HV encoding section 4015a and the modulation section 4017b is connected to the HV encoding section 4015b. Then a Hi-Vision program A, which is a program with Hi-Vision video, is input to the HV encoding section 4015a and is encoded in a predetermined encoded form. In addition, a Hi-Vision program B, which has a different material from that of the Hi-Vision program A, is input to the HV encoding section 4015b and is encoded in a predetermined encoded form. Then the encoded Hi-Vision program A is output from the HV encoding section 4015a to the modulation section 4017a and is modulated into a broadcast signal. Similarly, the encoded Hi-Vision program B is output from the HV encoding section 4015b to the modulation section 4017b and is modulated into a broadcast signal. The broadcast signals are transmitted through the transmitting antenna 4018, using different channels. Thus, in the present embodiment, digital broadcasting is performed while appropriately switching between the outputs of a bulk program and non-bulk programs.

Here, bulk transmission requires, at the reception device end (which is provided with at least two tuners so as to simultaneously receive two physical channels), information (hereinafter referred to as "bulk-related information") for reproducing the bulk program, such as information as to which physical channels are combined to form the bulk program. In the present embodiment the bulk-related information is attached to a so-called TMCC (Transmission and Multiplexing Configuration Control) signal (a signal including transmission parameters and the like) and is transmitted. At the reception device end the bulk-related information is acquired by separating the TMCC signal from a broadcast signal that is selected and received by either one of the tuners. Then, based on the bulk-related information, it is determined, for example, whether or not the program to be transmitted is a bulk program, and if the program is a bulk program, it is determined which channels are combined to form the bulk program. Then a process of performing channel selection, combination, and the like is to be performed.

FIG. 43 is a diagram showing an example of the bulk-related information used in the present embodiment. The bulk-related information includes sets of a physical ch. number 4131, a connection flag 4132, and a connection target ch. 4133. The bulk-related information includes information about all the physical channels, and the physical ch. number 4131 represents the number of each physical channel. The connection flag 4132 is a flag for identifying whether the program that is broadcast is a bulk program or a non-bulk program. When set to "On", the connection flag 4132 indicates that the program that is transmitted on the physical channel is a bulk program. On the other hand, when set to "Off", the connection flag 4132 indicates that a non-bulk program is broadcast using only the physical channel.

The connection target ch. 4133 is data for, when the program that is broadcast on the physical channel is a bulk program, indicating the physical channel number of the other physical channel that forms the bulk program with the physical channel. Referring to the example of FIG. 43, in a double-tuner reception device, for example, when one of the tuners selects ch. 1 and thereby the bulk-related information shown in FIG. 43 is acquired, it is understood that the program that is broadcast on ch. 1 is a bulk program, and the bulk program is formed of ch. 1 and ch. 2. Accordingly, it is understood that in order to reproduce the bulk program, the other tuner needs to select ch. 2.

Thus, in the digital broadcasting system assumed in the present embodiment, a bulk program and a non-bulk program are broadcast in a mixed manner, and the bulk program is subjected to bulk transmission, using two physical channels. A reception device used in each embodiment described below receives digital broadcasting transmitted as described above.

Next, a description is given of a reception device according to the tenth embodiment of the present invention. FIG. 44 is a functional block diagram showing an example of a reception device 4030 according to the tenth embodiment. Referring to FIG. 44, the reception device 4030 includes an antenna 4031, a first tuner 4032, a second tuner 4033, a first demodulation section 4034, a second demodulation section 4035, a first main signal error-correction decoding section 4036, a second main signal error-correction decoding section 4037, a first TMCC decoding section 4038, a second TMCC decoding section 4039, a TMCC control section 4040, a TS combination/separation section 4041, a first AV decoder 4042, a second AV decoder 4043, a first OSD generation/combination section 4044, a second OSD generation/combination section 4045, a first display section 4046, a second display section 4047, a CPU 4048, a remote-control process section 4049, a flash memory 4050, and a remote control 4051.

The first tuner 4032 and the second tuner 4033 select predetermined physical channels based on control signals from the CPU 4048, and receive digital broadcast signals through the antenna 4031, respectively.

The first demodulation section 4034 demodulates the transmitted signal output from the first tuner 4032 into digital signals, and outputs the digital signals to the first main signal error-correction decoding section 4036 and the first TMCC decoding section 4038.

Figure 45:
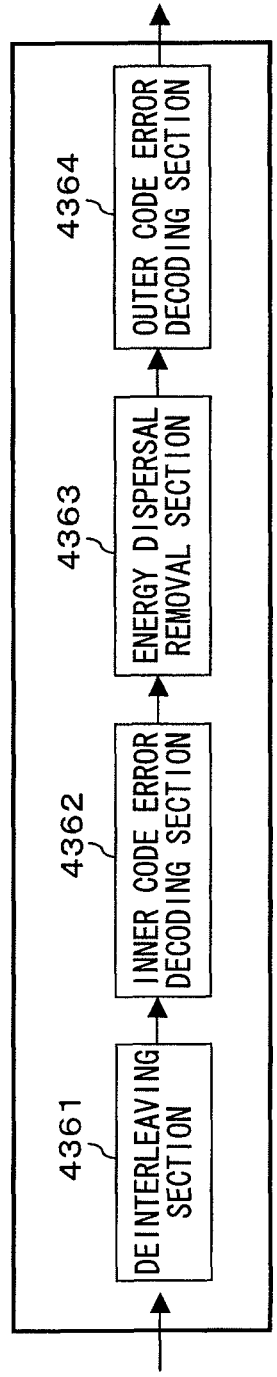
FIG. 45 is a block diagram showing details of a first main signal error-correction decoding section 4036.

The first main signal error-correction decoding section 4036 performs an error-correction decoding process on the digital signal output from the first demodulation section 4034, and thereby obtains a transport stream. Then the first main signal error-correction decoding section 4036 outputs the transport stream to the TS combination/separation section 4041. FIG. 45 is a block diagram showing details of the first main signal error-correction decoding section 4036. Referring to FIG. 45, in the first main signal error-correction decoding section 4036: a deinterleaving section 4361 deinterleaves the digital signal output from the first demodulation section 4034; an inner code error decoding section 4362 decodes an inner code of the digital signal; an energy dispersal removal section 4363 performs energy dispersal removal of the digital signal; and an outer code error decoding section 4364 decodes an outer code of the digital signal. Then the resulting digital signal is output as a transport stream.

The first TMCC decoding section 4038 decodes the digital signal (TMCC signal) output from the first demodulation section 4034, and thereby acquires TMCC information from the decoded digital signal. Then the first TMCC decoding section 4038 outputs the TMCC information to the TMCC control section 4040.

The second demodulation section 4035, the second main signal error-correction decoding section 4037, and the second TMCC decoding section 4039 perform, on the transmitted signal output from the second tuner 4033, similar processes to those performed by the first demodulation section 4034, the first main signal error-correction decoding section 4036, and the first TMCC decoding section 4038, respectively.

The TMCC control section 4040 controls the first demodulation section 4034 and the first main signal error-correction decoding section 4036 based on the TMCC information (more precisely, information about various transmission parameters acquired from the TMCC information, and the like) output from the first TMCC decoding section 4038. The TMCC control section 4040 also controls the second demodulation section 4035 and the second main signal error-correction decoding section 4037 based on the TMCC information output from the second TMCC decoding section 4039. The TMCC control section 4040 also outputs the acquired TMCC information to the CPU 4048.

The TS combination/separation section 4041 performs processes by switching between the following two types of process modes based on a control signal from the CPU 4048. As a first process mode, the TS combination/separation section 4041 performs a process of reproducing a bulk program. In this case, the TS combination/separation section 4041 combines both transport streams output from the first main signal error-correction decoding section 4036 and the second main signal error-correction decoding section 4037, and thereby reconstructs the transport stream that has yet to be divided into two at the transmitting end. The TS combination/separation section 4041 also separates and obtains an AV stream of a bulk program and an AV stream of the lower-layer program from the combined transport stream. Then the TS combination/separation section 4041 outputs the AV stream of the bulk program or the AV stream of the lower-layer program to the first AV decoder 4042, based on a control signal from the CPU 4048. As a second process mode, the TS combination/separation section 4041 performs a process of reproducing non-bulk programs. In this case, the TS combination/separation section 4041 does not combine the transport streams output from the first main signal error-correction decoding section 4036 and the second main signal error-correction decoding section 4037. That is, the TS combination/separation section 4041 separates an AV stream from the transport stream output from the first main signal error-correction decoding section 4036, and outputs the AV stream to the first AV decoder 4042. The TS combination/separation section 4041 also separates an AV stream from the transport stream output from the second main signal error-correction decoding section 4037, and outputs the AV stream to the second AV decoder 4043. Hereinafter, the process mode for reproducing a bulk program will be referred to as a "bulk reproduction mode", and the process mode for reproducing non-bulk programs will be referred to as a "non-bulk reproduction mode".

Based on a control signal from the CPU 4048, the first AV decoder 4042 and the second AV decoder 4043 each decode the corresponding AV stream output from the TS combination/separation section 4041, and thereby obtain video and audio signals. The first AV decoder 4042 outputs to the first display section 4046 the resulting video and audio signals obtained from the decoding. The second AV decoder 4043 outputs to the second display section 4047 the resulting video and audio signals obtained from the decoding. Here, the first AV decoder 4042 and the second AV decoder 4043 are each capable of performing a decoding process at least in decoded forms corresponding to the encoded forms of both AV streams of a bulk program and a non-bulk program. Based on a control signal from the CPU 4048, the first AV decoder 4042 and the second AV decoder 4043 each perform the decoding process by appropriately switching between these decoded forms.

The first OSD generation/combination section 4044 generates an OSD to be displayed superimposed on a screen image that is output from the first AV decoder 4042 to the first display section 4046. Then the first OSD generation/combination section 4044 combines the output from the first AV decoder 4042 and the generated OSD, and outputs the combined result to the first display section 4046. The second OSD generation/combination section 4045 generates an OSD to be displayed superimposed on a screen image that is output from the second AV decoder 4043 to the second display section 4047, combines the output from the second AV decoder 4043 and the generated OSD, and outputs the combined result to the second display section 4047.

The first display section 4046 and the second display section 4047 correspond to the two screen images of so-called picture-in-picture display, respectively. The first display section 4046 presents video and audio to the user based on the video and audio signals output from the first AV decoder 4042. The second display section 4047 presents video and audio to the user based on the video and audio signals output from the second AV decoder 4043.

The CPU 4048 performs a process of allowing the user to view a bulk program or a non-bulk program, by controlling the first tuner 4032, the second tuner 4033, the TS combination/separation section 4041, the first AV decoder 4042, the second AV decoder 4043, and the like while switching between the bulk reproduction mode and the non-bulk reproduction mode.

The remote-control process section 4049 receives an operation signal from the remote control 4051, and outputs a signal representing the operating instruction to the CPU 4048.

The flash memory 4050 is a non-volatile memory and stores data used for various controls performed by the CPU 4048.

Next, a description is given of an overview of a channel-selection/reproduction process performed by the reception device 4030. In the present embodiment the following state is assumed as a premise of the description below. First, the channels to be viewed are ch. 1 and ch. 2. Then the broadcast schedule of these channels is set as a schedule as shown in FIG. 46. That is, it is assumed that non-bulk programs are broadcast from 7:00:00 p.m. to 7:59:59 p.m., a bulk program is broadcast from 8:00:00 p.m. to 9:59:59 p.m., and non-bulk programs are broadcast from 10:00:00 p.m. to 10:59:59 p.m. As an example, from 7:00:00 p.m. to 7:59:59 p.m., an animation program, which is a non-bulk program, is broadcast on ch. 1, and a news program, which is a non-bulk program, is broadcast on ch. 2. From 8:00:00 p.m. to 9:59:59 p.m., a movie program, which is a bulk program, is broadcast on ch. 1 and ch. 2. From 10:00:00 p.m. to 10:59:59 p.m., a variety program, which is a non-bulk program, is broadcast on ch. 1, and a drama program, which is a non-bulk program, is broadcast on ch. 2.

In this broadcast schedule, it is assumed that the user selects ch. 1 with the first tuner 4032 at 7:30:00 p.m. In this case, the animation program, which is a non-bulk program, is broadcast until 7:59:59 p.m., and the broadcast of the movie program, which is a bulk program, is to start at 8:00:00 p.m. As described above, it is possible to determine, based on the bulk-related information (see FIG. 43) included in a TMCC signal, whether the program that is broadcast is a bulk program or a non-bulk program. Accordingly, in the present embodiment it is determined, based on the bulk-related information, whether the program to be broadcast is a bulk program or a non-bulk program. When broadcast programs switch from a non-bulk program to a bulk program, in the above example the second tuner 4033 selects 2 ch. at 8:00:00 p.m., and a process of reproducing the non-bulk program, which has been being performed, is switched to a process of reproducing the bulk program. In addition, at this time, in the present embodiment an OSD is displayed to indicate that the broadcast programs are to switch to the bulk program. Then, when the bulk program switches to a non-bulk program at 10:00:00 p.m., the process of reproducing the bulk program, which has been being performed, is switched to a process of reproducing the non-bulk program (a process of opening the second tuner, etc.). Also at this time, an OSD is displayed to indicate that the broadcast programs are to switch from the bulk program to the non-bulk program.

Thus, in the tenth embodiment it is determined, based on the bulk-related information included in a TMCC signal, whether the program that is broadcast a bulk program or a non-bulk program, and a process of reproducing a bulk program and a process of reproducing a non-bulk program are automatically switched in accordance with the determination result. This makes it possible for a reception device provided with two tuners to allow both a bulk program and a non-bulk program to be viewed, and therefore possible to provide a convenient reception device. In addition, an OSD is displayed to indicate that the broadcast programs are to switch, and thus it is possible to allow the user to recognize whether or not the program to be viewed is a bulk program, and therefore possible to improve the convenience.

Figure 47:
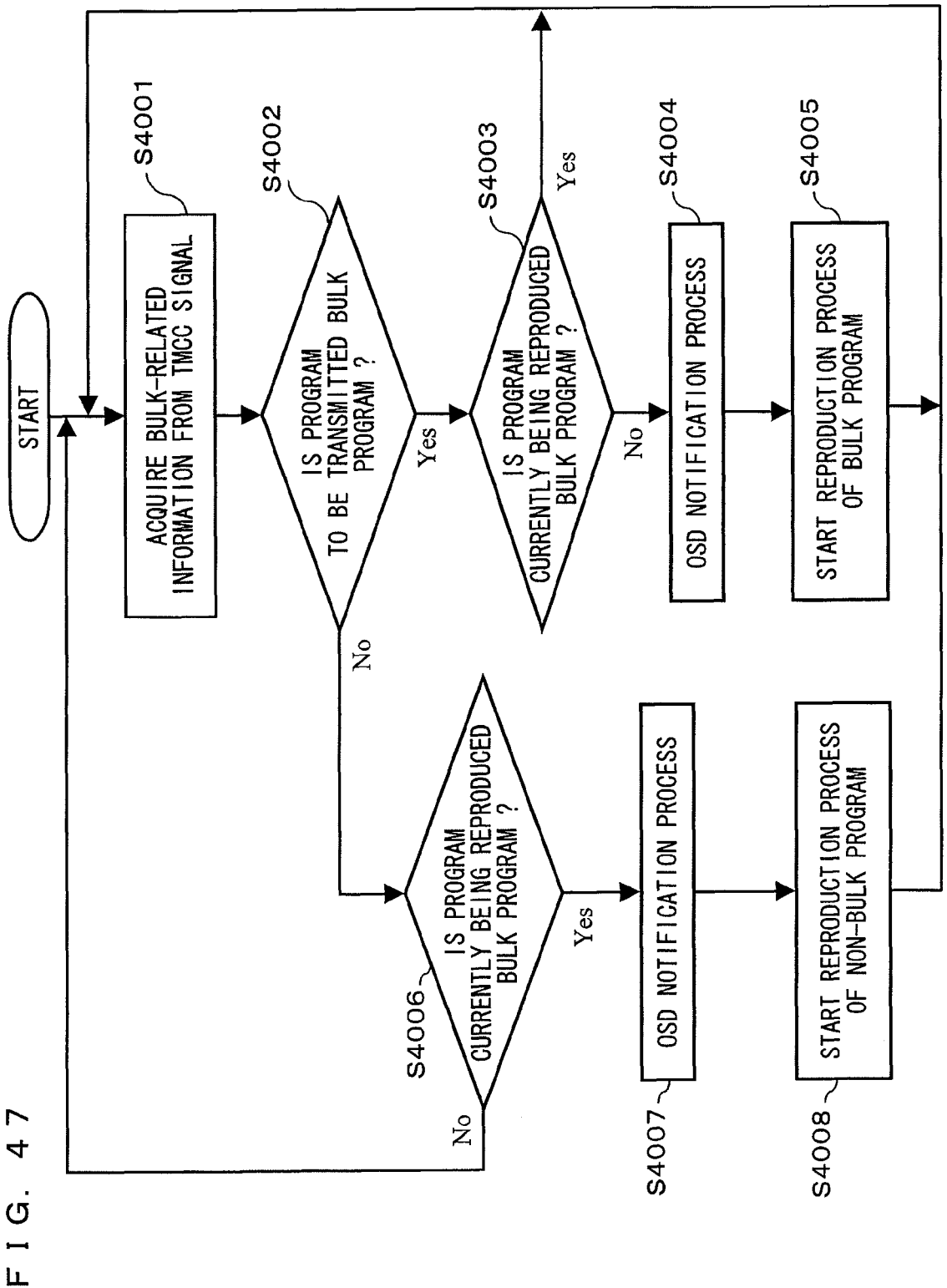
FIG. 47 is a flow chart showing a program channel-selection/reproduction process performed by the reception device 4030.

A description is given below of details of a reception/reproduction process performed by the reception device 4030 according to the tenth embodiment. FIG. 47 is a flow chart showing the details of the reception/reproduction process. Here, the process of the flow chart of FIG. 47 is described, taking as an example the case where the process is performed when ch. 2 is being viewed using the first tuner 4032 in the program schedule shown in FIG. 46 (the case where the process mode is the non-bulk reproduction mode).

Referring to FIG. 47, in step S4001 the bulk-related information is acquired from a TMCC signal separated from a broadcast signal received by the first tuner 4032.

In step S4002 it is determined, with reference to the bulk-related information, whether or not the program to be transmitted on ch. 2 is a bulk program. More specifically, with reference to the connection flag 4132 regarding ch. 2, which is the physical channel selected by the first tuner 4032, a process is performed of determining whether or not the program to be transmitted on ch. 2 is a bulk program. To take as an example the program schedule described above, in the bulk-related information of the TMCC signal transmitted on ch. 2, no value is set in the connection target ch. 4133 regarding ch. 2 while, for example, the news program is being transmitted (from 7:00:00 to 7:59:59), and "ch. 1" is set in the connection target ch. 4133 regarding ch. 2 while the movie program is being subjected to bulk transmission (from 8:00:00 to 9:59:59).

When it is determined that the program to be transmitted is a bulk program ("Yes" in step S4002: e.g., at 8:00:00), in step S4003 it is determined whether or not the program that is currently being viewed is a bulk program. The determination is made based on, for example, whether the process mode of the TS combination/separation section 4041 is the bulk reproduction mode or the non-bulk reproduction mode at that time.

When it is determined that the program that is currently being viewed is a non-bulk program ("No" in step S4003), although the program that is currently being viewed is a non-bulk program, the non-bulk program is to switch to a bulk program, which is the program to be transmitted. Accordingly, it becomes necessary to switch the process mode. In this case, in step S4004 a process is performed of displaying an OSD to indicate that the programs that are broadcast are to switch from a non-bulk program to a bulk program. That is, the CPU 4048 outputs to the first OSD generation/combination section 4044 a control signal for causing the first OSD generation/combination section 4044 to generate a notification message (e.g., a message such as "The broadcast of a bulk program is to start") that the broadcast programs are to switch. In response to this, the first OSD generation/combination section 4044 generates the notification message (the notification message may be generated in such a manner that a predetermined character string is stored in a predetermined memory in advance and read therefrom in accordance with the control signal, or that the CPU 4048 generates a character string to be a notification message and includes, in the control signal, data representing the character string). Then the first OSD generation/combination section 4044 combines the notification message and the video signal from the first AV decoder 4042, and outputs the combined result to the first display section 4046. As a result, it is indicated on the screen that a bulk program is to start.

In step S4005 a process of reproducing the bulk program is started. Specifically, first, with reference to the bulk-related information, the CPU 4048 causes the second tuner 4033 to select the physical channel (ch. 1, in the present embodiment) indicated by the connection target ch. 4133 regarding ch. 2. As a result, the first tuner 4032 selects ch. 2 and the second tuner 4033 selects ch. 1. Then broadcast signals received by both tuners are decoded and the like, and thereby transport streams are obtained. Then the CPU 4048 outputs to the TS combination/separation section 4041 a control signal for causing the TS combination/separation section 4041 to switch the process mode to the bulk reproduction mode. Consequently, the TS combination/separation section 4041 starts a process of combining the transport stream obtained through the first tuner 4032 and the transport stream obtained through the second tuner 4033. Then the TS combination/separation section 4041 separates an AV stream of the bulk program and an AV stream of the lower-layer program from the combined transport stream, and outputs the AV stream of the bulk program to the first AV decoder 4042. The first AV decoder 4042 starts a process of decoding the AV stream of the bulk program and outputting the resulting video and audio signals to the first display section 4046. Thus the bulk program is displayed on the screen, i.e., the reproduction process of the bulk program is started. Then the process returns to step S4001.

On the other hand, when it is determined that the program that is currently being viewed is a bulk program ("Yes" in step S4003), the process immediately returns to step S4001. That is, the program that is currently being viewed is a bulk program and the program to be transmitted is also a bulk program (i.e., a bulk program is being viewed: e.g., at 9:00:00 p.m. in FIG. 46). Accordingly, it is not necessary to switch the process mode.

On the other hand, when it is determined that the program to be transmitted is not a bulk program ("No" in step S4002: e.g., at 7:30:00), in step S4006 it is determined whether or not the program that is currently being viewed is a bulk program. The determination is made based on, for example, whether the process mode is the bulk reproduction mode or the non-bulk reproduction mode at that time.

When it is determined that the program that is currently being viewed is a non-bulk program ("No" in step S4006), the process immediately returns to step S4001. That is, the program that is currently being viewed is a non-bulk program and the program to be transmitted is also a non-bulk program. Accordingly, it is not necessary to switch the process mode.

On the other hand, when it is determined that the program that is currently being viewed is a bulk program ("Yes" in step S4006), although the program that is currently being viewed is a bulk program, the bulk program is to switch to a non-bulk program, which is the program to be transmitted (e.g., at 10:00:00 p.m. in FIG. 45). Accordingly, it becomes necessary to switch the process mode from the bulk reproduction mode to the non-bulk reproduction mode. In this case, in step S4007 a process is performed of displaying an OSD to indicate that the programs that are broadcast are to switch from a bulk program to a non-bulk program. That is, the CPU 4048 outputs to the first OSD generation/combination section 4044 a control signal for causing the first OSD generation/combination section 4044 to generate a notification message (e.g., a message such as "The broadcast of a bulk program is to end") that the programs that are broadcast are to switch. In response to this, the first OSD generation/combination section 4044 generates the notification message. Then the first OSD generation/combination section 4044 combines the notification message and the video signal from the first AV decoder 4042, and outputs the combined result to the first display section 4046. As a result, it is indicated on the screen that a non-bulk program is to start.

In step S4008 a process of reproducing the non-bulk program is started. Specifically, first, the CPU 4048 outputs to the second tuner 4033 a control signal for opening the second tuner 4033. As a result, the ch. 1 that has been selected by the second tuner 4033 is released. The CPU 4048 outputs to the TS combination/separation section 4041 a control signal for causing the TS combination/separation section 4041 to switch the process mode to the non-bulk reproduction mode. Consequently, without combining the transport streams as described above, the TS combination/separation section 4041 starts a process of separating an AV stream of the non-bulk program from the transport stream obtained through the first tuner 4032 and outputting the AV stream to the first AV decoder 4042. The first AV decoder 4042 starts a process of decoding the AV stream of the non-bulk program and outputting the resulting video and audio signals to the first display section 4046. Thus the reproduction process of the non-bulk program is started. Then the process returns to step S4001. Thus the description of the reception/reproduction process according to the tenth embodiment ends.

As described above, in the present embodiment a process of reproducing a bulk program and a process of reproducing a non-bulk program are automatically switched based on the bulk-related information included in a TMCC signal. This makes it possible for one reception device to allow both a bulk program and a non-bulk program to be viewed. In addition, when the programs are switched, an OSD is displayed to indicate that the programs are to switch between a bulk program and a non-bulk program, and thus it is possible to make it easy for the user to recognize whether the program to be broadcast is a bulk program or a non-bulk program.

Note that the following process may be performed for the OSD, as well as the display process described above. For example, at the time when a bulk program starts on the physical channel selected by the first tuner 4032, if the second tuner 4033 is being used due to, for example, picture-in-picture simultaneous display, the bulk program cannot be reproduced since the two physical channels used for the bulk transmission cannot be selected. If nothing is displayed on the screen and the screen remains dark in such a case, the viewer may be given a false impression that a failure has occurred. In response, in this case, an OSD may be displayed to indicate that reception cannot be performed, so that the viewer can recognize that this is not a failure. That is, at the time when a bulk program starts (when it is "Yes" in step S4002), the CPU 4048 determines whether or not it is possible to perform channel selection using the two tuners, i.e., whether or not the bulk program can be reproduced and displayed. When it is determined that the bulk program cannot be displayed, the CPU 4048 may output to the first OSD generation/combination section 4044 a control signal for displaying the OSD to indicate that reception cannot be performed.

Alternatively, the reception device may have, for example, the structure of FIG. 44, excluding therefrom the first and second display sections, i.e., the structure of a so-called digital tuner unit. That is, the user may prepare display sections such as displays separately and connect the displays to the digital tuner unit. When the displays are those incompatible to a bulk program, e.g., when the displays do not have sufficient resolutions to display a bulk program, an OSD may be used to indicate that the displays are incompatible, rather than nothing being displayed on the displays. That is, the CPU 4048 may acquire information about the connected displays (information about the resolutions and the like of the displays). Then the CPU 4048 may determine whether or not a bulk program can be displayed on the connected displays. Then, when it is determined that a bulk program cannot be displayed, the CPU 4048 may perform a process of displaying the OSD to indicate that the displays are incompatible.

Yet alternatively, when the reception device is incompatible with the reception of bulk transmission, i.e., when the reception device is provided with a double tuner but does not have a function of combining transport streams received on two physical channels, an OSD may be displayed to indicate that the bulk program cannot be reproduced. That is, a digital broadcast signal includes a TMCC signal including the bulk-related information. Therefore even a reception device not having a combination function of transport streams may be, in advance, made capable of determining, based on the bulk-related information, whether or not a bulk program is to be transmitted (e.g., it is possible that firmware is updated or the like for a double-tuner reception device already on the market). Then a determination similar to that of step S4002 may be made based on the bulk-related information, and when it is determined that a bulk program is to be transmitted, a process may be performed of displaying an OSD to indicate that the reception device is incompatible with the reproduction of a bulk program.

Eleventh Embodiment

Next, an eleventh embodiment of the present invention is described with reference to FIG. 48. In the tenth embodiment, while a bulk program is being reproduced, only the output system on the first AV decoder side (the first AV decoder 4042 through to the first display section 4046) is used, whereas the output system on the second AV decoder side is not used. In contrast, in the eleventh embodiment, when a bulk program is reproduced, the lower-layer program subjected to the hierarchical transmission with the bulk program is output to the second AV decoder 4043 and is used for recording.

Here, the bulk program has Super Hi-Vision video, and therefore has a vast amount of information. Therefore, in order to record the Super Hi-Vision video as it is, it is considered that only tens to hundreds of terabytes of storage capacity does not reach a practical level. It may also be possible that the Super Hi-Vision video is recorded while subjected to a compression process (encoding process) in real time, but as described above, the amount of information is so vast that a considerably high calculation capacity is also required for the encoding process. Even if a high-capacity storage medium that can reach the level of practical use, a CPU having a high calculation capacity, and the like are mounted in a household digital broadcast reception device, it is neither realistic nor practical in terms of cost.

In response, in the present embodiment, lower-layer video (i.e., video that is sufficiently capable of being subjected to a recording process in a conventional recording apparatus) that has a smaller amount of information than that of Super Hi-Vision video and therefore can reduce the load of a recording process is output to a storage section through the second AV decoder, and is allowed to be recorded. That is, when a bulk program is being reproduced, the lower-layer program having the same material as that of the bulk program is used for recording, so that the program material per se is allowed to be recorded, although the image quality is degraded. This makes it possible to prevent the case where the bulk program can be viewed only in real time and the material of the bulk program cannot be recorded at all, and therefore possible to allow the bulk program to be simultaneously viewed and recorded. As a result, for example, while viewing a bulk program, if the user notices that useful information to the user is being broadcast on the bulk program, and then desires to immediately record the program, it is possible to record and store the program.

Figure 48:
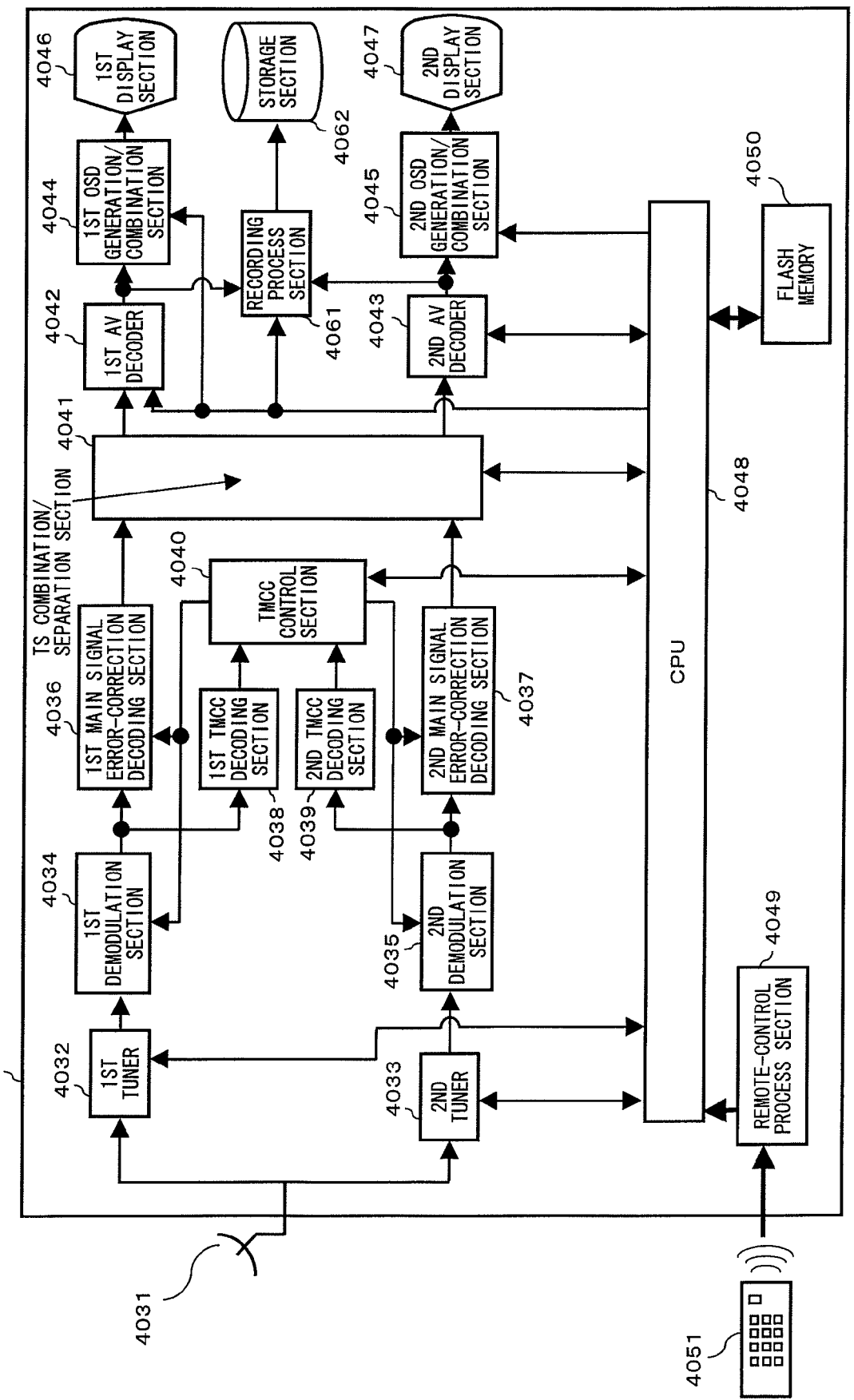
FIG. 48 is a block diagram showing the structure of a reception device 4060 according to an eleventh embodiment.

FIG. 48 is a block diagram showing the structure of a reception device 4060 according to the eleventh embodiment. The reception device 4060 according to the present embodiment corresponds to the functional structure of the reception device 4030, described above with reference to FIG. 44 in the tenth embodiment, having added thereto a recording process section 4061 and a storage section 4062, and the other elements are the same as those of the tenth embodiment. Therefore the elements other than the recording process section 4061 and the storage section 4062 will be denoted by the same numerals and will not be described in detail.

Referring to FIG. 48, based on a control signal from the CPU 4048, the recording process section 4061 performs various processes (an encoding process, a recording data management process, etc.) for recording, and thereby outputs recording data of a lower-layer program or a non-bulk program to the storage section 4062. The storage section 4062 is a medium for storing the recording data of a lower-layer program or a non-bulk program, and is implemented with, for example, a hard disk drive or an SSD (Solid State Drive).

In the structure shown in FIG. 48, the CPU 4048 performs the following process, and thereby a lower-layer program can be recorded. First, when the user inputs a recording instruction through the remote control 4051 while a bulk program is being broadcast, a signal representing the recording instruction is input to the CPU 4048. The CPU 4048, which has received the signal, separates an AV stream of the lower-layer program, as well as a process of separating an AV stream of the bulk program, from a transport stream combined in the TS combination/separation section 4041, and outputs to the TS combination/separation section 4041 a control signal for causing the TS combination/separation section 4041 to output the AV stream of the lower-layer program to the second AV decoder 4043. The CPU 4048 also outputs to the second AV decoder 4043 a control signal for causing the second AV decoder 4043 to decode the AV stream of the lower-layer program and to output the video and audio signals to the recording process section 4061. In addition, the CPU 4048 outputs to the recording process section 4061 a control signal for causing the recording process section 4061 to record the video and audio signals input from the second AV decoder 4043. As a result of this process, the lower-layer program is recorded in the storage section 4062.

As described above, in the eleventh embodiment, while a bulk program is being reproduced, the lower-layer program can be simultaneously recorded. This makes it possible to provide a convenient reception device. A conventional structure used to record a non-bulk program can also be used as the structure of the device for performing the recording process, and thus it is possible to provide, at low cost, a reception device that allows a bulk program to be viewed and a program having the same material as that of the bulk program to be recorded.

Note that in the eleventh embodiment an example is the case where the user inputs a recording instruction through the remote control 4051 while a bulk program is being broadcast; however, as well as this, the output of the lower-layer program may be simultaneously performed at the start of the bulk program based on the settings of timer-recordings, for example.

Twelfth Embodiment

Next, a twelfth embodiment of the present invention is described with reference to FIGS. 49 and 50. In the tenth embodiment a reception device having two tuners for allowing a bulk program to be viewed is taken as an example. In contrast, in the twelfth embodiment a single-tuner reception device is assumed that is characterized as a lower-cost alternative to the reception device according to the tenth embodiment. That is, the twelfth embodiment attempts to reduce the cost of a reception device with the provision of only one reproduction process system.

A reception device according to the twelfth embodiment has a single-tuner structure as described above, and therefore does not allow a bulk program, which is subjected to bulk transmission that requires two tuners, to be viewed. Therefore, instead of a bulk program, the lower-layer program having the same program material as that of the bulk program is reproduced so that the reception device allows the program material per se to be viewed. Accordingly, the reception device according to the twelfth embodiment performs, in the broadcast period of a bulk program, a process of searching for the channel used for the hierarchical transmission, automatically selecting the channel, and obtaining and reproducing an AV stream of the lower-layer program.

A description is given of an overview of the process performed in the twelfth embodiment, taking as an example the case where ch. 2 is being viewed in the program schedule shown in FIG. 46. First, it is assumed that the news program in a 7:00 p.m. slot is being viewed on ch. 2. Then, at 8:00 p.m. the movie program, which is subjected to bulk transmission, starts. However, the reception device according to the twelfth embodiment has a single-tuner structure, and therefore cannot reproduce the movie program as a bulk program. In response, in the twelfth embodiment the lower-layer program is reproduced. Here, in the present embodiment, since ch. 2 is not used for hierarchical transmission (see FIG. 41), ch. 1, which is used for hierarchical transmission, is selected. Then the movie program is reproduced as the lower-layer program subjected to hierarchical transmission on ch. 1. When the movie program ends at 10:00 p.m., a process is performed of selecting ch. 2, which has been being originally viewed. The above process is performed in the twelfth embodiment.

Figure 49:
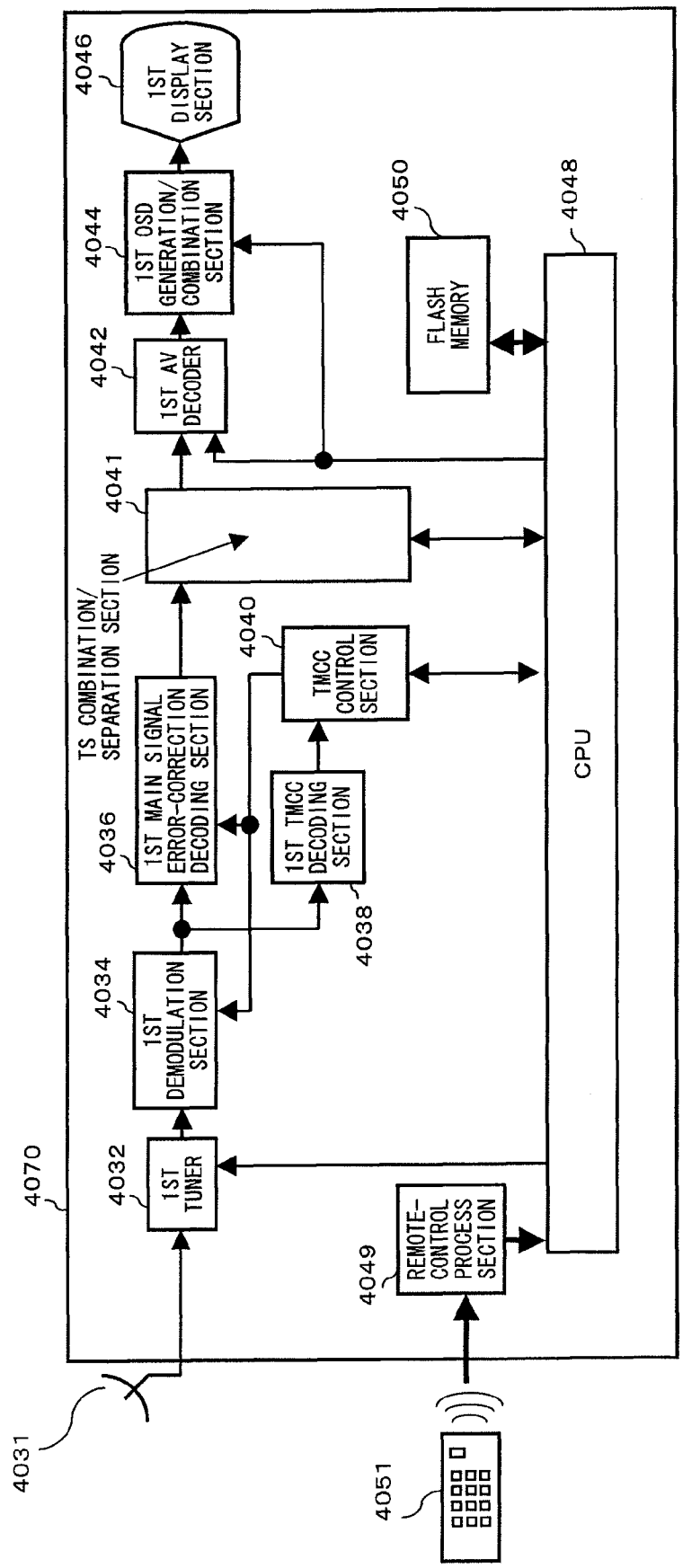
FIG. 49 is a functional block diagram showing the structure of a reception device 4070 according to a twelfth embodiment.
Figure 50:
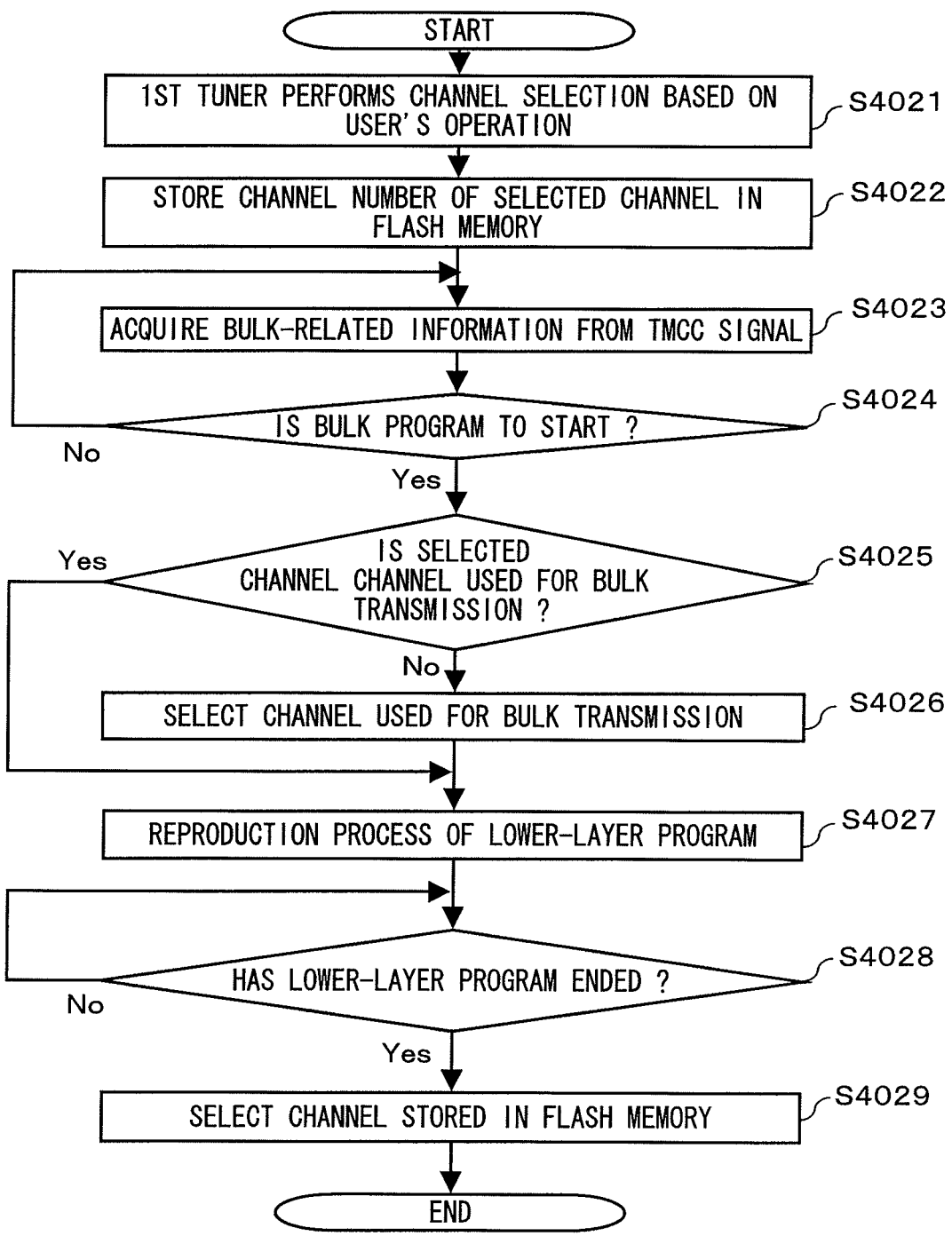
FIG. 50 is a flow chart showing details of a reception/reproduction process according to the twelfth embodiment.

FIG. 49 is a functional block diagram showing the structure of a reception device 4070 according to the twelfth embodiment. The reception device 4070 according to the present embodiment corresponds to the functional structure of the reception device 4030, described above with reference to FIG. 44 in the tenth embodiment, excluding therefrom the reproduction process system of the second tuner 4033 through to the second display section 4047, and the other elements are the same as those of the tenth embodiment. Therefore the same elements will be denoted by the same numerals and will not be described in detail.

Further, referring to FIG. 49, the TS combination/separation section 4041 operates by switching between two process modes as in the tenth embodiment, but, unlike in the tenth embodiment, performs the following operation when operating in the bulk reproduction mode. That is, when a bulk program is broadcast, first, the first tuner 4032, based on a control signal from the CPU 4048, selects the channel used for the hierarchical transmission between the two physical channels used for the bulk transmission. Then the TS combination/separation section 4041 performs a process of separating an AV stream of the lower-layer program from a transport stream obtained from the physical channel used for the hierarchical transmission, and outputting the AV stream to the first AV decoder 4042.

Next, a description is given below of details of a reception/reproduction process performed by the reception device 4070 according to the twelfth embodiment. FIG. 50 is a flow chart showing the details of the reception/reproduction process. Referring to FIG. 50, in step S4021 a channel selection process is performed by the first tuner 4032 based on the user's operation. Here, it is assumed that ch. 2 is selected.

In step S4022 the number of the physical channel selected in step S4021 is temporarily stored in the flash memory 4050.

In step S4023 the bulk-related information is acquired from a TMCC signal. In step S4024 it is determined whether or not the broadcast of a bulk program is to start. Specifically, the CPU 4048 determines, with reference to the connection flag 4132 of the bulk-related information, whether or not a bulk program is to be broadcast on the channel selected by the first tuner 4032.

When it is determined that the broadcast of a bulk program is to start ("Yes" in step S4024), in step S4025 it is determined whether or not the channel that is currently selected is the channel used for the hierarchical transmission. In the present embodiment it is determined whether or not the channel that is currently selected is ch. 1.

Note that as to information indicating which channel is used for the hierarchical transmission in a bulk program, a standard may be set in advance so that, for example, the hierarchical transmission is performed using the physical channel at the lower frequency. Then it may be determined whether or not the physical channel that is selected is, between the two channels forming the bulk program, the physical channel at the lower frequency. Alternatively, the determination may be made based on this information that is included in advance in the bulk-related information.

When it is determined that the physical channel is the channel (ch. 2, in the present embodiment) not used for the hierarchical transmission ("No" in step S4025), in step S4026 a process is performed of selecting the physical channel used for the hierarchical transmission. That is, the first tuner 4032 performs a process of selecting the physical channel indicated by the connection target ch. 4133 of the bulk-related information. On the other hand, when it is determined that the physical channel is the channel (ch. 1, in the present embodiment) used for the hierarchical transmission ("Yes" in step S4025), the process of step S4026 is skipped and the process proceeds to the next step.

In step S4027 the reproduction process of the lower-layer program is started. Specifically, the CPU 4048 outputs to the TS combination/separation section 4041 a control signal for switching the process mode to the bulk reproduction mode. At the same time, the CPU 4048 also outputs to the first AV decoder 4042 a control signal for switching to the decoding process for the lower-layer program. As a result, when the transport stream obtained from the first tuner 4032 is input to the TS combination/separation section 4041, the TS combination/separation section 4041 separates an AV stream of the lower-layer program from the transport stream, and outputs the AV stream to the first AV decoder 4042. Then the resulting video and audio signals obtained from decoding are output from the first AV decoder 4042 to the first display section 4046 through the first OSD generation/combination section 4044. At this time, the first OSD generation/combination section 4044 may display an indication that a bulk program (lower-layer program) has started or the like.

In step S4028 it is determined whether or not the lower-layer program has ended. When it is determined that the lower-layer program is still being broadcast ("No" in step S4028), the determination of step S4028 is repeated until the broadcast of the lower-layer program ends. On the other hand, when the lower-layer program has ended ("Yes" in step S4028), in step S4029 the ch. number stored in the flash memory 4050 is acquired therefrom. In the present embodiment ch. 2 is acquired. Then the first tuner 4032 selects the acquired channel. At the same time, the CPU 4048 outputs to the TS combination/separation section 4041 a control signal for switching the process mode to the non-bulk reproduction mode. As a result, the reproduction process of the non-bulk program that is broadcast on ch. 2 is started. Thus the reception/reproduction process according to the twelfth embodiment ends.

Thus, in the twelfth embodiment even a single-tuner device allows the material per se of a program subjected to bulk transmission to be viewed. In addition, even if the channels are changed so as to view the program, a process is performed of automatically returning the channel to the original physical channel after the program ends. Thus it is possible to provide a digital broadcast reception device having a single-tuner structure that allows a program having the same material as that of a program subjected to bulk transmission to be viewed, and that can further reduce the cost.

Note that the above process of storing the physical channel that has been being viewed when a bulk program starts may also be applied to the reception device having the structure described above in the tenth embodiment. It is assumed that, for example, a program schedule is set as shown in FIG. 51. That is, it is assumed that on ch. 1 and ch. 2: non-bulk programs are broadcast, separately, from 7:00:00 p.m. to 7:59:59 p.m.; a bulk program is broadcast using both channels from 8:00:00 p.m. to 8:59:59 p.m.; and non-bulk programs are broadcast, separately, from 9:00:00 p.m. to 9:59:59 p.m. In addition, on ch. 3, one non-bulk program is broadcast from 7:00:00 p.m. to 9:59:59 p.m.

In this program schedule, consider the case where at 7:30 p.m. the user has selected ch. 1 with the first tuner 4032 and ch. 3 with the second tuner 4033, and picture-in-picture simultaneous display of the corresponding programs is being performed. In this case, at 8:00 p.m. a bulk program is to start on ch. 1. However, the second tuner 4033, which has selected ch. 3, cannot start the reproduction process of the bulk program as it is. Therefore, at 8:00 p.m., in the process of step S4004 of FIG. 47, the first OSD generation/combination section 4044 is caused to display an indication that a bulk program is to start, and is also caused to display an inquiry as to whether or not to stop viewing ch. 3 so as to reproduce the bulk program. As a result, when an instruction to reproduce the bulk program is input, a process is performed of storing in the flash memory 4050 the physical channel number of the physical channel that is selected by the second tuner 4033, and the reproduction process of the bulk program on one screen image is performed. When the bulk program ends at 9:00 p.m., a process may be performed of causing the second tuner 4033 to select the physical channel number of the physical channel stored in the flash memory 4050 and returning to picture-in-picture simultaneous display. That is, picture-in-picture simultaneous display of ch. 1 and ch. 3 may be performed again. This process makes it possible to provide a reception device with improved convenience even in the case of the reception device (a double-tuner device) as shown in the tenth embodiment.

Thirteenth Embodiment

Figure 52:
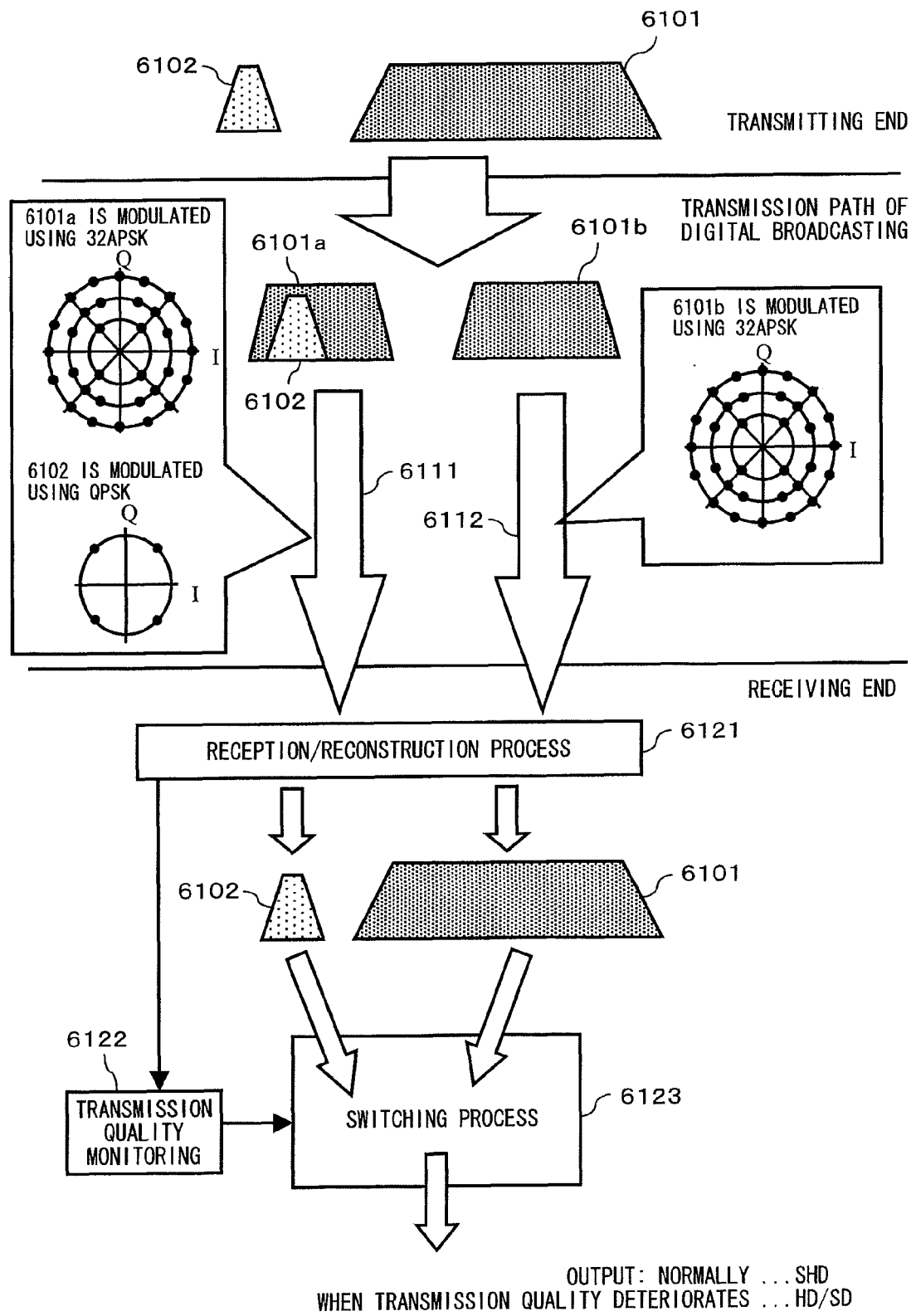
FIG. 52 is a diagram illustrating an overview of the process of a thirteenth embodiment.

First, the principle of the present invention and an overview of the process assumed in the present embodiment are described with reference to FIG. 52. In the present embodiment a digital broadcasting system is assumed in which a so-called Super Hi-Vision moving image content (hereinafter referred to as an "SHD content") is transmitted. Then in the present embodiment, as shown in FIG. 52, an SHD content 6101 is divided into two (SHD contents 6101*a* and 6101*b* of FIG. 52) at the transmitting end and transmitted using two physical channels 6111 and 6112. The reason is that an SHD content has such an amount of information that cannot be completely transmitted on one physical channel. Hereinafter, such transmission of one SHD content using two physical channels will be referred to as "bulk transmission".

Here, in the present embodiment, hierarchical transmission is performed using either one of the two physical channels. Specifically, at the transmitting end a content (hereinafter referred to as an "HD/SD content") having the same material as that of the SHD content is created as a content of so-called HD video (High Definition video) or SD video (Standard Definition video), separately from the SHD content. In the present embodiment, as modulation schemes, the SHD content is modulated using a modulation scheme, e.g., 32-APSK (Amplitude Phase Shift Keying), that is susceptible to disturbance such as noise but has a high transmission efficiency. On the other hand, the HD/SD content is modulated using a modulation scheme, e.g., QPSK (Quadrature Phase Shift Keying), that is more resistant to disturbance such as noise but has a lower transmission efficiency than that of the modulation scheme of the SHD content. Here, since the HD/SD content has a smaller amount of information than that of the SHD content, the HD/SD content can be transmitted using a narrower network bandwidth. That is, the HD/SD content can be sufficiently transmitted even in the transmission capacity of one channel and using a modulation scheme that has a lower transmission efficiency than that of the modulation scheme of the SHD content. Then, in the present embodiment, on either one of the channels, e.g., on the physical channel 6111 in the example of FIG. 52, the SHD content 6101*a* and the HD/SD content 6102 are subjected to hierarchical transmission. That is, the required CNR (Carrier to Noise Ratio) of the modulation scheme used to transmit the HD/SD content 6102 is set lower than that of the modulation scheme used to transmit the SHD content 6101 (e.g., the HD/SD content 6102 is modulated using QPSK, and the SHD content 6101 is modulated using 32-APSK).

On the other hand, at the receiving end, normally, a process of reproducing the SHD content 6101 is performed (which corresponds to a reception/reconstruction process 6121 of FIG. 52). At the same time, the transmission qualities, namely the received CNRs or the bit error rates, are monitored (which corresponds to a transmission quality monitoring 6122 of FIG. 52). Then, when either one of the transmission qualities of the channels has fallen below a predetermined threshold, e.g., either one of the received CNRs has fallen below a received CNR that is necessary for a favorable reproduction of the SHD content, at the receiving end the process is switched from the reproduction of the SHD content to the reproduction of the HD/SD content (which corresponds to a switching process 6123 of FIG. 52). As described above, the required CNR of an HD video content is lower than that of an SHD content. Therefore even when a transmission quality is insufficient to reproduce the SHD content in a favorable condition, it is possible that the transmission quality is sufficient to reproduce the HD/SD content. In response, when either one of the transmission qualities has deteriorated at the reception device end during the reproduction of the SHD content, the reproduction process is switched from that of the SHD content to that of the HD/SD content, whereby it is possible to allow the viewer to continue congruous viewing of the moving image content without causing interruption of video and audio.

Figure 53:
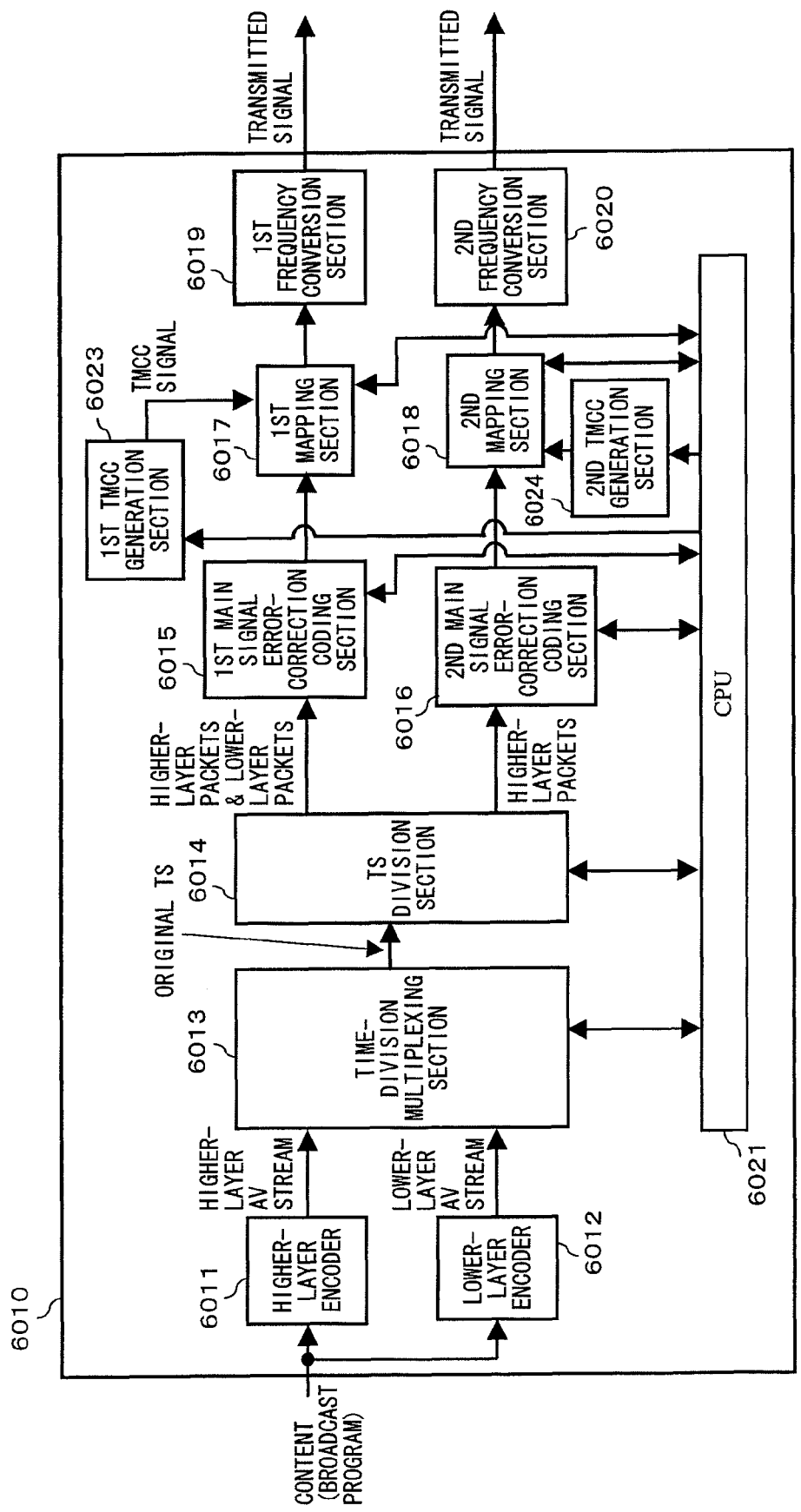
FIG. 53 is a functional block diagram showing the structure of a transmission device according to a thirteenth embodiment of the present invention.

Next, a description is given of the structures of a transmission device and a reception device that are used in the digital broadcasting system according to the present embodiment. FIG. 53 is a functional block diagram showing the structure of the transmission device according to the thirteenth embodiment of the present invention. Referring to FIG. 53, a transmission device 6010 includes a higher-layer encoder 6011, a lower-layer encoder 6012, a time-division multiplexing section 6013, a TS division section 6014, a first main signal error-correction coding section 6015, a second main signal error-correction coding section 6016, a first mapping section 6017, a second mapping section 6018, a first frequency conversion section 6019, a second frequency conversion section 6020, a CPU 6021, a first TMCC generation section 6023, and a second TMCC generation section 6024.

The higher-layer encoder 6011 encodes the video of a moving image content (e.g., a broadcast program) to be broadcast, into SHD video. Specifically, the higher-layer encoder 6011 performs the encoding using, for example, "MPEG-4 AVC/H.264" (hereinafter referred to simply as "H.264") as a compressed/encoded form. Then the higher-layer encoder 6011 outputs to the time-division multiplexing section 6013 the resulting AV stream (hereinafter referred to as a "higher-layer AV stream") obtained from the encoding.

The lower-layer encoder 6012 encodes the video of the moving image content to be broadcast, into HD or SD video. Specifically, the lower-layer encoder 6012 performs the encoding using, for example, H.264 described above or so-called "MPEG-2" as a compressed/encoded form. Then the lower-layer encoder 6012 outputs to the time-division multiplexing section 6013 the resulting AV stream (hereinafter referred to as a "lower-layer AV stream") obtained from the encoding.

The time-division multiplexing section 6013 generates a transport stream (hereinafter referred to as an "original TS") by multiplexing the higher-layer AV stream and the lower-layer AV stream. That is, the time-division multiplexing section 6013 generates an original TS by multiplexing the higher-layer AV stream and the lower-layer AV stream while switching between both AV streams based on a control signal from the CPU 6021. Then the time-division multiplexing section 6013 outputs the generated original TS to the TS division section 6014.

The TS division section 6014 performs a process of dividing (sorting) the original TS into two so that the original TS can be transmitted using two physical channels, and outputting the divided TSs to the first main signal error-correction coding section 6015 and the second main signal error-correction coding section 6016. More specifically, the TS division section 6014 sorts and outputs packets (hereinafter referred to as "higher-layer packets") forming the higher-layer AV stream to the first main signal error-correction coding section 6015 and the second main signal error-correction coding section 6016. On the other hand, the TS division section 6014 outputs packets (hereinafter referred to as "lower-layer packets") forming the lower-layer AV stream to only the first main signal error-correction coding section 6015 without dividing or changing the lower-layer AV stream. The reason is that the lower-layer AV stream is subjected to hierarchical transmission on only one physical channel. As the physical channel used for the hierarchical transmission of the lower-layer packets, a physical channel at a lower frequency is preferable. The reason is that it is considered that the lower the frequency, the more stable the transmission path. In the present embodiment it is assumed that the channel at the lower frequency is assigned to the path (the path passing through the first frequency conversion section 6019) used for hierarchical transmission.

Here, a method of sorting higher-layer packets is described. FIG. 54 is a schematic diagram showing the concept of this sorting method. In the present embodiment a process is performed of alternately sorting the packets (the packets are sequentially numbered in FIG. 54, for ease of description) forming a higher-layer AV stream of an original TS into two physical channels. That is, referring to FIG. 54, odd-numbered packets are sorted into physical channel 1 and even-numbered packets are sorted into physical channel 2. As a result, the odd-numbered packets are transmitted on physical channel 1 and the even-numbered packets are transmitted on physical channel 2. Note that at the reception device end the TSs are received using these two channels, but when the TSs are combined, it is necessary to alternately link (the packets of) the TSs received on the respective channels so as to reconstruct the TS in the original order. Information indicating this order of linking, i.e., information indicating which physical channels have the TS packets to be linked first and next, is included in TMCC information described below and is transmitted.

Referring back to FIG. 53, the first main signal error-correction coding section 6015 performs processes, such as error correction, on the higher-layer packets and the lower-layer packets that are output from the TS division section 6014. FIG. 55 is a block diagram showing details of the first main signal error-correction coding section 6015. The first main signal error-correction coding section 6015 includes an outer code error correction section 6151, an energy dispersal section 6152, an inner code error correction section 6153, and an interleaving section 6154. The outer code error correction section 6151 performs an outer code error correction of each received packet, using a BCH code, for example. The energy dispersal section 6152 performs energy dispersal of the packet output from the outer code error correction section 6151, by adding random data pursuant to a particular rule to the packet. The inner code error correction section 6153 performs an inner code error correction on the packet output from the energy dispersal section 6152, using an LDPC code, for example. The interleaving section 6154 interleaves the data output from the inner code error correction section 6153.

Referring back to FIG. 53, the second main signal error-correction coding section 6016 performs processes, such as error correction, on the higher-layer packets output from the TS division section 6014. The functions of the second main signal error-correction coding section 6016 are the same as those of the first main signal error-correction coding section 6015, and therefore will not be described here.

The first mapping section 6017 maps a bit stream input from the first main signal error-correction coding section 6015 onto the constellation points that are determined based on the phase and amplitude of the carrier, and outputs to the first frequency conversion section 6019 the resulting data obtained from the mapping. Specifically, based on the control of the CPU 6021, the error-correction-coded higher-layer packets are mapped using a modulation scheme (e.g., 32-APSK) that has a high required CNR but has a high transmission efficiency, whereas the error-correction-coded lower-layer packets are mapped using a modulation scheme (e.g., QPSK) that has a lower required CNR but has a lower transmission efficiency than those of the modulation scheme used for the higher-layer packets.

The second mapping section 6018 maps a bit stream input from the second main signal error-correction coding section 6016 onto the constellation points that are determined based on the phase and amplitude of the carrier, and outputs to the second frequency conversion section 6020 the resulting data obtained from the mapping. Specifically, since only the error-correction-coded higher-layer packets are input to the second mapping section 6018, the error-correction-coded higher-layer packets are, based on the control of the CPU 6021, mapped using the same modulation scheme (e.g., 32-APSK) as the modulation scheme used for the higher-layer packets in the first mapping section 6017.

The first TMCC generation section 6023 and the second TMCC generation section 6024 each generate, as a TMCC signal, TMCC information that is necessary to control a receiver, such as information (information about a modulation scheme per time interval) about hierarchical transmission, control information about bulk transmission, and transmission parameters. Specifically, based on the control of the CPU 6021, the first TMCC generation section 6023 generates a TMCC signal corresponding to a modulated signal to be output from the first frequency conversion section 6019, and outputs the generated TMCC signal to the first mapping section 6017. On the other hand, the second TMCC generation section 6024 generates a TMCC signal corresponding to a modulated signal to be output from the second frequency conversion section 6020, and outputs the generated TMCC signal to the second mapping section 6018. The TMCC signal generated by the first TMCC generation section 6023 is mapped, by the first mapping section 6017, onto the constellation points determined based on the phase and amplitude of the carrier as described above, is multiplexed with AV data (a main signal) also mapped by the first mapping section 6017, and is output to the first frequency conversion section 6019. On the other hand, the TMCC signal generated by the second TMCC generation section 6024 is mapped, by the second mapping section 6018, onto the constellation points determined based on the phase and amplitude of the carrier as described above, is multiplexed with AV data (a main signal) also mapped by the second mapping section 6018, and is output to the second frequency conversion section 6020.

Note that in order that the TMCC signals can be received with certainty and the receiver can be controlled by the received TMCC signals even if it is necessary to display a program based on lower-layer packets when the reception deteriorates due to disturbance, in the first mapping section 6017 and the second mapping section 6018 the TMCC signals are mapped using a modulation scheme (e.g., QPSK or BPSK) that is as resistant, or more resistant, to disturbance than the modulation scheme used for the lower-layer packets. The modulated signal having multiplexed the main signal and the TMCC signal that are mapped by the first mapping section 6017 is frequency-converted to a predetermined frequency by the first frequency conversion section 6019, and is output therefrom as a transmitted signal. The modulated signal having multiplexed the main signal and the TMCC signal that are mapped by the second mapping section 6018 is also frequency-converted to a predetermined frequency by the second frequency conversion section 6020, and is output therefrom as a transmitted signal.

Here, the TMCC information is described. The TMCC information includes, as well as general transmission control information, hierarchical transmission information, which is information about a modulation scheme per time interval as described above, and bulk-transmission-related information, which is information about bulk transmission, so that the receiver can be controlled. FIG. 56 is a diagram showing an example of the bulk-transmission-related information. The bulk-transmission-related information includes sets of a physical ch. number 6131, a connection flag 6132, an anterior connection ch. 6133, and a posterior connection ch. 6134. The bulk-transmission-related information includes information about all the physical channels, and the physical ch. number 6131 represents the number of each physical channel. The connection flag 6132 is a flag for identifying whether or not the content that is broadcast (transmitted) is a content using bulk transmission. When set to "On", the connection flag 6132 indicates that the moving image content that is transmitted on the physical channel is a moving image content using bulk transmission, i.e., indicates that one moving image content is transmitted using two physical channels. When set to "Off", the connection flag 6132 indicates that one moving image content is transmitted using only the physical channel without using bulk transmission.

The anterior connection ch. 6133 and the posterior connection ch. 6134 are data for indicating the physical channel numbers of the physical channels forming a pair in bulk transmission. The anterior connection ch. 6133 and the posterior connection ch. 6134 are set only when the connection flag 6132 is set to "On", and only either one of the anterior connection ch. 6133 and the posterior connection ch. 6134 has the value set therein. When, as described above, it is necessary to combine transport streams obtained from two physical channels at the receiver end, the anterior connection ch. 6133 and the posterior connection ch. 6134 are information used to indicate which physical channels have the packets to be linked first and next. Referring to the example of FIG. 54, physical channel 1, into which the odd-numbered packets are sorted, is the anterior connection ch., and physical channel 2, into which the even-numbered packets are sorted, is the posterior connection ch. Accordingly, in the example of FIG. 56, it is possible to perform the following determination process at the receiver end. That is, when physical channel 1 is selected at the receiver end and the bulk-transmission-related information shown in FIG. 56 is acquired, first, it is possible to determine that the content to be transmitted on physical channel 1 is a content using bulk transmission, i.e., an SHD content. Then it is possible to determine that physical channel 2 is present as the posterior connection ch. of physical channel 1. Further, it is possible to determine that the TS packets received on physical channel 1 and physical channel 2 are to be combined in the order from ch. 1 to ch. 2 to ch. 1 to ch. 2 . . . .

Referring back to FIG. 53, the CPU 6021 performs various controls for causing the time-division multiplexing section 6013, the TS division section 6014, the first main signal error-correction coding section 6015, the second main signal error-correction coding section 6016, the first mapping section 6017, and the second mapping section 6018 to perform the process described above.

Figure 57:
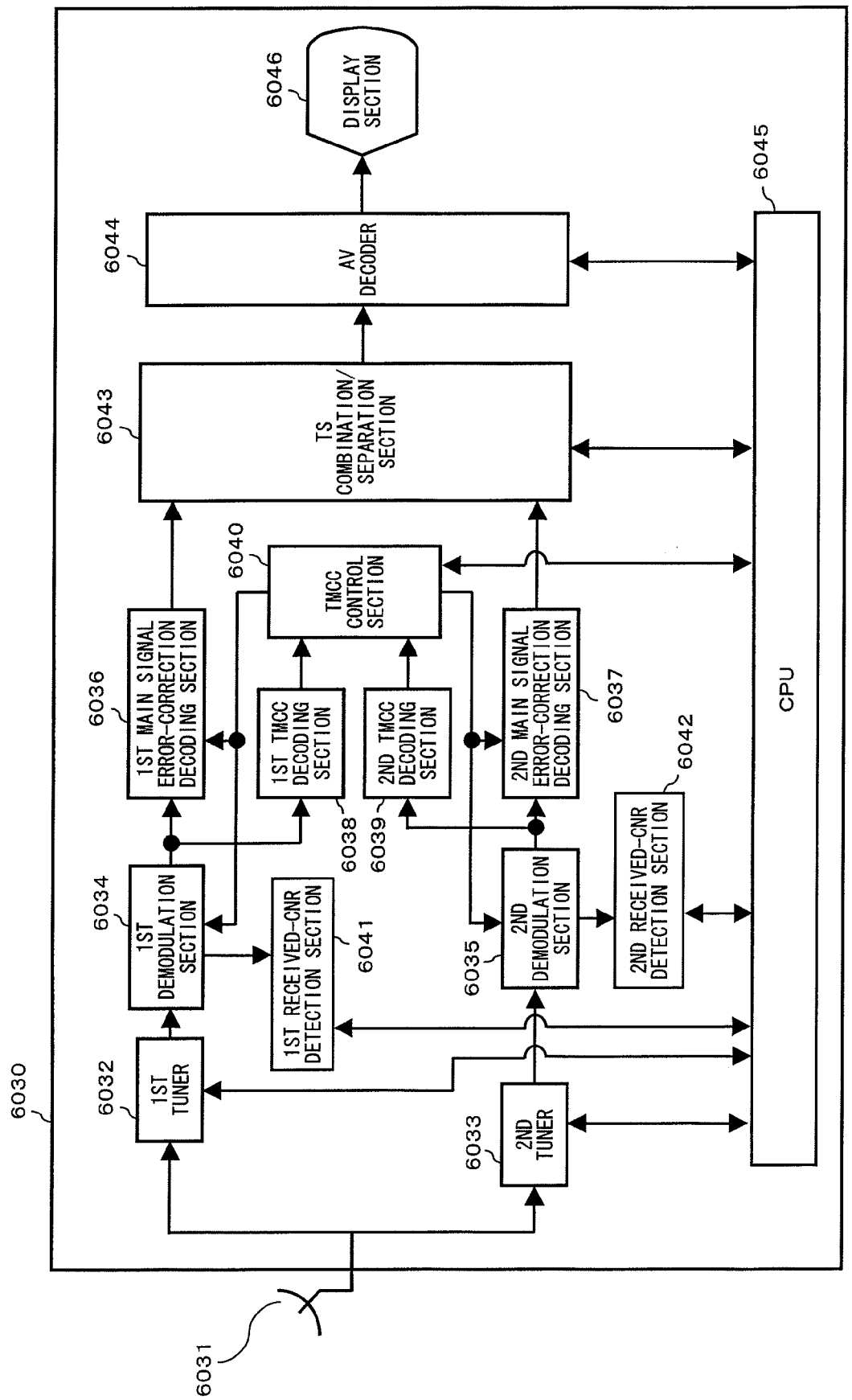
FIG. 57 is a functional block diagram showing the structure of a reception device 6030 according to a thirteenth embodiment of the present invention.

Next, a description is given of the reception device (typically, a television receiver capable of receiving digital broadcasting) used for the digital broadcasting system according to the present embodiment. FIG. 57 is a functional block diagram showing the structure of a reception device 6030 according to the thirteenth embodiment of the present invention. Referring to FIG. 57, the reception device 6030 includes an antenna 6031, a first tuner 6032, a second tuner 6033, a first demodulation section 6034, a second demodulation section 6035, a first main signal error-correction decoding section 6036, a second main signal error-correction decoding section 6037, a first TMCC decoding section 6038, a second TMCC decoding section 6039, a TMCC control section 6040, a first received-CNR detection section 6041, a second received-CNR detection section 6042, a TS combination/separation section 6043, an AV decoder 6044, a CPU 6045, and a display section 6046.

The first tuner 6032 and the second tuner 6033 select predetermined physical channels based on control signals from the CPU 6045, and receive transmitted signals from the transmission device 6010 through the antenna 6031, respectively.

The first demodulation section 6034 demodulates the transmitted signal output from the first tuner 6032 into digital signals, and outputs the digital signals to the first main signal error-correction decoding section 6036 and the first TMCC decoding section 6038.

Figure 58:
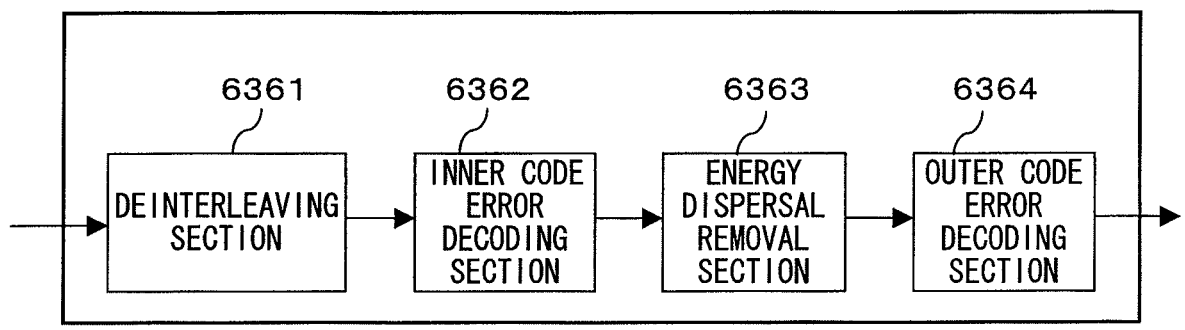
FIG. 58 is a block diagram showing details of a first main signal error-correction decoding section 6036.

The first main signal error-correction decoding section 6036 performs, on the digital signal output from the first demodulation section 6034, the opposite process to that performed by the first main signal error-correction coding section 6015, and thereby obtains a transport stream. Then the first main signal error-correction decoding section 6036 outputs the transport stream to the TS combination/separation section 6043. FIG. 58 is a block diagram showing details of the first main signal error-correction decoding section 6036. Referring to FIG. 58, in the first main signal error-correction decoding section 6036: a deinterleaving section 6361 deinterleaves the digital signal output from the first demodulation section 6034; an inner code error-correction decoding section 6362 decodes an inner code of the digital signal; an energy dispersal removal section 6363 performs energy dispersal removal of the digital signal; and an outer code error-correction decoding section 6364 decodes an outer code of the digital signal. Then the resulting digital signal is output as a transport stream.

The first TMCC decoding section 6038 decodes the digital signal (TMCC signal) output from the first demodulation section 6034, and thereby acquires TMCC information from the decoded digital signal. Then the first TMCC decoding section 6038 outputs the TMCC information to the TMCC control section 6040.

The first received-CNR detection section 6041 calculates a received CNR per predetermined unit of time based on the demodulation result of the first demodulation section 6034, and outputs the calculated received CNR to the CPU 6045.

The second demodulation section 6035, the second main signal error-correction decoding section 6037, and the second TMCC decoding section 6039 perform, on the transmitted signal output from the second tuner 6033, similar processes to those performed by the first demodulation section 6034, the first main signal error-correction decoding section 6036, and the first TMCC decoding section 6038, respectively.

The second received-CNR detection section 6042 calculates a received CNR per predetermined unit of time based on the demodulation result of the second demodulation section 6035, and outputs the calculated received CNR to the CPU 6045.

The TMCC control section 6040 controls the first demodulation section 6034 and the first main signal error-correction decoding section 6036 based on, of the TMCC information output from the first TMCC decoding section 6038, transmission parameters such as hierarchical transmission information, which is information about a modulation scheme per time interval. The TMCC control section 6040 also controls the second demodulation section 6035 and the second main signal error-correction decoding section 6037 based on, of the TMCC information output from the second TMCC decoding section 6039, transmission parameters such as hierarchical transmission information, which is information about a modulation scheme per time interval. The TMCC control section 6040 also outputs the acquired TMCC information to the CPU 6045.

The TS combination/separation section 6043 performs the following process based on a control signal from the CPU 6045. First, the TS combination/separation section 6043 combines the transport streams output from the first main signal error-correction decoding section 6036 and the second main signal error-correction decoding section 6037, and thereby reconstructs the original TS. The TS combination/separation section 6043 also separates and obtains a higher-layer AV stream and a lower-layer AV stream from the original TS. Then the TS combination/separation section 6043 outputs the higher-layer AV stream or the lower-layer AV stream to the AV decoder 6044, based on a control signal from the CPU 6045.

Based on a control signal from the CPU 6045, the AV decoder 6044 decodes the AV stream output from the TS combination/separation section 6043, and thereby obtains video and audio signals. The AV decoder 6044 outputs to the display section 6046 the resulting video and audio signals obtained from the decoding. Here, the AV decoder 6044 is capable of performing a decoding process at least in decoded forms corresponding to the encoded forms of a higher-layer AV stream and a lower-layer AV stream. For example, a higher-layer AV stream can be decoded in H.264 and a lower-layer AV stream can be decoded in MPEG-2. Based on a control signal from the CPU 6045, the AV decoder 6044 performs the decoding process by switching between these decoded forms.

The CPU 6045 performs a process of allowing the user to view the moving image content transmitted from the transmission device 6010, by controlling the first tuner 6032, the second tuner 6033, the first received-CNR detection section 6041, the second received-CNR detection section 6042, the TS combination/separation section 6043, the AV decoder 6044, and the like while performing the process of the flow chart described below with reference to FIG. 59 and the like. Further, based on the inputs from the first received-CNR detection section 6041 and the second received-CNR detection section 6042, the CPU 6045 controls the switching of the output from the TS combination/separation section 6043 to the AV decoder 6044, and also controls the switching of the decoding process of the AV decoder 6044.

The display section 6046 presents video and audio to the user based on the video and audio signals output from the AV decoder 6044.

Although not shown in the figures, the reception device is provided with an operation section for the user to perform a channel selection operation and the like so that the CPU 6045 performs the controls of a channel selection process and the like based on an operation signal from the operation section.

Details of a reception/reproduction process performed by the reception device 6030 is described below with reference to FIGS. 59 and 60. FIGS. 59 and 60 are a flow chart showing the flow of the reception/reproduction process performed by the reception device 6030.

In step S6001 a channel selection process based on the user's channel selection operation is performed. More specifically, the CPU 6045 obtains an instruction signal from the operation section, such as a remote control, and detects the physical channel to be selected. Then the CPU 6045 outputs to the first tuner 6032 a control signal for causing the first tuner 6032 to select the detected physical channel. In response to this, the first tuner 6032 performs a process of selecting the specified physical channel. When the channel selection is completed, the signal (hereinafter referred to as a "received signal") received through the antenna 6031 is input from the first tuner 6032 to the first demodulation section 6034. Then a TMCC signal is separated from the received signal, and is output to the first TMCC decoding section 6038. The TMCC information is acquired from the TMCC signal decoded by the first TMCC decoding section 6038, and is output to the TMCC control section 6040. The TMCC control section 6040 acquires the hierarchical transmission information, the transmission parameters, and the bulk-transmission-related information (see FIG. 56) from the TMCC information. The TMCC control section 6040 outputs to the first demodulation section 6034 a control signal for causing the first demodulation section 6034 to perform a demodulation process based on the hierarchical transmission information and the transmission parameters. In response to this, the first demodulation section 6034 starts demodulation to obtain a main signal (a signal including data about the content) included in the received signal. The demodulated main signal is output to the first main signal error-correction decoding section 6036. A transport stream is obtained from error correction performed by the first main signal error-correction decoding section 6036. Then the obtained transport stream is output to the TS combination/separation section 6043.

In step S6002 the connection flag 6132 is read from the bulk-transmission-related information. In step S6003 it is determined whether or not the connection flag 6132 regarding the selected physical channel is set to "On". When it is determined that the connection flag 6132 is not set to "On" ("No" in step S6003), the process is repeated, returning to step S6002 (Note that in this case, it is considered that the program is broadcast on a single channel, and therefore a process may be performed of reproducing the moving image content based on the transport stream on the physical channel selected in step S6001 until it is determined that the connection flag 6132 is set to "On").

On the other hand, when it is determined that the connection flag 6132 is set to "On" ("Yes" in step S6003), in step S6004 the second tuner 6033 performs a channel selection process for the counterpart physical channel in the bulk transmission. Specifically, the CPU 6045 acquires the anterior connection ch. 6133 and the posterior connection ch. 6134 from the bulk-transmission-related information. Then the CPU 6045 acquires the physical channel number indicated by either one of the anterior connection ch. 6133 and the posterior connection ch. 6134, since, as described above, only either one indicates the physical channel number. Referring to the example of FIG. 56, when physical channel 1 is selected by the first tuner 6032, physical channel 2 is acquired. Alternatively, when physical channel 2 is selected by the first tuner 6032, physical channel 1 is acquired. The CPU 6045 outputs to the second tuner 6033 a control signal for causing the second tuner 6033 to select the acquired physical channel. The second tuner 6033 performs the channel selection process in accordance with the control signal.

When the channel selection performed by the second tuner is completed, a TMCC signal is separated from the received signal received through the antenna 6031, and is output to the second TMCC decoding section 6039. The TMCC information is acquired from the TMCC signal decoded by the second TMCC decoding section 6039, and is output to the TMCC control section 6040. The TMCC control section 6040 acquires the transmission parameters and the like from the TMCC information. The TMCC control section 6040 outputs to the second demodulation section 6035 a control signal for causing the second demodulation section 6035 to perform a demodulation process based on the transmission parameters. In response to this, the second demodulation section 6035 starts demodulation to obtain a main signal. The demodulated main signal is output to the second main signal error-correction decoding section 6037. A transport stream is obtained from error correction performed by the second main signal error-correction decoding section 6037. Then the obtained transport stream is output to the TS combination/separation section 6043. Consequently, the transport stream obtained through the first tuner 6032 and the transport stream obtained through the second tuner 6033 are input to the TS combination/separation section 6043.

In step S6005 a process of combining both transport streams is started. Specifically, the CPU 6045 outputs to the TS combination/separation section 6043 a control signal for causing the TS combination/separation section 6043 to start the process of combining both transport streams. The control signal also includes information about the order of combining transport streams based on the anterior connection ch. 6133 and the posterior connection ch. 6134. In accordance with the control signal from the CPU 6045, the TS combination/separation section 6043 performs the process of combining the transport stream obtained through the first tuner 6032 and the transport stream obtained through the second tuner 6033, and starts a process of reconstructing the original TS.

In step S6006 a process of separating a higher-layer AV stream and a lower-layer AV stream from the original TS is started.

In step S6007 a process of decoding the higher-layer AV stream is started. That is, the CPU 6045 outputs to the TS combination/separation section 6043 a control signal for causing the TS combination/separation section 6043 to output the higher-layer AV stream to the AV decoder 6044. In accordance with the control signal, the TS combination/separation section 6043 outputs the higher-layer AV stream to the AV decoder 6044. The CPU 6045 also outputs to the AV decoder 6044 a control signal for causing the AV decoder 6044 to start the process of decoding the higher-layer AV stream. In accordance with the control signal, the AV decoder 6044 starts the process of decoding the higher-layer AV stream input from the TS combination/separation section 6043, and outputs to the display section 6046 the resulting video and audio signals obtained from the decoding.

In step S6008 a process is performed of starting to obtain the received CNRs. More specifically, the CPU 6045 outputs to the first received-CNR detection section 6041 a control signal for requesting the received CNR obtained in the first demodulation section 6034. In accordance with the control signal, the first received-CNR detection section 6041 starts a process of outputting to the CPU 6045 the received CNR obtained in the first demodulation section 6034. The CPU 6045 also outputs to the second received-CNR detection section 6042 a control signal for requesting the received CNR obtained in the second demodulation section 6035. In accordance with the control signal, the second received-CNR detection section 6042 starts a process of outputting to the CPU 6045 the received CNR obtained in the second demodulation section 6035.

In step S6009 it is determined whether or not either one of the values of the received CNRs output from the first received-CNR detection section 6041 and the second received-CNR detection section 6042 is smaller than a predetermined threshold. The predetermined threshold indicates a required CNR in the higher-layer modulation scheme that is considered necessary for a favorable reproduction of an SHD content. When either one of the received CNRs is smaller than the predetermined threshold, i.e., when it is considered that either one of the transmission qualities has deteriorated ("Yes" in step S6009), in step S6010 it is determined whether or not the process of decoding the higher-layer AV stream or the process of performing output to the display section is currently being performed.

When it is determined that the process of decoding the higher-layer AV stream or the like is being performed ("Yes" in step S6010), in step S6011 a process of outputting the lower-layer AV stream to the AV decoder 6044 is performed. Specifically, the CPU 6045 outputs to the TS combination/separation section 6043 a control signal for causing the TS combination/separation section 6043 to output the lower-layer AV stream to the AV decoder 6044. In accordance with the control signal, the TS combination/separation section 6043 outputs the lower-layer AV stream to the AV decoder 6044.

In step S6012 an instruction to perform a process of decoding the lower-layer AV stream and the like is given. Specifically, the CPU 6045 outputs to the AV decoder 6044 a control signal for causing the AV decoder 6044 to start the process of decoding the lower-layer AV stream. In accordance with the control signal, the AV decoder 6044 starts the process of decoding the lower-layer AV stream input from the TS combination/separation section 6043, and outputs to the display section 6046 the resulting video and audio signals obtained from the decoding.

On the other hand, when it is determined that the process of decoding the higher-layer AV stream or the like is not being performed ("No" in step S6010), it is considered that the process on the lower-layer AV stream is being already performed, and thus the process proceeds to step S6016 described below.

On the other hand, when it is determined that both received CNRs are equal to or greater than the predetermined threshold, i.e., when it is considered that both transmission qualities are sufficient to reproduce the higher-layer AV stream ("No" in step S6009), in step S6013 it is determined whether or not the process of decoding the lower-layer AV stream or the process of performing output to the display section is currently being performed. When it is determined that the process of decoding the lower-layer AV stream or the like is being performed ("Yes" in step S6013), it is considered that the transmission quality, having once deteriorated, has subsequently returned to a favorable condition. Accordingly, in step S6014 the process of outputting the higher-layer AV stream to the AV decoder 6044 is performed. Specifically, the CPU 6045 outputs to the TS combination/separation section 6043 a control signal for causing the TS combination/separation section 6043 to output the higher-layer AV stream to the AV decoder 6044. In accordance with the control signal, the TS combination/separation section 6043 outputs the higher-layer AV stream to the AV decoder 6044.

In step S6015 an instruction to perform the process of decoding the higher-layer AV stream and the like is given. Specifically, the CPU 6045 outputs to the AV decoder 6044 a control signal for causing the AV decoder 6044 to start the process of decoding the higher-layer AV stream. In accordance with the control signal, the AV decoder 6044 starts the process of decoding the higher-layer AV stream input from the TS combination/separation section 6043, and outputs to the display section 6046 the resulting video and audio signals obtained from the decoding.

On the other hand, when it is determined that the process of decoding the lower-layer AV stream or the like is not being performed ("No" in step S6013), it is considered that the process on the higher-layer AV stream is being already performed, and thus the process proceeds to step S6016 described below.

In step S6016 it is determined whether or not an instruction to end the process has been given, e.g., an operation of turning off the power has been performed. When an instruction to end the process has not been given ("No" in step S6016), the process is repeated, returning to step S6008. On the other hand, when an instruction to end the process has been given ("Yes" in step S6016), the reception/reproduction process according to the present embodiment ends.

As described above, in the present embodiment, when an SHD content is subjected to bulk transmission, the HD/SD content having the same material as that of the SHD content is subjected to hierarchical transmission on either one of the physical channels. At the receiver end the received CNRs of the physical channels used for the bulk transmission are monitored when the SHD content is reproduced. When either one of the received CNRs has fallen below a required CNR for the production of the SHD content, a process is performed of switching the reproduction of the SHD content, which is subjected to higher-layer modulation, to the reproduction of the HD/SD content, which is subjected to lower-layer modulation. In addition, as described above, the HD/SD content and the SHD content are different only in encoded form and are the same in material. Therefore, even when either one of the transmission quality has deteriorated during the reproduction of the SHD content, which requires high transmission qualities, the reproduction is switched to that of the HD/SD content, which enables favorable viewing even with lower transmission qualities, whereby it is possible to continue viewing the content without causing interruption or disruption of video and audio.

Further, even a reception device provided with only one tuner may be caused to select the physical channel used for the hierarchical transmission of the HD/SD content and to decode the lower-layer AV stream, and thereby allows the content having the same material as that of the SHD content to be viewed.

Figure 61:
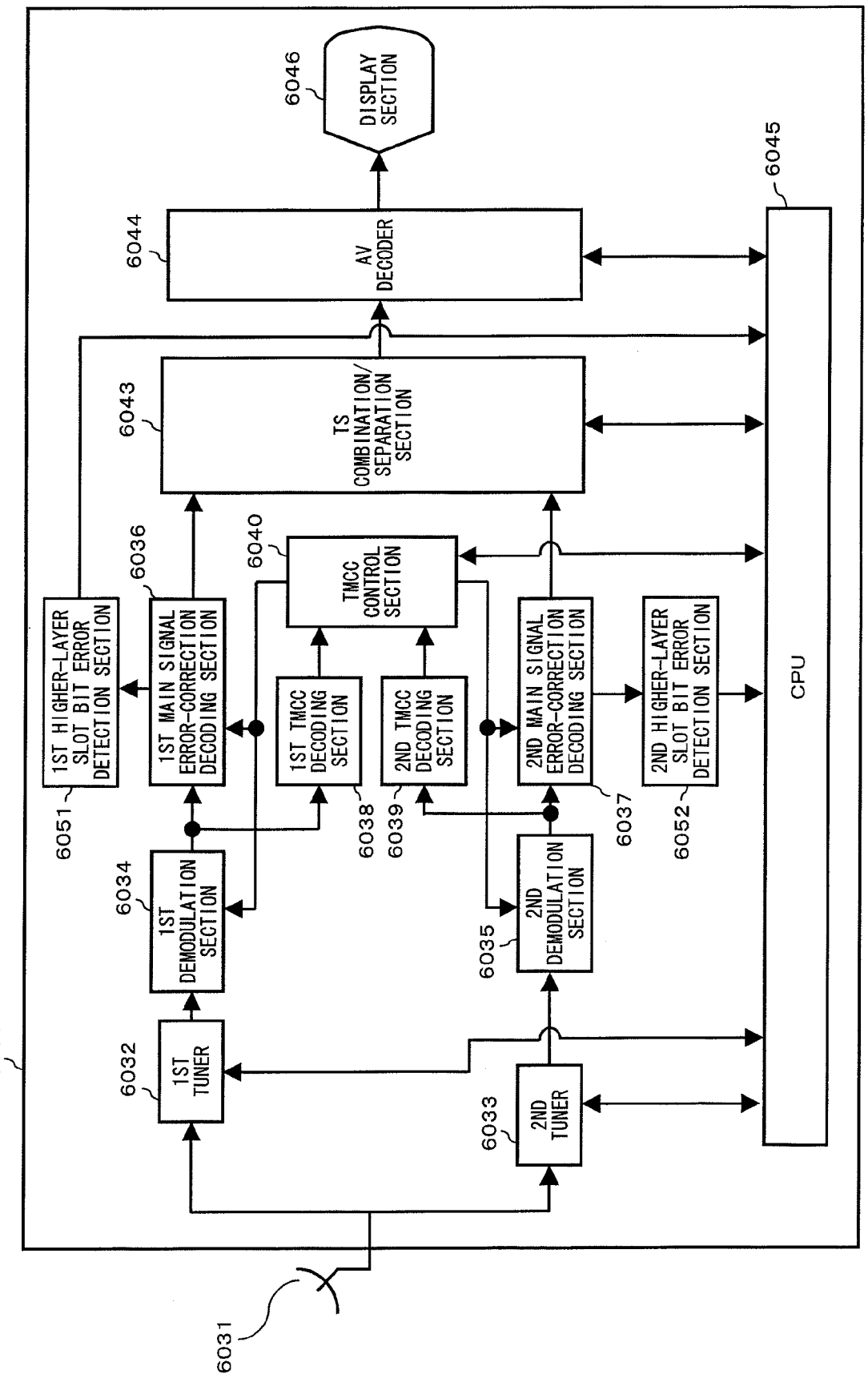
FIG. 61 is a block diagram showing the structure of a reception device 6050 in the case where the transmission qualities are monitored based on bit error rates.

Note that in the above embodiment the received CNRs are used to monitor the transmission qualities; however, as well as this, for example, the bit error rates may be used to monitor the transmission qualities. FIG. 61 is a block diagram showing the structure of a reception device 6050 in the case where the transmission qualities are monitored based on the bit error rates. The structure of the reception device 6050 shown in FIG. 61 is similar to that of the reception device 6030. That is, the structure of the reception device 6050 includes a first higher-layer slot bit error detection section 6051 and a second higher-layer slot bit error detection section 6052, instead of the first received-CNR detection section 6041 and the second received-CNR detection section 6042 of FIG. 57, respectively. Therefore, in FIG. 61, the same elements as those of FIG. 57 will be denoted by the same numerals and will only be briefly described.

The first higher-layer slot bit error detection section 6051 is connected to the first main signal error-correction decoding section 6036 and the CPU 6045. The second higher-layer slot bit error detection section 6052 is connected to the second main signal error-correction decoding section 6037 and the CPU 6045.

The first higher-layer slot bit error detection section 6051 acquires information indicating the result of error correction performed by the first main signal error-correction decoding section 6036, and calculates the bit error rate of higher-layer packets from the acquired information. Similarly, the second higher-layer slot bit error detection section 6052 calculates the bit error rate of higher-layer packets in the second main signal error-correction decoding section 6037. The first higher-layer slot bit error detection section 6051 and the second higher-layer slot bit error detection section 6052 output the respective calculated bit error rates to the CPU 6045.

With the structure described above, the reception device 6050 performs the following process. That is, basically, the process is performed in accordance with the flow chart shown in FIGS. 59 and 60. In the process of step S6008 of FIG. 60, however, instead of the acquisition of the received CNRs, the CPU 6045 outputs to the first higher-layer slot bit error detection section 6051 a control signal for requesting the output of the bit error rate described above. In accordance with the control signal, the first higher-layer slot bit error detection section 6051 starts calculating the bit error rate and outputting the calculated bit error rate to the CPU 6045. The CPU 6045 also outputs a similar control signal to the second higher-layer slot bit error detection section 6052. In accordance with the control signal, the second higher-layer slot bit error detection section 6052 starts calculating the bit error rate and outputting the calculated bit error rate to the CPU 6045.

Further, in step S6009 of FIG. 60 it is determined, instead of whether or not either one of the received CNRs is smaller than the threshold, whether or not either one of the values of the bit error rates output from the first higher-layer slot bit error detection section 6051 and the second higher-layer slot bit error detection section 6052 has exceeded a predetermined threshold. The predetermined threshold may be a bit error rate in the higher-layer modulation scheme that is accepted for a favorable reproduction of an SHD content. When either one of the bit error rates has exceeded the predetermined threshold ("Yes" in step S6009), the process of step S6010 and thereafter may be performed on the assumption that either one of the transmission qualities has deteriorated.

Thus the bit error rates of higher-layer packets (i.e., data forming an SHD content) are monitored, whereby it is also possible to obtain a similar effect to that of the above embodiment.

Fourteenth Embodiment

Figure 62:
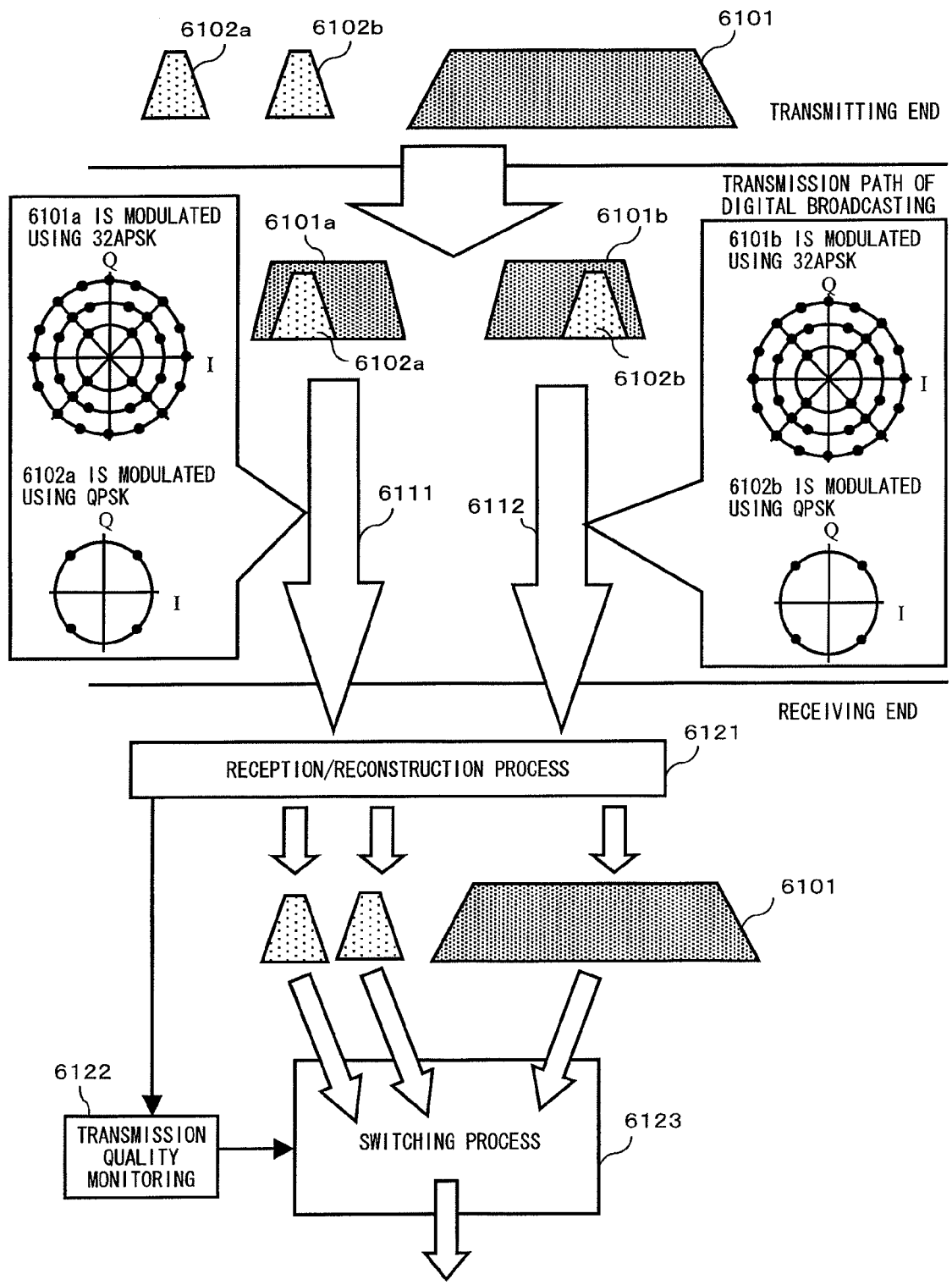
FIG. 62 is a diagram illustrating an overview of the process of a fourteenth embodiment.

Next, a fourteenth embodiment of the present invention is described with reference to FIGS. 62 and 63. In the thirteenth embodiment, an SHD content and an HD/SD content are subjected to hierarchical transmission on only either one of the physical channels. In contrast, in the fourteenth embodiment, hierarchical transmission is performed using each of the physical channels. Specifically, as shown in FIG. 62, two HD/SD contents 6102 are created at the transmitting end and are subjected to hierarchical transmission on the respective channels. Then, as in the thirteenth embodiment, an SHD content is switched to an HD/SD content at the receiving end when either one of the transmission qualities has deteriorated. At this time, between the two channels, the HD/SD content on the channel of the higher transmission quality is reproduced.

Figure 63:
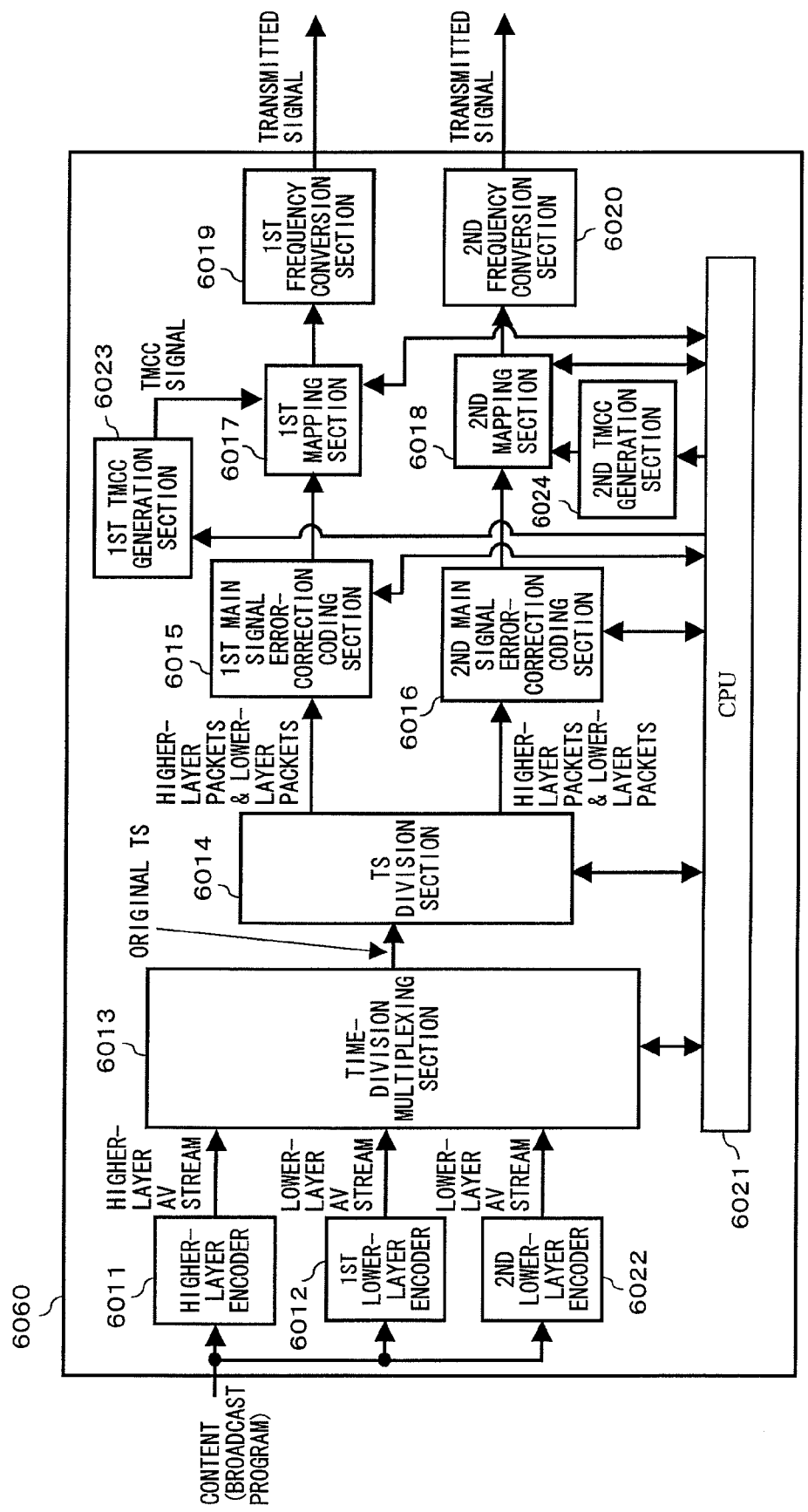
FIG. 63 is a functional block diagram showing the structure of a transmission device 6060 according to the fourteenth embodiment.

FIG. 63 is a functional block diagram showing the structure of a transmission device 6060 according to the fourteenth embodiment of the present invention. The structure of the transmission device 6060 according to the present embodiment corresponds to the functional structure of the transmission device 6010, described above with reference to FIG. 53 in the thirteenth embodiment, having added thereto a second lower-layer encoder 6022, and the other elements are the same as those of the thirteenth embodiment. Note that in FIG. 63 the lower-layer encoder 6012 of FIG. 53 is referred to as a first lower-layer encoder 6012. Therefore, the elements other than the second lower-layer encoder 6022 will be denoted by the same numerals and will not be described in detail.

Referring to FIG. 63, the second lower-layer encoder 6022 has similar functions to those of the first lower-layer encoder 6012. The time-division multiplexing section 6013 generates an original TS by multiplexing the higher-layer AV stream, the lower-layer AV stream output from the first lower-layer encoder 6012, and the lower-layer AV stream output from the second lower-layer encoder 6022. In other words, the original TS of the fourteenth embodiment includes one higher-layer AV stream and two lower-layer AV streams having the same material as that of the higher-layer AV stream.

The TS division section 6014 sorts the higher-layer AV stream of the input original TS, and outputs the sorted higher-layer AV streams to the first main signal error-correction coding section 6015 and the second main signal error-correction coding section 6016. On the other hand, the TS division section 6014 outputs to the first main signal error-correction coding section 6015 the lower-layer AV stream output from the first lower-layer encoder 6012, and outputs to the second main signal error-correction coding section 6016 the lower-layer AV stream output from the second lower-layer encoder 6022.

With the structure described above, the transmission device according to the fourteenth embodiment transmits a moving image content. As a result, an HD/SD content is subjected to hierarchical transmission on each channel used for bulk transmission.

Next, a reception device according to the fourteenth embodiment is described. A functional block diagram of the reception device according to the fourteenth embodiment is similar to that of the thirteenth embodiment (see FIG. 57). The reception device basically performs a process similar to that described above with reference to FIGS. 59 and 60 in the thirteenth embodiment, but the process is partially different from that of the thirteenth embodiment in the following respects.

Figure 59:
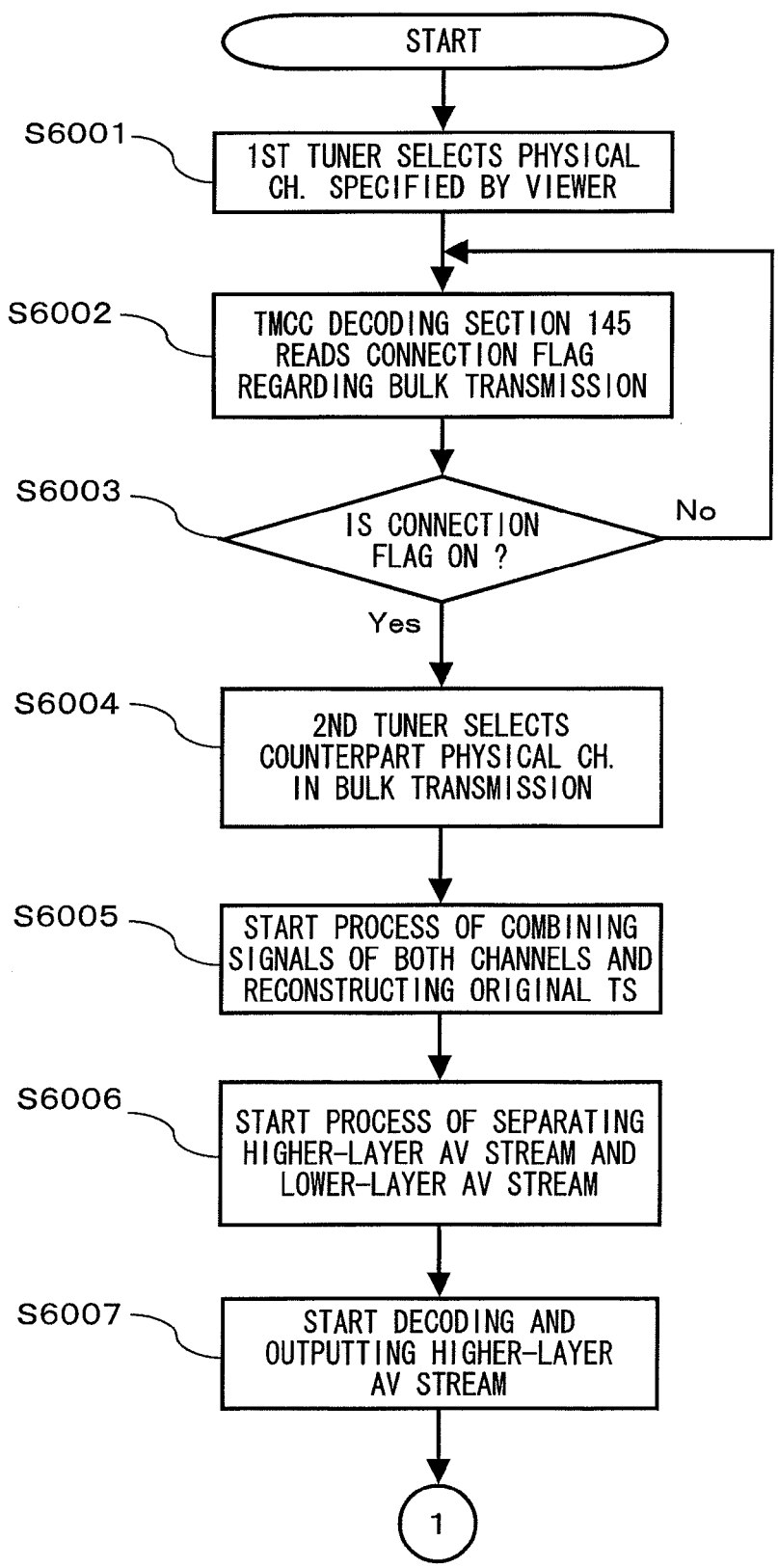
FIG. 59 is a flow chart showing a reception/reproduction process according to the thirteenth embodiment of the present invention.
Figure 60:
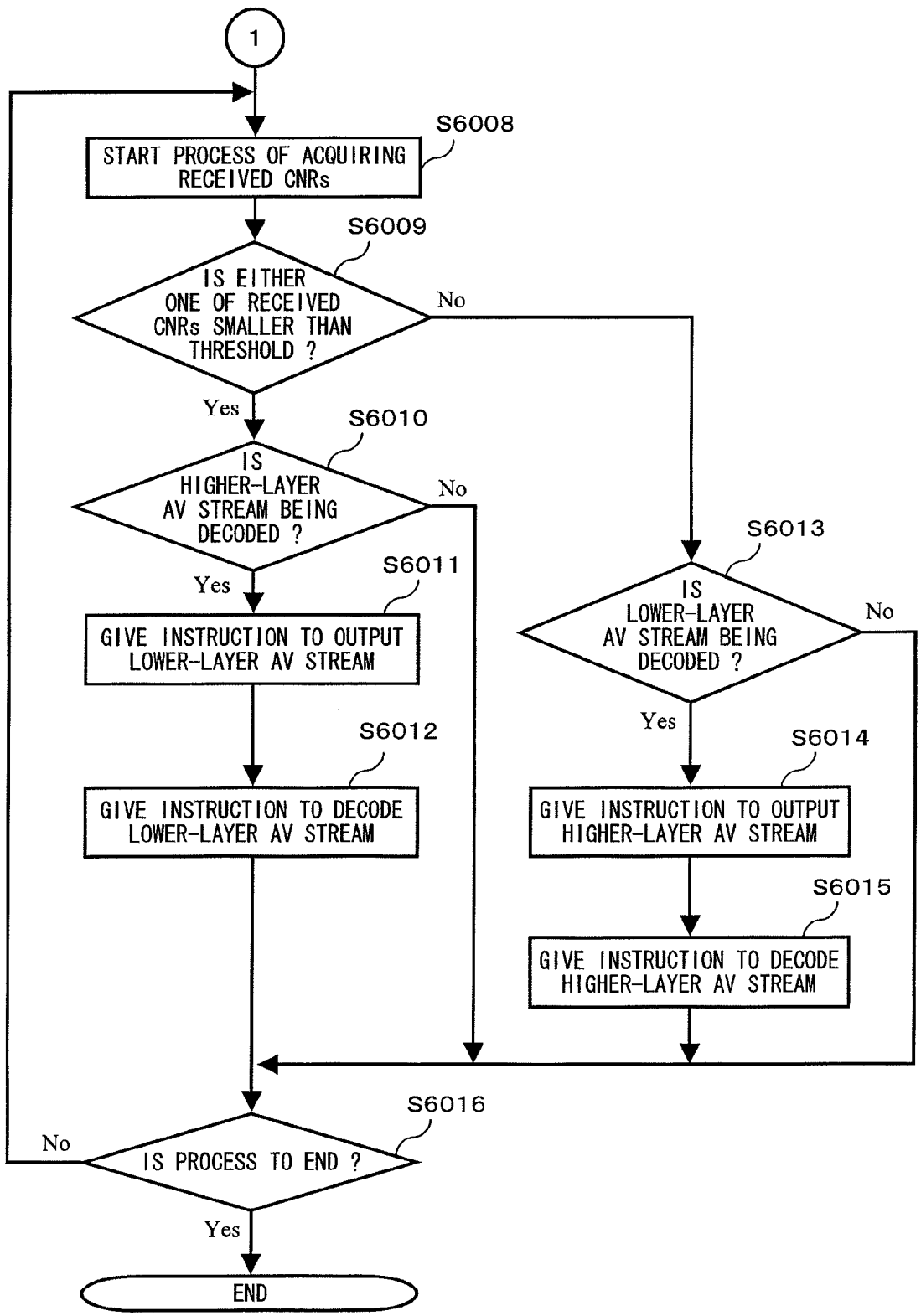
FIG. 60 is a flow chart showing the reception/reproduction process according to the thirteenth embodiment of the present invention.

First, in the fourteenth embodiment, in the process of step S6006 of FIG. 59 a process is performed of separating the higher-layer AV stream and the two lower-layer AV streams from the original TS. After the process of steps S6007 and S6008, in step S6009 it is determined whether or not either one of the values of the received CNRs output from the first received-CNR detection section 6041 and the second received-CNR detection section 6042 is smaller than a predetermined threshold. At this time, the values of both received CNRs are temporarily stored in a memory (not shown).

Then in the process of step S6011 of FIG. 60 the stored received CNRs are compared to each other. Then a process is performed of outputting from the TS combination/separation section 6043 to the AV decoder 6044 the lower-layer AV stream on the physical channel of the higher transmission quality.

With the process described above, in the fourteenth embodiment, when either one of the transmission qualities has deteriorated, it is possible to reproduce, between the two physical channels, the HD/SD content on the physical channel of the better transmission quality. The fourteenth embodiment has an advantage in that when hierarchical transmission is performed using only one channel as in the thirteenth embodiment and the transmission quality of the physical channel used for the hierarchical transmission has deteriorated, it is possible to ensure the continuation of more certain viewing of the content (broadcast program). On the other hand, the thirteenth embodiment has an advantage in that the thirteenth embodiment places less strain on the bandwidth for transmitting an SHD content than the fourteenth embodiment since hierarchical transmission is performed using only one physical channel.

Note that the fourteenth embodiment is also applicable to the determination described above of the transmission qualities with the use of the bit error rates.

Alternatively, the two lower-layer AV streams may be generated in the transmission device 6060, using different encoded forms. For example, the first lower-layer encoder 6012 may perform encoding in MPEG-2, while the second lower-layer encoder 6022 may perform encoding in H.264. This makes it possible that even a reception device incompatible to the encoded form of an SHD content, e.g., a reception device provided with only an MPEG-2 decoder, allows a content having the same material as that of an SHD content to be viewed. Specifically, it is possible that even such a reception device allows a content having the same material as that of an SHD content to be viewed, if the reception device selects the physical channel used for hierarchical transmission of a lower-layer AV stream encoded in MPEG-2 and then reproduces the HD/SD content on the selected channel. That is, it is possible to prevent the case where broadcast programs cannot be viewed at all without a reception device capable of decoding an SHD content.

Yet alternatively, the first lower-layer encoder 6012 may perform hierarchical transmission of an AV stream of SD video, while the second lower-layer encoder 6022 may perform hierarchical transmission of an AV stream of HD video. Also in this case, it is possible to prevent the case where broadcast programs cannot be viewed at all without a reception device capable of decoding an SHD content.

Yet alternatively, the transmission device, which generates only one lower-layer AV stream as in the thirteenth embodiment, may sort the one lower-layer AV stream into two channels for transmission, in a similar manner to a higher-layer AV stream (see FIG. 64). That is, one lower-layer AV stream may be sorted, e.g., in half, into two channels and transmitted. Even in this case, since a lower-layer AV stream can be viewed with a lower transmission quality than the transmission quality required for a higher-layer AV stream, it is possible to continue viewing the content by switching the reproduction to that of the lower-layer AV stream as in the thirteenth embodiment, when either one of the transmission qualities has deteriorated.

Note that in the thirteenth and fourteenth embodiments, an SHD content and the like are subjected to bulk transmission using two physical channels and are received by a reception device having mounted therein two tuners, but the present invention is also applicable to a digital broadcasting system that combines bulk transmission using three or more physical channels with a reception device having mounted therein three or more tuners.

In addition, in the thirteenth and fourteenth embodiments a lower-layer AV stream is decoded when either one of the received CNRs has fallen below a predetermined threshold or when either one of the bit error rates has exceeded a predetermined threshold; however, these thresholds may each be two-step thresholds. That is, when a received CNR comes close to the predetermined threshold, for example, the image of an SHD content may be, if not impossible to be displayed, poorly displayed with noise occurring on the screen. In response, such a received CNR, at which the image starts to be poorly displayed with noise, is set as a first threshold, and the threshold (e.g., the threshold used in step S6009) used in the thirteenth embodiment and the like is set as a second threshold (accordingly, the value of the first threshold is a value close to, i.e., slightly lower or higher than, the second threshold). When either one of the received CNRs has fallen below the first threshold, the CPU 6045 displays a small-size window on the screen, and reproduces and displays the HD/SD content (i.e., the lower-layer AV stream) in the small-size window. The CPU 6045 also displays a message that the reception is poor, and also a message for inquiring as to whether or not to reproduce the HD/SD content that is being displayed in the window. If, in response to this, the user performs an operation of selecting the display of the HD/SD content, the decoding of the higher-layer AV stream may be stopped at that time, and the decoding of the lower-layer AV stream may be performed (the window is deleted). If the user does not perform an operation of selecting the display of the HD/SD content, the decoding of the lower-layer AV stream is performed when either one of the received CNRs has fallen below the second threshold. This makes it possible, when the reception condition is starting to deteriorate, to allow the user to select the switch of the reproduction to that of an HD/SD content at an earlier time, and therefore possible to improve the convenience of the reception device.

Alternatively, in the case where an HD/SD content is subjected to hierarchical transmission on each physical channel as described in the fourteenth embodiment, the HD/SD content on the physical channel of the better received CNR may be displayed in the window when either one of the received CNRs has fallen below the first threshold. Further, even after the reproduction is switched to that of the HD/SD content due to the user's selection operation or due to either one of the received CNRs having fallen below the second threshold, the conditions of the received CNRs may still be monitored, and the HD/SD content on the physical channel of the better reception may be appropriately reproduced depending on the monitored conditions. This makes it possible to continue viewing the content without causing interruption or disruption of video and audio.

INDUSTRIAL APPLICABILITY

A digital broadcast transmission device and a digital broadcast reception device according to the present invention are capable of transmitting and receiving a program having a large amount of information, and therefore are useful for a transmission device in a digital broadcasting system, for a television and a vehicle navigator that are capable of receiving digital broadcasting, and the like.

The invention claimed is:

1. A digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted, wherein on at least one of the physical channels on which the bulk program is transmitted, a lower-layer program is subjected to hierarchical transmission, the lower-layer program being the same in program material as the bulk program and different in video standard from the bulk program, the digital broadcast reception device comprising:

a plurality of tuners;

operation reception means for receiving a predetermined operation from a user;

channel selection instruction means for, based on the operation received by the operation reception means, causing the tuners to select physical channels specified by the user;

bulk channel detection means for detecting, based on the control information, whether or not the bulk program is transmitted on the physical channel selected in accordance with the channel selection instruction means;

tuner usage detection means for, when the bulk channel detection means detects that the bulk program is transmitted, detecting usages of the plurality of tuners;

receivability determination means for detecting, based on the detection result of the tuner usage detection means, whether or not, among the plurality of tuners, a sufficient number of tuners are available for selecting all the plurality of physical channels used for bulk transmission of the bulk program detected by the bulk channel detection means; and program reproduction means for, when the receivability determination means determines that a sufficient number of tuners are available for selecting all the plurality of physical channels used for the bulk transmission, performing a process of reproducing the bulk program detected by the bulk channel detection means and for, when the receivability determination means determines that a sufficient number of tuners are not available for selecting all the plurality of physical channels used for the bulk transmission, performing a process of reproducing the lower-layer program subjected to hierarchical transmission with the bulk program.

2. The digital broadcast reception device according to claim 1, wherein the receivability determination means determines that, among the plurality of tuners, a tuner having selected, for recording, a physical channel different from the physical channels on which the bulk program is transmitted is not available.

3. The digital broadcast reception device according to claim 1, further comprising OSD display means for performing OSD, wherein, when the program reproduction means performs the process of reproducing the lower-layer program subjected to the hierarchical transmission with the bulk program, the OSD display means outputs to a screen an OSD indicating that the lower-layer program is to be reproduced.

4. The digital broadcast reception device according to claim 1, further comprising:

timer-recording means for, based on the operation received by the operation reception means, registering timer-recording information including at least a broadcast period of a predetermined program to be broadcast, a physical channel on which the predetermined program is broadcast, and the identification information;

timer-recording information storage means for storing the timer-recording information;

conflicting program detection means for detecting, based on the timer-recording information stored in the timer-recording information storage means, whether or not a timer-recording setting of a conflicting program, whose broadcast period conflicts with a broadcast period of the program to be registered by the timer-recording means, has already been made; and timer-recording content change means for, when at least one of the program to be registered by the timer-recording means and the conflicting program is the bulk program, registering a timer-recording setting of the bulk program as a timer-recording setting of the lower-layer program.

5. The digital broadcast reception device according to claim 4, wherein, when the conflicting program is the bulk program, the timer-recording content change means changes the timer-recording setting of the conflicting program to a timer-recording setting of the lower-layer program.

6. The digital broadcast reception device according to claim 4, wherein, when the program to be registered by the timer-recording means is the bulk program, the timer-recording content change means registers a timer-recording setting of the program to be registered by the timer-recording means as a timer-recording setting of the lower-layer program.

7. The digital broadcast reception device according to claim 4, wherein, when both the program to be registered by the timer-recording means and the conflicting program are the bulk program, the timer-recording content change means registers timer-recording settings of both programs each as a timer-recording setting of the lower-layer program.

8. A digital broadcast reception device for receiving a digital broadcast signal transmitted from a transmission device, the digital broadcast signal representing a bulk program, a non-bulk program, and control information, the bulk program being a program subjected to bulk transmission using a plurality of physical channels, the non-bulk program being a program transmitted using a single physical channel, the control information including at least identification information identifying whether a program that is broadcast is the bulk program or the non-bulk program and bulk-channel information indicating physical channel numbers of the plurality of physical channels forming the bulk program, the digital broadcast reception device comprising:

a first tuner and a second tuner, each for receiving the digital broadcast signal by selecting a predetermined physical channel;

broadcast type determination means for determining, based on the control information, whether a program that is being transmitted as the digital broadcast signal received by the first tuner is the bulk program or the non-bulk program;

bulk program search means for searching information about the bulk program that is being broadcast or that is to be broadcast;

channel selection control means for controlling channel selection operations performed by the first tuner and the second tuner; and program reproduction/output means for, based on the digital broadcast signal transmitted on the physical channel selected by at least one of the first tuner and the second tuner, reproducing the bulk program or the non-bulk program and for outputting the reproduced program to a screen, wherein:

when the broadcast type determination means determines that the program that is being transmitted on the physical channel selected by the first tuner is the bulk program, the channel selection control means, based on the bulk-channel information, causes the first tuner and the second tuner to select the plurality of physical channels forming the bulk program, combines the digital broadcast signals received by both tuners, and outputs the combined broadcast signal to the program reproduction/output means; and when the broadcast type determination means determines that the program that is being transmitted on the physical channel selected by the first tuner is the non-bulk program, the channel selection control means outputs to the program reproduction/output means the digital broadcast signal obtained through the first tuner, causes the bulk program search means to search for the physical channels on which the bulk program is being broadcast, and causes the second tuner to select one of the physical channels searched for by the bulk program search means.

9. The digital broadcast reception device according to claim 8, wherein:
the control information includes the identification information about all channels and the bulk-channel information about all channels; and
the bulk program search means, based on the identification information, searches for the bulk program that is being broadcast.

10. The digital broadcast reception device according to claim 8, further comprising EPG acquisition means for acquiring an EPG, wherein
the bulk program search means, based on the EPG, searches for the physical channel numbers of the bulk program that is being broadcast or that is to be broadcast.

11. The digital broadcast reception device according to claim 8, wherein:
on each of the physical channels on which the bulk program is transmitted, a lower-layer program is subjected to hierarchical transmission, the lower-layer program being the same in program material as the bulk program and different in video standard from the bulk program; and
when the broadcast type determination means determines that the program on the physical channel selected by the first tuner is the bulk program, the channel selection control means outputs, to the program reproduction/output means, data forming the lower-layer program included in the digital broadcast signal received by the first tuner, combines the digital broadcast signals received by both tuners, and outputs the combined broadcast signal to the program reproduction/output means.

12. The digital broadcast reception device according to claim 8, wherein:
the bulk program is a program created under a Super Hi-Vision standard; and
the non-bulk program is a program created under a Hi-Vision standard or an SD standard.

13. The digital broadcast reception device according to claim 10, wherein
the bulk program search means, based on the EPG, searches for the physical channel numbers of the bulk program to be broadcast within a predetermined time.

14. The digital broadcast reception device according to claim 11, further comprising:
OSD combination means for combining the output from the program reproduction/output means with a predetermined OSD and outputting the combined result to the screen; and
OSD operation reception means for receiving a predetermined operation input in response to the OSD, wherein:

after the channel selection control means outputs the data forming the lower-layer program to the program reproduction/output means, the OSD combination means generates, as the OSD, a message as to whether or not to switch to a reproduction of the bulk program, and outputs the message to the screen; and after the OSD combination means displays the message, the channel selection control means acquires from the OSD operation reception means an operation input in response to the message, causes, based on the operation input, the first tuner and the second tuner to select the plurality of physical channels forming the bulk program, combines the digital broadcast signals received by both tuners, and outputs the combined broadcast signal to the program reproduction/output section means.

15. The digital broadcast reception device according to claim 11, wherein:
the bulk program is a program created under a Super Hi-Vision standard; and
the lower-layer program is a program created under a Hi-Vision standard or an SD standard.

16. A digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted,
the digital broadcast reception device comprising:
a plurality of tuners, each for receiving the digital broadcast signal by selecting a predetermined physical channel;
bulk channel detection means for detecting, based on the control information, whether or not the bulk program is transmitted on one of the physical channels selected by the plurality of tuners;
program reproduction means for, based on the detection result of the bulk channel detection means, switching a reproduction process mode between a first reproduction process mode and a second reproduction process mode, the first reproduction process mode reproducing the bulk program from the digital broadcast signals received by causing the plurality of tuners to select the plurality of physical channels on which the bulk program is transmitted, the first reproduction process mode outputting the reproduced bulk program, the second reproduction process mode reproducing the non-bulk program from the digital broadcast signal received by causing a single tuner among the plurality of tuners to select the physical channel on which the non-bulk program is transmitted, the second reproduction process mode outputting the reproduced non-bulk program; and
at least one output section for outputting to a predetermined screen or a predetermined storage medium the bulk program or the non-bulk program output from the program reproduction means, wherein:
when the bulk channel detection means detects that the bulk program is transmitted on one of the physical channels selected by the tuners, the program reproduction means switches the reproduction process mode to the first reproduction process mode; and when the bulk channel detection means detects that the bulk program is not transmitted on one of the physical channels selected by the tuners, the program reproduction means switches the reproduction process mode to the second reproduction process mode.

17. The digital broadcast reception device according to claim 16, further comprising:
OSD generation means for generating an OSD content, the OSD content being a content to be displayed as an OSD; and
OSD display means for performing OSD of the display content generated by the OSD generation means, wherein,
when the bulk channel detection means detects that the bulk program is transmitted on one of the physical channels selected by the tuners, the OSD generation means generates a predetermined message as the OSD content and outputs the generated message to the OSD display means.

18. The digital broadcast reception device according to claim 16, wherein:
on at least one of the physical channels on which the bulk program is transmitted, a lower-layer program is subjected to hierarchical transmission, the lower-layer program being the same in program material as the bulk program and different in video standard from the bulk program;
the digital broadcast reception device includes a plurality of the output sections,
the program reproduction means reproduces the bulk program from the digital broadcast signals received by causing the plurality of tuners to select the plurality of physical channels on which the bulk program is transmitted, outputs the reproduced bulk program to one of the plurality of the output sections, and further includes a third reproduction process mode for reproducing the lower-layer program and outputting the reproduced lower-layer program to another one of the plurality of the output sections that is different from the output section to which the bulk program is output; and,
when the bulk channel detection means detects that the bulk program is transmitted on one of the physical channel selected by the tuners or when a predetermined operation signal is transmitted from a user while the bulk program is being reproduced in the first reproduction process mode, the program reproduction means switches the reproduction process mode to the third reproduction process mode.

19. The digital broadcast reception device according to claim 17, further comprising a reproducibility determination means for, when the bulk channel detection means detects that the bulk program is transmitted on one of the physical channels selected by the tuners, determining whether or not it is possible for the digital broadcast reception device to reproduce the bulk program, wherein,
when the reproducibility determination means determines that it is impossible to reproduce the bulk program, the OSD generation means generates as the OSD content a message indicating that it is impossible to reproduce the bulk program.

20. The digital broadcast reception device according to claim 18, wherein,
when outputting the lower-layer program in the third reproduction process mode, the program reproduction means outputs the lower-layer program to a predetermined storage medium used to record the lower-layer program.

21. A digital broadcast reception device for receiving a digital broadcast signal transmitted from a transmission device, the digital broadcast signal representing a bulk program, a non-bulk program, and control information, the bulk program being a broadcast program subjected to bulk transmission using a plurality of physical channels, the non-bulk program being a broadcast program transmitted using a single physical channel, the control information including at least identification information identifying whether a transmitted broadcast program is the bulk program or the non-bulk program and bulk-channel information indicating physical channel numbers of the plurality of physical channels on which the bulk program is transmitted, wherein
on at least one of the physical channels on which the bulk program is transmitted, a lower-layer program is subjected to hierarchical transmission, the lower-layer program being the same in program material as the bulk program and different in video standard from the bulk program,
the digital broadcast reception device comprising:
at least one tuner for receiving the digital broadcast signal by selecting one of the physical channels;
bulk channel detection means for detecting whether or not the bulk program is transmitted on the selected physical channel;
program reproduction means for, based on the detection result of the bulk channel detection means, switching a reproduction process mode between a first reproduction process mode and a second reproduction process mode, the first reproduction process mode reproducing the lower-layer program from the digital broadcast signal received by selecting, among the plurality of physical channels on which the bulk program is transmitted, the physical channel used for the hierarchical transmission of the lower-layer program, the first reproduction process mode outputting the reproduced lower-layer program, the second reproduction process mode reproducing the non-bulk program from the digital broadcast signal received by selecting the physical channel on which the non-bulk program is transmitted, the second reproduction process mode outputting the reproduced non-bulk program;
channel storage means for storing therein a physical channel number of the physical channel that is selected by the tuner; and
an output section for outputting to a predetermined screen or a predetermined storage medium the lower-layer program or the non-bulk program output from the program reproduction means, wherein:
when the reproduction process mode is the second reproduction mode and the bulk channel detection means detects that the bulk program is transmitted, the program reproduction means, after storing in the channel storage means the physical channel number of the physical channel that is selected at that time, selects the physical channel used for the hierarchical transmission of the lower-layer program, and switches the reproduction process mode to the first reproduction process mode; and
when a broadcast of the lower-layer program ends, the program reproduction means selects the physical channel number stored in the channel storage means, and switches the reproduction process mode to the second reproduction process mode.

* * * * *